United States Patent
Mescal

(10) Patent No.: US 9,990,407 B2
(45) Date of Patent: Jun. 5, 2018

(54) STAND-ALONE DATABASE BROWSING SYSTEM AND METHOD

(71) Applicant: Mescal IT Systems, Ltd., Co Meath (IE)

(72) Inventor: Gerald Mescal, Co Meath (IE)

(73) Assignee: Mescal IT Systems, Ltd., Co Meath (IE)

( * ) Notice: Subject to any disclaimer, the term of this patent is extended or adjusted under 35 U.S.C. 154(b) by 0 days. days.

(21) Appl. No.: 15/596,679

(22) Filed: May 16, 2017

(65) Prior Publication Data

US 2017/0249318 A1    Aug. 31, 2017

Related U.S. Application Data

(63) Continuation-in-part of application No. 15/169,020, filed on May 31, 2016, now Pat. No. 9,659,054, (Continued)

(51) Int. Cl.
*G06F 17/30*    (2006.01)
*G06F 3/0482*    (2013.01)

(52) U.S. Cl.
CPC ........ *G06F 17/3056* (2013.01); *G06F 3/0482* (2013.01); *G06F 17/30292* (2013.01); (Continued)

(58) Field of Classification Search
CPC .......... G06F 17/3054; G06F 17/30554; G06F 17/30867; G06F 17/30557; (Continued)

(56) References Cited

U.S. PATENT DOCUMENTS 6,694,374 B1 *    2/2004    McGloin .......... G06Q 10/06398
                                                        709/238
7,117,225 B2    10/2006    Cosic
(Continued)

FOREIGN PATENT DOCUMENTS

WO    WO 02059793 A2    8/2002

OTHER PUBLICATIONS

PCT International Searching Authority, "International Search Report for related application PCT/IB2015/05284 dated Jul. 21, 2015" (3 Pages).

(Continued)

*Primary Examiner* — Hares Jami
(74) *Attorney, Agent, or Firm* — Mark Malek; Stephen Bullock; Widerman Malek, PL

(57) ABSTRACT

A computer-implemented system and method for creating a user-defined database interface. An Orbit Form module processes a call comprising an identifier for the database, a target data object (database table), approach filters (table fields), and results lines (table fields). Approach filters may support comparable data types, and results lines may support both comparable and non-comparable data types. The call may optionally include parameters that the Orbit Form module uses to govern retrieval of data from the target database, presentation of filter values, and/or formatting of results pages. After testing the call constructs, the Orbit Form module generates Approach boxes (corresponding to the approach filters) that a user employs to enter target input values to compare to records in the database. Record matches result in retrieval and user-specified display of data corresponding to the results lines (DaPs). A selectable view image field in a DaP extracts and displays image file data.

20 Claims, 43 Drawing Sheets

Related U.S. Application Data which is a continuation of application No. 14/694,698, filed on Apr. 23, 2015, now Pat. No. 9,378,253.

(60) Provisional application No. 61/983,149, filed on Apr. 23, 2014.

(52) U.S. Cl.
CPC .. *G06F 17/30398* (2013.01); *G06F 17/30477* (2013.01); *G06F 17/30554* (2013.01); *G06F 17/30557* (2013.01); *G06F 17/30572* (2013.01); *G06F 17/30864* (2013.01); *G06F 17/30867* (2013.01); *G06F 17/30991* (2013.01)

(58) Field of Classification Search
CPC ......... G06F 17/30292; G06F 17/30864; G06F 17/3991; G06F 17/30398
USPC .................. 707/758, 769, 805; 715/763, 968
See application file for complete search history.

(56) References Cited

U.S. PATENT DOCUMENTS

| | | | | |
|---|---|---|---|---|
| 8,131,748 B2* | 3/2012 | Held | ................ | G06F 17/30997 707/769 |
| 8,555,263 B2 | 10/2013 | Allen et al. | | |
| 2003/0236784 A1* | 12/2003 | Tang | ................ | G06F 17/30398 |
| 2005/0015361 A1* | 1/2005 | Payton | .............. | G06F 17/30398 |
| 2006/0074967 A1* | 4/2006 | Shaburov | .......... | G06F 17/30398 |
| 2006/0235828 A1 | 10/2006 | Dettinger et al. | | |
| 2007/0005562 A1* | 1/2007 | Chau | ................. | G06F 17/30604 |
| 2008/0091707 A1* | 4/2008 | Brown | .............. | G06F 17/30289 |
| 2009/0024940 A1* | 1/2009 | Zeringue | ............... | G06F 3/0481 715/763 |
| 2011/0179404 A1* | 7/2011 | Allen | ........................ | G06F 8/20 717/143 |
| 2011/0225133 A1* | 9/2011 | Manu | ................. | G06F 17/30997 707/706 |

OTHER PUBLICATIONS

PCT International Searching Authority, "Written Opinion for related application PCT/IB2015/05284", Jul. 21, 2015 (9 Pages).
USPTO, "Non-Final Office Action for U.S. Appl. No. 14/694,698, now U.S. Pat. No. 9,378,253", dated Oct. 28, 2015 (17 Pages).
Applicant, "Response to Non-Final Office Action", dated Feb. 9, 2016 (18 Pages).
USPTO, "Applicant-Initiated Interview Summary", dated Feb. 5, 2016 (3 Pages).
USPTO, "Notice of Allowance for U.S. Appl. No. 14/694,698", dated Mar. 2, 2016 (9 Pages).
USPTO, "Examiner-Initiated Interview Summary", dated Mar. 3, 2016 (1 Page).
USPTO, "Non-Final Office Action for U.S. Appl. No. 15/169,020", dated Sep. 8, 2016 (23 Pages).
Applicant, "Response to Non-Final Office Action for U.S. Appl. No. 15/169,020" dated Dec. 8, 2016 (15 Pages).
USPTO, "Notice of Allowance in related U.S. Appl. No. 15/169,020", dated Jan. 20, 2017 (7 Pages).

\* cited by examiner

STAND-ALONE DATABASE BROWSING SYSTEM AND METHOD

RELATED APPLICATIONS

This application is a continuation-in-part and claims the benefit under 35 U.S.C. § 120 of U.S. patent application Ser. No. 15/169,020 filed by the inventor of me present application on May 31, 2018, and titled Database Browsing System and Method which, in turn, is a continuation and claims the benefit under 35 U.S.C. § 120 of U.S. patent application Ser. No. 14/694,898 filed by the inventor of the present application on Apr. 23, 2015, and titled Database Interface Creation System and Method which, in turn, claims the benefit under 35 U.S.C. § 119(e) of U.S. Provisional Patent Application Ser. No. 81/983,149 tiled by the inventor of the present application on Apr. 23, 2014, and titled Approach Z—A Database Browser-Searcher, the entire contents of each of which are incorporated herein fey reference except to the extent that disclosure therein is inconsistent with disclosure herein.

FIELD OF THE INVENTION

The present invention relates generally to systems and methods for database browsing and searching and, more particularly, to a computer-implemented method, system, and computer-usable program code for performing user-directed retrieval and display of data stored in a database.

BACKGROUND

A database is a structured collection of data and associated computer system components designed to provide a user access to meaningful information. A database is typically constructed upon a structural description of the information, referred to as a schema. The schema comprises a collection of meta-data that describes the relations among the data in the database.

The relational model for structuring databases is currently employed in many popular databases. In a typical relational database, a single database entry, referred to as a record, may contain one or more values, referred to as fields. Related records may be grouped together in a table, the definition of which controls the types of data each record may contain. Database records are often referred to as rows, because each record may be characterized as a row in a table. Individual fields are often referred to as columns, because field definitions are the same for each record within a table. Each column in a database table is characterized by a name and a data type. A database may contain multiple tables, each of which may contain multiple rows and/or columns.

Common functionality made available to a user of a database system includes the ability to add data, delete data, update data, retrieve data, and generate data reports. Structured Query Language (SQL) commands are commonly employed by database programmers and administrators to manipulate databases using such functions. The data type of each column governs how SQL may interact with the data stored in that column.

The comparable siring data types commonly supported by SQL include the following:
CHARACTER (n)—Character string. Fixed-length n
VARCHAR(n) or CHARACTER VARYING(n)—Character string. Variable length. Maximum length n
BINARY(n)—Binary string. Fixed-length n
VARBINARY(n) or BINARY VARYING(n)—Binary Variably length, Maximum length n The comparable number date types commonly supported by SQL include the following:
BOOLEAN—Stores TRUE or FALSE values
INTEGER(p)—Integer numerical (no decimal). Precision p
SMALLINT—Integer numerical (no decimal). Precision 5
INTEGER—integer numerical (no decimal). Precision 10
BEGINT—Integer numerical (no decimal). Precision 19
DECIMAL(pss)—Exact numerical. precision p, scale s. Example: decimal (5,2) is a number that has 3 digits before the decimal and 2 digits after the decimal
NUMERIC(p,s)—Exact numerical, precision p, scale s. (Same as DECIMAL)
FLOAT(p)—Approximate numerical, mantissa precision p. A floating number in base 10 exponential notation The size argument for this type consists of a single number specifying the minimum precision
REAL—Approximate numerical mantissa precision 7
FLOAT—Approximate numerical mantissa precision 16
DOUBLE PRECISION—Approximate numerical mantissa precision 18
DATE—Stores year, month, and day values
TIME—Stores hour, minute, and second values
TIME STAMP—Stores year, month. day, hour, minute, and second values
INTERVAL—Composed of a number of integer fields, representing a period of time, depending on the type of interval Some SQL implementations support also support an XML data type (i.e., stores data in an internal representation that preserves the Extensible Markup Language (XML) content of the data). Other data types sometimes supported by SQL include NCHAR and NVARCHAR. Unlike columns of either char or varchar type, columns of either nchar or nvarchar type can store Unicode characters. Columns of either char or nchar type are fixed-length, meaning they reserve storage space for number of characters specified whether or not that space is used. Columns of either varchar or nvarchar type are variable-length, meaning they only use space for the characters stored, and will not reserve storage like char and nchar types. Because columns of either nchar or nvarchar type may take up twice as much storage space than columns of either char or varchar type, a SQL programmer may opt to use the former types only if Unicode support is required. Also, SQL support for certain legacy data types has been dropped. For example, SQL programmers are advised to avoid non-comparable data types NTEXT, TEXT and IMAGE, and to instead use N VARCHAR(max), VARCHAR(max), and VARBINARY(max), respectively.

Although SQL became a standard of the American National Standards institute (ANSI) in 1986, and of the International Organization for Standardization (ISO) in 1987, revisions to supported SQL features has contributed to the problem that most SQL code is not completely portable among different database systems without adjustments. Consequently, custom SQL programming is often required to gain meaningful information out of a database that is unfamiliar to a user and/or which goal-specific SQL programming has not already been developed.

SQL programming can be cumbersome and error prone, even to specially-trained database users. Consequently, certain advancements in the area of intermediate-level database interface fools have been made in the software industry. For example, data grids are effective, albeit somewhat crude, multipurpose database manipulation tools. Microsoft's® GridView view mode is commonly used to access data from any SQL-compliant relational database and display those data in a format characterized by horizontal rows representing each record, and vertical lines dividing each column (e.g., each field of the record). However, when the limited display capabilities of this tool are called upon to present multiple columns and/or long-width columns, the immediate visibility of the desired data is constrained and inefficient. Furthermore, augmenting simplistic grid-based tools with, for example, a user-friendly interface and/or user-specified data views requires expensive, situation-specific downstream database application programming, which precludes their development and use by other than users who are proficient in SQL command syntax.

A need exists for an alternative software tool for creating a stand-alone, user-directed interface to a database that may equip end users having varying levels of SQL literacy to access and present meaningful information from a database without having to resort to complex SQL programming.

While certain aspects of conventional technologies have been discussed to facilitate disclosure of the invention, the applicant in no way disclaims these technical aspects, and it is contemplated that the claimed invention may encompass one or more of the conventional technical aspects discussed herein. The present invention may address one or more of the problems and deficiencies of the current availability and prior art discussed above. However, if is contemplated that the invention may prove useful in addressing other problems and deficiencies in a number of technical areas. Therefore, the claimed invention should not necessarily foe construed as limited to addressing any of the particular problems or deficiencies discussed herein, or limited to the particular embodiment for the invention used to illustrate the steps and functionality of the herein.

This background information is provided to reveal information believed by the applicant to be of possible relevance to the present invention. No admission is necessarily intended, nor should be construed, that any of the preceding information constitutes prior art against the present invention. This reference or discussion is not an admission that the document, act or item of knowledge or any combination thereof was at the priority dale, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

With the foregoing in mind, it is therefore en object of the present invention to provide systems and methods for creating and using a database interface. More specifically, the present invention may advantageously provide a generic, stand-alone software tool that may advantageously provide for a tool user to navigate and search objects in a third-party database, and to display data retrieved from the data objects in a meaningful way. The database interface capability of the present invention may advantageously permit an end user to use the systems, methods, and devices described herein to productively and efficiently interact with any SQL-compatible database, regardless of that end user s level of expertise (or lack of expertise) in SQL programming and syntax.

The database interface capability of the present invention may advantageously provide the search, browse, and display functionality described herein while requiring minimal knowledge of the underlying database schema on the part of the end user. The database interface capability of the present invention may advantageously provide access to data within a database without compromising the integrity or security of the database. The database interface capability of the present invention may advantageously present retrieved data so as to support seamless and continual navigation by the end user The database interface capability of the present invention may advantageously present data retrieved from a database in a consistent, meaningful and visually-friendly format without a need for complex SQL programming on the part of the end user.

These and other objects, features, and advantages according to the present invention are provided by a computer-implemented system and method for creating a user-defined database interface. Method automation may process a call comprising an identifier for the database, a target data object (database table), approach filters (table fields), and results lines (table fields). Approach filters may support comparable data types, and results lines may support both comparable and non-comparable data types. The call may optionally include parameters that the method automation may use to govern retrieval of data from the target database, presentation of filter values, and/or formatting of results pages. After testing the call constructs, the method automation may generate Approach boxes (corresponding to the approach filters) that a user may employ to enter target input values to compare to records in the database. Record matches may result in retrieval and user-specified display of data corresponding to the results lines (DaPs). A selectable view image field in a DaP may extract and display image file data.

More specifically, an embodiment of the present invention may include a system that may be implemented as a computer program for creating an interface to a database, wherein the database comprises a named table that includes named fields. The computer program may be a product embodied in a non-transitory computer readable storage medium, and that comprises a Launch Form module and an Orbit Form module.

The Launch Form module may comprise a first interface configured to receive a database connection string identifying the database, a target data object corresponding to the named table, and a Level 0 target corresponding to one of the named fields. The first interface may also receive a user-specified number of Above The Line named fields to be employed as approach filters, each corresponding to a respective named field in the database and each distinct from the Level 0 target. The first interface may also receive a user-specified number of Below The Line named fields, each corresponding to a respective named field in the database, and each configured to be employed for display of a value retrieved from a respective, user-specified named fields. The Launch Form module may create a call that comprises the inputs described above as query option parameters received by the first interface.

The first interface may also receive a display option parameter such as order by, group by, distinct, width, and/or lines to show below Level 0, and may create the call to further comprise the display option parameter. The first interface may also receive a nominate option parameter such as ascending, descending, and collated, and may create the call to further comprise the nominate option parameter. The Launch Form module may be configured to display a saved call set to a visible container, to receive a selection of a call choice from the visible container, and to receive from the call choice a unique instruction identifier, the database connection string, and the target data object.

The Orbit Form module may comprise a second interface configured to communicate with the database by creating, testing, and executing SQL scripts that include the query option parameters of the call. The second interface may execute SQL script(s) to retrieve from the database records that match values retrieved from the Level 0 target named field, from the Above The Line named fields, and/or from the Below The Line named fields. The second interface may also display a Paging Box corresponding to the Level 0 target, and a user-specified number of approach boxes each corresponding to a respective one of the approach filters. The second interface may be further configured to receive (through either searching and/or browsing) from each of the Paging Box and the approach boxes a respective target input value that, in combination, define a selection condition that the Orbit Form module may match with the Above The Line values in the database. The second interface may display a drop down page comprising at least one DaP, each defined as a drop down box comprising the Level 0 value and the Below The Line value(s) of one of the matched records.

The second interface may order the values retrieved to the approach boxes as characterized by the nominate option parameter, and may format the DaPs to be characterized by the display option parameter. Display of the DaPs may support Below The Line values of any data type commonly supported by SQL, including text, image, ntexf, varchar (max), nvarchar(max), varbinary(max), char, and xml. The second interface may store results selected from the DaPs into a collection bin, may format a DaP to be characterized by a highlighter, and/or may store created SQL scripts to a clipboard.

A method aspect of the invention may comprise the steps of receiving, using a Launch Form module, a database connection string to define an identifier for the database, a target data object corresponding to the named table in the database, and a Level 0 target corresponding to one of the plurality of named fields in the database defined as a Level 0 target named field. The method may also include receiving an Approaches variable, and using the Approaches variable to define a count of approach filters to receive, each corresponding to a named field in the database defined as Above The Line named fields that may be distinct from the Level 0 target named field. The method may also include receiving a Lines Below Level 0 variable, and using the Lines Below Level 0 variable to define a count of results lines to receive, each corresponding to a named field in the database defined as Below The Line named fields. The method may also include creating or retrieving from a stored call set a call that comprises query option parameters including the database connection string, the Level D target, the approach filters, and the results line.

A method aspect of the invention may comprise the steps of initiating, using an Orbit Form module, data communication with the database using the database connection string of the call. The method may also include creating SQL scripts that include the query option parameters of the call, and executing the SQL scripts to retrieve records from the database that include structurally-related values retrieved from the Level 0 target named field, from the Above The Line named fields, and from the Below The Line named fields. The method may also include creating and executing SQL scripts to retrieve data from database to show and facilitate the selection of the field value for each approach filter in use. The method may also include displaying a Paging Box corresponding to the Level 0 target and also approach boxes, each corresponding to a respective one of the approach filter(s). The method may also include receiving (through either searching and/or browsing) from each of the Paging Box and the approach boxes target input values that, in combination, define a selection condition that may match the Above The Line values, to define matched records. The method may also include displaying a drop down page comprising at least one DaP, each defined as a drop down box comprising the Level 0 value and the at least one Below The Line value of a respective one of the matched records.

A method aspect of the invention may comprise the steps of receiving, using the Launch Form module, a database connection string to define an identifier for the database, a target data object corresponding to the named table in the database, and a Level 0 target corresponding to one of the named fields in the database defined as a Level 0 target named field. The method may also include receiving a Lines Below Level 0 variable, and using the Lines Below Level Q variable to define a count of results lines to receive, each corresponding to a named field in the database defined as Below The Line named fields. The method may also include creating or retrieving from a stored call set a call that comprises query option parameters including the database connection string, the Level 0 target, and the results lines.

A method aspect of the invention may compose the steps of initiating, using the Orbit Form module, data communication with the database using the database connection string of the call. The method may also include creating SQL scripts that include the query option parameters of the call, and executing the SQL scripts to retrieve records from the database that include structurally-related values retrieved from the Level 0 target named field and from the Below The Line named fields The method may also include displaying a Paging Box corresponding to the Level 0 target.

DETAILED DESCRIPTION OF THE INVENTION

Figure 1:
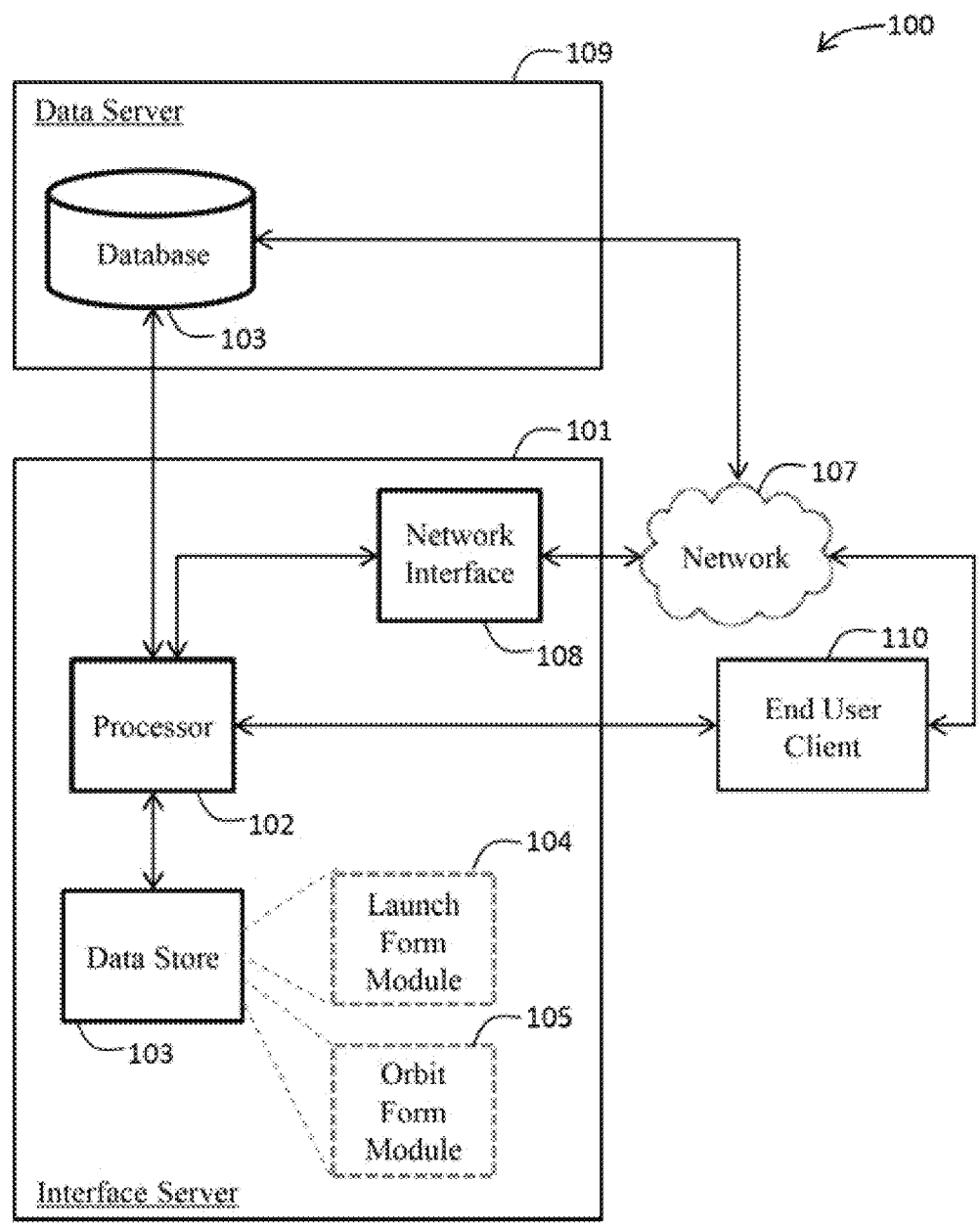
FIG. 1 is a schematic block diagram of a database interface creation system (DBICS) according to an embodiment of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Throughout this disclosure, the present invention may be referred to as a database interface creation system, a database interface system, a database browser system, a database search system, a database report system, a database browser, a database searcher, a database reporter, an interface system, a database viewer, a computer program product, a computer program, a product, a system, a device, and a method. Furthermore, the present invention may be referred to as relating to generic interfaces for use with relational databases. Those skilled in the art will appreciate that this terminology does not affect the scope of the invention. For instance, the present invention may just as easily relate to browsing and searching of hierarchical databases, network databases, and object-oriented databases.

Example methods and systems for a database interface creation system are described herein below. In the following description, for purposes of explanation, numerous specific details are set forth to provide a thorough understanding of example embodiments. It will be evident, however, to one of ordinary skill in the art that the present invention may be practiced without these specific details and/or with different combinations of the details than are given here. Thus, specific embodiments are given for the purpose of simplified explanation and not limitation.

An embodiment of the invention, as shown and described by the various figures and accompanying text, provides a database interface creation system (DBICS) according to an embodiment of the present invention. The database interface creation system may implement an automated method of defining an interface to a target database, of searching and/or browsing data retrieved from the target database using that interface, and of displaying those data in a meaningful, user-friendly, and user-directed format using the interlace. The database interface creation system also may be configured to operate with any target database which is ANSI-ISO compliant, and to support all common data types.

Referring more specifically to FIG. 1, the database interface creation system 100, according to an embodiment of the present invention, will now be discussed. The system 100 may include an interface server 101, which may be in data communication with at least one data server 109 and also with at least one end user client 110. Each data server 109 and each end user client 110 may be configured in data communication with the interface server 101 using a wide area network 107 such as the Internet.

The database server 109 may comprise a database 103 which, for example, and without limitation, may be configured as a relational database consisting of one or more rows (e.g., records) and one or more columns (e.g., fields). Also for example, and without limitation, the database 103 may be managed by a database management system (DBMS), which may be defined as systems software configured to provide functionality for maintaining and managing databases shared by many users.

The end user client 110 may comprise a web browser and a communication application. The term "web browser" as used herein includes, but is not limited to, any application software or program (including mobile applications) designed to enable users to access, retrieve, and view digital content over a wide network 107 such as the Internet The term "communication" as used herein includes, but is not limited to, electronic mail (email), instant messaging, mobile applications, personal digital assistant (PDA), a pager, a fax, a cellular telephone, a conventional telephone, television, video telephone conferencing display, other types of radio wave transmitter/transponders, and other forms of electronic communication. Those skilled in the art will recognize that other forms of communication known in the art are within the spirit and scope of the present invention.

Continuing to refer to FIG. 1, the interface server 101 may comprise a processor 102 that may accept and execute computerized instructions, and also a data store 103 which may store non-transitory data arid instructions used by the processor 102. More specifically, the processor 102 may be configured to receive input from some number of data servers 109 and/or from some number of consumer clients 110, and to direct that input to the data store 103 for storage and subsequent retrieval. For example, and without limitation, the processor 102 may be in data communication with a data server 109 and/or an end user client 110 through a direct connection and/or through a network connection 107 facilitated by a network interface 108. Also for example, and without limitation, the data store 103 may comprise multiple data stores hosted either locally on the interface server 101, and/or remotely (e.g., cloud storage). Those skilled in the art will recognize that the components resident on the interface server 101 may be collocated with the database 103 and/or with the end user client 110 on a single host server.

For example, and without limitation, Launch Form module instructions 104 may be stored in the data store 103 and may be retrieved by the processor 102 for execution. The Launch Form module 104 may be configured to advantageously automate the input of database approach and display formatting variables that may originate tram the end user client 110. Also for example, and without limitation, Orbit Form module instructions 105 may be stored in the data store 103 and may be retrieved by the processor 102 for execution. The Orbit Form module 105 may advantageously automate an interactive user session of navigating, browsing, searching, and displaying data retrieved from a target database 103 and transmitted to the end user client 110.

Those skilled in the art will appreciate, however, that the present invention contemplates the use of computer instructions that may perform any or all of the operations involved in database manipulation, including database backup, database repair, and database troubleshooting. The disclosure of computer instructions that include Launch Form module instructions and Orbit Form Module instructions is not meant to be limiting in any way. Those skilled in the art will readily appreciate that stored computer instructions may be configured in any way while still accomplishing the many goals, features and advantages according to the present invention.

Continuing to refer to FIG. 1, and referring additionally to FIG. 2, a process 200 for operating a Launch Form module 104, according to an embodiment of the present invention, will now be discussed. The processor 102 on the interface server 101 may receive from the end user client 110 at least one command to execute the Launch Form module 104 to nominate a first set of field names whose values may be the fitters by which the user may elect to approach the database 103, and also a second set of field names that may identify those fields in the database 103 whose values the user may elect to display.

For example, and without limitation, from the start 205, the Launch Form module may display to a visible container (also referred to as a hangar) call instruction sets that may have been saved to the data store previous to the current session (Block 210). At Block 215, the user may opt to select a call from the hangar, causing the Launch Form module 104 to populate supported input values with variables parsed from the selected call. For example, and without limitation, the user may elect to run the selected call without revision (Block 225). Alternatively, and also for example, and without limitation, the user may enter input values directly, or may revise the variables parsed from the selected call, including a database identifier (Block 220), a data object identifier (Block 230), approach filters (Block 240), and results lines (Block 250). The user may also directly enter input values as interface parameters (Block 260) which may define for the Orbit Form module 105 the desired characterization and appearance of both filter values and displayed results.

Upon building the new or revised call (Block 270), the user may direct the Launch Form module 104 to run the call (Block 225). For example, and without limitation, the system may allow the user to elect not to run the new or revised call at Block 225. Instead, at Block 235, the user may opt to save the call (Block 236) to the data store for retrieval manipulation, and/or execution at another time. Whether the user chooses to save or, alternatively, to abandon the (revisions to) the call under development, the system may allow the user to elect to process a different call (Block 295) or, alternatively, to end Launch Form module 104 processing at Block 299.

Running of a call at Block 225 may spawn a process in the Launch Form module 104 to perform a pre-execution test of the call. For example, and without limitation, the pre-execution test may validate that no input variables have been left blank that are required to be entered for the call to be successfully executed. If, at Block 285, the Launch Form module 104 cannot validate that the call is in proper form for execution, the module may display a warning message (Block 290) and prompt the user to revise the errant entries at one or more of Blocks 220, 230, 240, 250, and 260. If, instead, the Launch Form module 104 successfully validates the completeness of the call (Block 285), then the call may be passed to the Orbit Form module 105 for execution (Block 287).

The Orbit Form module 105 then may present to the user an interactive display that may allow the user to optionally browse and search in sequence the approach boxes for filter field values, and optionally proceed straight to a display of results at any point in the supported process. The Orbit Form module 105 does not require the existence of internal master keys, indexes, collations, or stored procedures in the database to facilitate its operation. Rather, the Orbit Form module 105 only looks to the existence of columns in the targeted table or view in the database.

Continuing to refer to FIG. 1, and referring additionally to FIG. 3, a process 300 for operating an Orbit Form module 105, according to an embodiment of the present invention, will now be discussed. The processor 102 on the interface server 101 may receive processing control from the Launch Form Module 104 at Block 305, including a command to execute the call. At Block 310, the Orbit Form module 105 may first perform an execution test which may involve creating and executing probing queries to the target database to ensure, for example, and without limitation, that the target fields, target table, and even the database itself exist and are accessible through the controlling DBMS. If, at Block 315, the Orbit Form module 105 detects that one or more of the execution tests have failed, then the Orbit Form module 105 may display an error message (Block 320) and return control to the Launch Form module 104 (Block 399) to allow the user to troubleshoot and, if possible, correct the errors in the call.

If the Orbit Form module 105 detects no errors at Block 315 that would preclude successful execution of the call, then the Orbit Form module 105 may initiate the process of building the approach boxes as specified by the user in the call. For example, and without limitation, the Orbit Form module 105 may find that an Approach Box 0 (also referred to as a Paging Box) is the only approach box that is specified by the user and that is awaiting activation as an interactive data entry box on the Orbit Form (Block 325). In this scenario (referred to as a Zero Approach), the Orbit Form module 105 may proceed directly to executing a SQL script to retrieve from the database all values in the Level 0 named field that is associated with the Paging Box (Block 370) and to populate temporary working data tables (referred to as a working data set) with data retrieved from target database. The Orbit Form module 105 may activate the Paging Box and then receive a value in this entry box to be used as a filter for performing a query of the working data set retrieved from the database (Block 385). For example, and without limitation, the entry box may receive the input value as a search variable match or as a selection of a variable present in the target field that the Orbit Form module 105 may offer as a drop-down value choice. The Orbit Form module 105 may use the value entered into the Paging Box to retrieve data from the working data set that matches the filter value from the Paging Box (Block 388), and display those results in a results page (Block 380).

Also for example, and without limitation, the Orbit Form module 105 may find that a user has specified one or more Approach Boxes (also referred to as Above The Line Approach Boxes) other than the Paging Box. In this case, the Orbit Form module 105 may identify the highest-order approach box (e.g., $A_n$) that may be awaiting activation as an interactive data entry box on the Orbit Form (Block 325). The Orbit Form module 105 may activate the Approach Box for $A_n$, also referred to as $AB_n$ (Block 330) and then receive a value in this entry box to be used as a filter for querying the database (Block 340). Assuming $AB_n$ is the first approach box activated by the Orbit Form module 105, the Orbit Form module 105 may use the value entered into $AB_n$ to initiate building of a SQL script for querying the database (Block 350). Finding no other earlier-activated approaches available to further filter the query (Block 355), the Orbit Form module 105 may check for the next highest-order approach box (e.g., $A_{n-1}$) that may be awaiting activation (Block 325). The system 100 may activate the Approach Box for $A_{n-1}$, also referred to as $AB_{n-1}$ (Block 330), and then receive a value in this entry box to be used as a filter, in combination with the filter for $AB_n$, for subsequent queries of the database (Block 340). For example, and without limitation, the interactive approach boxes may each be labeled with the respective field name specified by the user as an approach filter using the Launch Form module 104.

At Block 355, the Orbit Form module 105 may allow the user to elect to revise earlier-activated approaches. For example, and without limitation, while $AB_{n-1}$ is active, the user may opt to reactivate $AB_n$ (Block 360) and further modify the combined filter to be used in the query (Blocks 340, 350). Upon activation of all approach boxes, the Orbit Form module 105 may format and display a page of results. More specifically, the activation of additional approach boxes (Blocks 325, 330), the entry of filter values into each new approach box (Block 340), the iterative building of the database query (Block 350), and reactivation/revision of predecessor approach boxes (Blocks 355, 360, 340) may continue as described above until such time that building of the revised database query completes with the entry of a value in the Level 1 Approach Box ($A_1$) (Block 325). The Orbit Form module 105 may then execute the modified query (e.g., SQL script comprising the combined filters of all approach boxes) as built (Block 370) to create the working data set.

At Block 380, results retrieved from the executed query may be displayed in a results page that may be formatted as specified by, for example, and without limitation, any display parameters communicated in the call. Also, the Orbit Form module 105 may equip the user to enter values into the Paging Box to filter results drawn from the working data set (Blocks 385, 386), as described above, and/or select various display fools to modify display of or otherwise manipulate data from the results page (Block 387). For example, and without limitation, an expansion tool may allow the user to request that data from a particular results line be expanded to display all available information from that value (Block 390). Also for example, and without limitation, the user may operate a collection bin to temporarily store a copy of selected results line(s) for sharing outside of the system 100 (Block 390).

In one embodiment of the present invention, the user may close the results page and return to the approach boxes, which may be modified as described above to alter the search and/or retrieval of working data from the target database. More specifically, from the results page, the user may operate the Orbit Form module 105 to return to the approach boxes (Block 395) for the purpose of reactivating (Block 360) and revising (Blocks 340, 350, 355) any or all of the values in those approach boxes and spawning a revised query (Block 370). Alternatively, the user may elect to leave the Orbit Form module 105 altogether; and return to the Launch Form module 104 (Block 399) where the user may elect to save the call (Block 235) that led to the most recent results drop on the Orbit Form or, instead, to process another call (Block 295) For example, and without limitation, at Block 235 the user may elect to save a changed call either by overwriting the previous version of the call or, alternatively, by leaving the existing version of the call unchanged and saving the changed version as a new additional call in the hanger within the data store 103.

Figure 4:
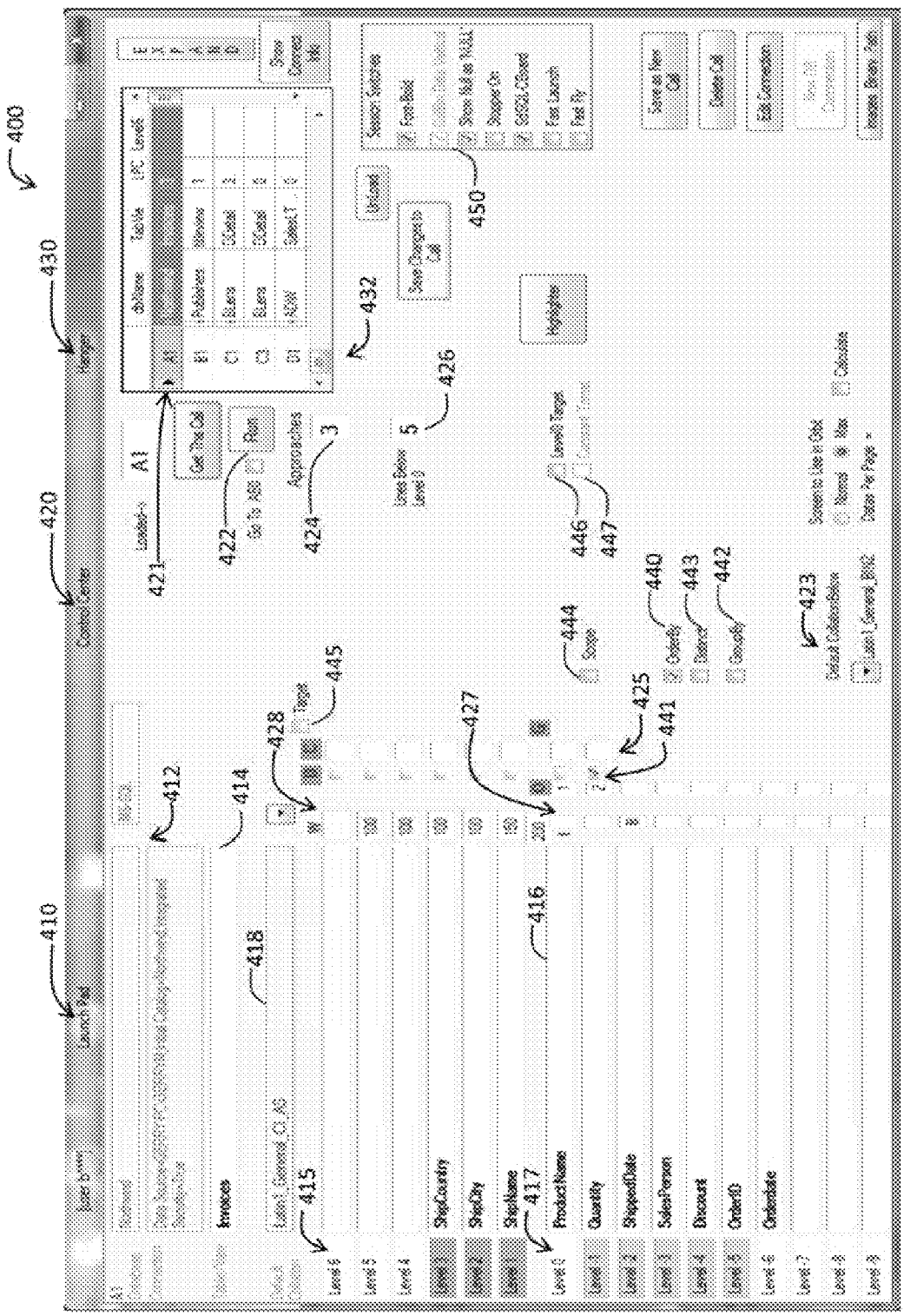
FIG. 4 is a diagram illustrating an exemplary Launch Form of a database interface created using the DBICS of FIG. 1.

For example, and without limitation, FIG. 4 illustrates one embodiment of a system interface created by the Launch Form module 104 and configured to implement a Launch form 400 to support user input of call details into the system 100 as described above. Definitions of terms used in the context of the present invention are as follows:

'Database Connection String' 412—Refers to an identifier that may be interpreted by a computer program to provide an address for a source database from which data may be retrieved using the present invention. In the present example, a target database is identified as 'Northwind" 412.

'Table/view' 414—Refers to an object within the target database that may comprise one or more records (also referred to as 'data object').

'Filter' 415, 417—Refers to a user-specified (e.g., nominated) field within the target database, the stored values within which may be used as index variables when querying the target database (also referred to as 'Approach Filter').

'Above the line' 415 —Refers to a sequence of filters that may be selected by a user to operate in combination to trigger a query of the target database. For example, and without limitation, the available filters in Launch form 400 are shown as Levels 1 through 6 in FIG. 4.

'Level 0' 416—Refers to the filter than may fee specified by the user as the trigger for querying the target database for results (either alone or in combination with optional Above the line filters).

'DaP'—Refers to the user-specified data for a single record that may be retrieved from the database and displayed in a single results page that may be characterized by a user-defined output format.

'Below the line' 417—Refers to the Level 0 field 418 and any other results line fields m a sequence for which values may be identified for display as output (e.g., in each DaP).

'Call' 421—Refers to a grouping of user-selected settings (also called 'parameters') that may determine content of a database query, presentation of filtering values, and formatting of a display of query results.

'Run' 422—Refers to passing to the Orbit Form module 105 a call 421 populated with query option parameters to govern retrieval of data from the target database, nomination option parameters to govern presentation of filter values, and display parameters to govern formatting of results pages.

In one embodiment, access to the Launch form 400 may be controlled by the system 100 through user ID and password enforcement System 100 access controls may allow generation and execution of SQLs that are query only (for example, and without limitation, when in the interest of data protection there is a need to restrict a user to accessing only Calls as set up for the user by an authorized system 100 manager). Once accessed, the Launch form 400 may present a set of interactive data entry boxes that may be used to gather the input necessary to generate a Call.

For example, and without limitation, the Launch form 400 may contain an interactive and visible container, referred to as a hanger 430, for presenting one or more stored calls which may be selected by the end user for execution. Each stored call may appear as a row in the hangar 430. The user may load appropriate input values from a stored call onto a Launch Pad 410 by clicking on the call reference code for the desired call, which may be located in the first leftmost column 432 of the hangar 430. For example, and without limitation, the Launch Pad 410 may present at a plurality of data entry fields related to database access specifics, including a database connection string 412, an object of interest (e.g. table/view) 414, and at least one call parameter (e.g., filters 415, 417) directed to database fields (e.g., columns) that are of interest to the user.

Also for example, and without limitation, the Launch form 400 may contain at least one Control Center 420 which may present data entry and/or selection boxes for editing and preparing a call that is on the Launch Pad 410. In another embodiment, a control center 420 may present data entry and/or selection boxes which may, in turn, activate more data entry and/or selection boxes in the Launch Pad for creating new calls and servicing the hanger 430. For example, and without limitation, selection of a call from the available calls present in the hangar 430 may cause some number of values parsed from the selected call to be used to populate the data entry fields in one or more of the Launch Pad 410 and the Control Center 420. The following data entry fields may be supported by the Control Center 420 for the capture of parameters to be used to populate a call:

'Approaches' 424—This setting may allow a user to enter the number of Above the line filters desired for database query purposes.

'Lines Below Level 0' 426—This setting may allow the user to enter the number of fields for which results may appear in the DaP.

'Default Collations'—This setting may allow the user to select an output collation preference to be used as a default (e.g., one default collation 418 for Above the line and one default collation 423 for Below the line). For example, and without limitation, upon first setting up a database connection, both collation options may set 'CI_AS' (meaning "case-insensitive, accent sensitive") as the default. Also for example, and without limitation, a user may override these defaults by clicking the adjacent drop down box 425 and selecting an alternative.

'W(dth)' 428—This setting may allow the user to specify, for fields Above The Line 415, the width of the approach boxes to be generated by the Orbit form (as described below); and to specify, for Level 0 418, the width of each results box (e.g., DaP) in the Orbit form. As shown in FIG. 4, for example, and without limitation, Width 428 may default to 100 when left blank. Also for example, and without limitation, when a user specifies at Width 428 a width of less than 21, a system-enforced minimum width may be set as 21.

'F(ormat)' 427—This setting may allow the user to enter a format of data to be returned in tie associated results Held and to be displayed in the DaP. For example, and without limitation, supported formats may include Numeric and Date/Time types. For Numerics, the user may specify a numeral between 0 and 9 to request that the specified number of decimals be displayed in the result. The ',' definer may also be included in the display (e.g., a format setting of '2' may show a valid result as 3,456.29). For Date/Time, the user may specify the control string 'B' to request disposal of the time part of a Date column. Milliseconds may not shown by default, but if the user specifies 'C' as the control string, milliseconds may show if present.

'O(rderBy)' 440—This setting may allow the user to enter an Order By sequence. If the entry boxes are not visible, the user may click the 'OrderBy' checkbox 440 to activate. OrderBy may only be relevant to Below the Line, and when this option is activated for a given field, the optional D(escending) and C(ollation) override boxes may be activated.

'D(escending)' 441—This setting may allow the user to specify that displayed values for a filter or results line start with the highest value (for the Collation). For example, and without limitation, this specification may apply both Above the line and Below the line.

'C(ollation)' 425—This setting may allow the user to specify a Collation other than the Default Collation to apply to that level. For example, and without limitation, this specification may apply both Above the line and Below the line when OrderBy 441 and/or Groupby 442 are selected for a given Level (see below). Clicking in a box 425 may cause the Collation data entry box to appear, ready to receive a Collation number. For example, and without limitation, a collation choice may apply to text/string data, and may automatically be ignored by the Orbit Form if the level is not of that type.

'G(roupBy)' 442—This setting may allow the user to specify a sequence for a Group By clause to apply to the DaPs. If the boxes are not visible, the user may click the 'GroupBy' checkbox 442 to activate them. When GroupBy is activated, a Having Clause option may appear which in turn, when checked, may open a text box to prompt for the text of the clause that may follow the word Having in a SQL statement. For example, and without limitation, if a text column is used in the Having text, that text may need to be accompanied with a Collation statement consistent with the Collation used in that Level (e.g.—Salesperson Collate Latin 1_General_CS_AS='Andrew Brown').

'Distinct' 443—This setting may allow the user to specify that the data at Level 0 and below be unique.

'Scope' 444—Checking this box may cause a text box to activate that may allow the user to specify a WHERE type clause to apply Below the line. For example, and without limitation, the specified text may omit the word 'WHERE,' but otherwise may use SQL syntax and rules in phrasing the entry.

'Target' 445—Checking this box may cause a series of text boxes to activate that may allow the user to specify preset filter values (e.g., landing destinations) at each Approach box on the Orbit form (described below) or to use an Approach box as a search and find. For example, and without limitation, the entry in the text boxes may be partial as a prompt to the Orbit form to find the nearest match.

'Level0 Target' 446—Checking this box may cause a Level 0 target box to activate that may allow the user to specify the Level 0 target to show on the Orbit form. For example, and without limitation, the entry in the Level 0 target box may be partial as a prompt to the Orbit form to find the nearest match.

'Constant Target' 447—Checking the Level0 Target may cause a constant target checkbox to be enabled. Checking this box may cause the Level 0 target to be constant throughout the browse rather than only during the first landing.

'Screen to use' 790—This setting may allow the user to select the screen size for the Orbit Form (described below). For example, and without limitation, the system-provided screen options may include either Normal or Maximum, where the latter may operate the Orbit form in maximized screen size so as to enable more DaPs to show on the drop down page.

'Session switches" 450 may be implemented as on/off switches which may be turned on or off at any time during system 100 operation. For example, and without limitation, turning on each of the switches below may produce the following effect.

Font Bold—This setting may allow the user to specify the text in Level boxes change to bold. For example, and without limitation, this option may deliver better definition, but may be at the expense of long entries that may limit what the user may see to the right without scrolling.

Show Null as 'NULL'—This setting may allow the user to specify that nulls show as "NULL" rather than (default) blank. For example, and without limitation, this option may only apply to the DaPs.

Stopper On—This setting may allow the user to specify that on halts in available filter data, approach box activation may automatically advance to the next/return to the preceding approach box in the user-specified sequence. For example, and without limitation, this option may apply when operating the Approaches Boxes and the AB0 box with the Down/Up (Dn/Up) arrows.

Fast Launch—This setting may allow the user to specify that some of the built-in tests (both pre-execution and during execution of a call) be skipped to allow launching to complete faster for calls, particularly when made to larger databases with OrderBy/GroupBy run parameters. For example, and without limitation, this option may mean that a run may fall at the drop down stage, after which the user may be returned safely to the Launch Form and prompted to try again with Fast Launch turned off.

Fast Fly—This setting may allow the user to specify that the information figure not be shown for the number of records for the value in the active approach box (more specifically, not to show the total number of records for the filter combination defined at each point including the browsed values, as described below for FIG. 32). For example, and without limitation, the result of this selection may be that a call when run will activate the first approach box quicker end operate a lot quicker among the user-specified sequence of Approach Boxes. Although the computation speed difference may not be significant for small tables/views (e.g., up to 200,000 records), the speed difference may be significant when working with larger tables/views.

Figure 5:
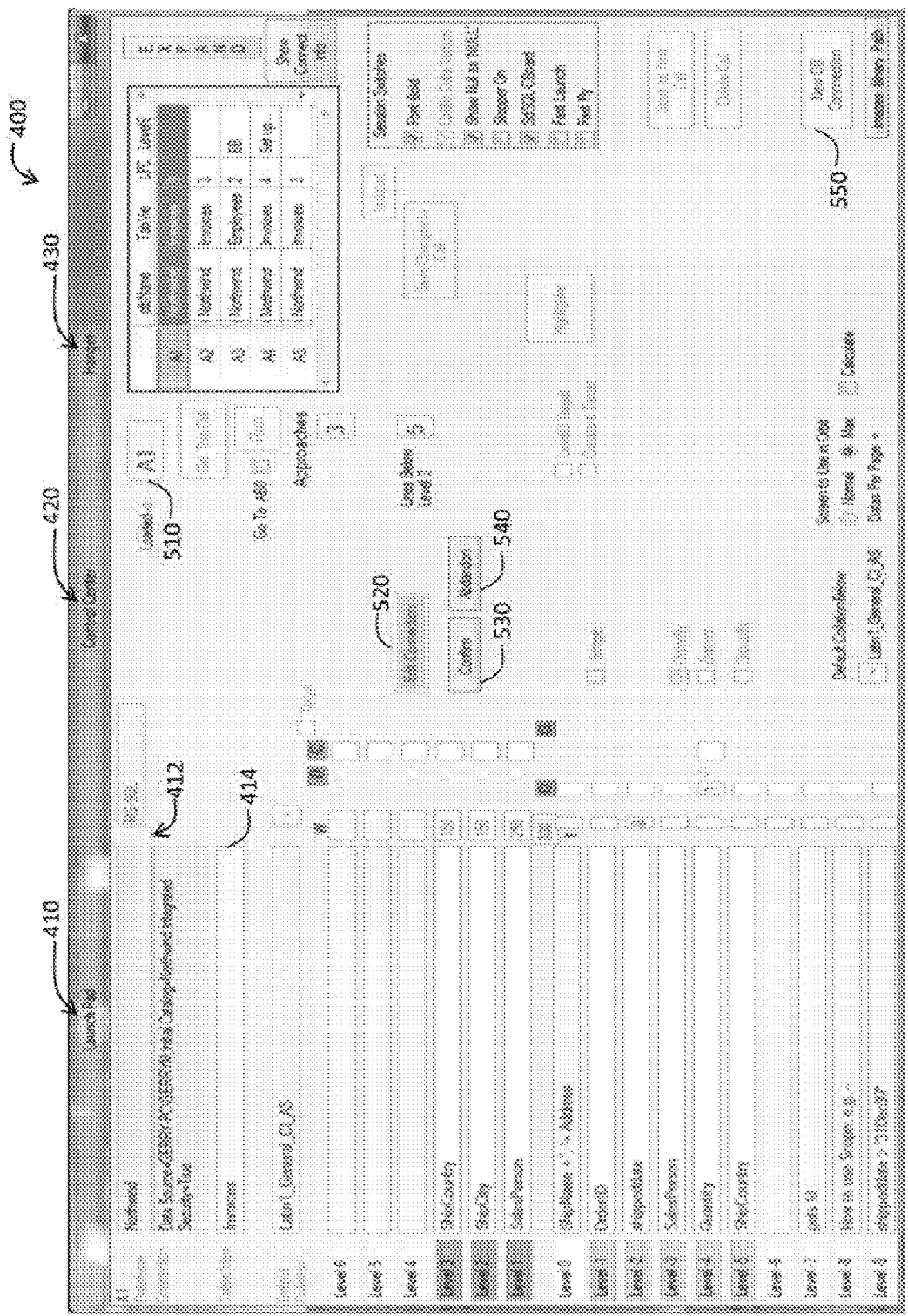
FIG. 5 is a diagram illustrating another exemplary Launch Form of a database interface created using the DBICS of FIG. 1.

Continuing to refer to FIGS. 1, 2, and 3, and referring additionally to FIG. 5, a process for setting and testing database connections, according to an embodiment of the present invention, will now be discussed. As described above, after a user has clicked a call in the hanger 430 (FIG. 5 illustrating the Loaded call 510 as A1), the call parameters may be extracted from the previously coded and saved criteria for that call and may be automatically populated and displayed on the Launch Pad 410 of the Launch form 400.

For example, and without limitation, the process detailed below may apply any time a user may opt to change the connection string for any database or data source connection 412 parsed from a call selected from the Hanger 430. As illustrated in FIG. 5, a user may load a simple 'Northwind' Call 412 such as the basic example in A1 and may press the Edit Connection button 520. In the illustration of FIG. 5, the Edit Connection button 520 may move from the lower right part of the launch form 400 to the middle top location, and the Database name and the Connection 412 may be highlighted For example, and without limitation, most of the other fields on the Launch form 400 may be locked until the database change operation is completed. At any time, the user may abandon this operation by pressing the Abandon option 540, and the database and connection 412 may revert back to the most recent values for those data entry boxes.

Using the highlighted database and connection 412 data entry boxes, the user may enter a short name or short reference. As illustrated in the example of FIG. 5, the change may be manually entered in the following form:

"Data Source="your Server-Connection";Initial Catalogue-Northwind;

"Integrated Security=True"

Alternatively, the database reference may be copied from another source and pasted to the top left edge of the Connection Box 412. Connection strings may demand absolutely corrected spacing in the text, so the user may take care to position the desired string on one line before copying. The pasted string may then correctly fit in the multiline box 412. The user may insert "Data Source=" at the start of the connection box 412 if that string is not included in the copy of the string before pasting. When the paste is done, the user may press Confirm 530, after which the Launch Form module 104 may prompt the user to approve the execution of a Connection test. For example, and without limitation, processing control may be passed to the Orbit Form module 105 to carry out the Connection test. If the connection test is successful control may be returned to the Launch form module 104 Upon user approval to proceed with the connection as tested and confirmed, the operation may terminate, the Edit Connection Test button 520 may return to a location in the bottom right area of the Launch form, and other data entry boxes may again be enabled.

Continuing to refer to FIG. 5, when a Connection String 412 is changed, the change may apply to ail the Calls that use that Database Name or short name 412. The user need only change the connection string 412 once, after which any one of the calls that use the string 412 may be applied by the system 100 to all the calls that use that database string 412. Similarly, if the database name 412 itself is changed here, the change may apply to all the calls that used the previously specified database name.

If the connection test fails, the user may be prompted with the message " . . . !! Connection Failed." In this instance, the user may edit the Connection string 412 and try again. If the user cannot get the test to succeed, the user may elect to Abandon 540 the change. If the connection test succeeds, but the user nonetheless receives a failure message, the problem may be that the specified target is a different database or a different instance of the database where the data object (e.g. TabVie) or the columns in the data object are different than expected. In this eventuality, the user may opt to set up a New Database Connection using the New DB Connection 550 and entering a different database short name 412 when prompted. The user may troubleshoot connectivity by temporarily changing the TabVie to one that is known to exist, entering '0' for both the Approaches 424 and Lines to Show 428 boxes, and entering no other run parameters such as OrderBy or otherwise. Because the database being accessed may be unfamiliar to the user, the user may put a constant like 'A' as the value at Level 0 (see, for example, FIG. 6 at field 616). (Note: Nominations at any level, as exemplified in the Level 0 field at 418 of FIG. 4, also may include any valid column name that may define a valid database column. Nominations at any level, as exemplified in the Level 0 field at 599 of FIG. 5 and at Level 2 field of FIG. 7, also may include any combination of columns that may define a valid database column. Nominations at any level, as exemplified in the Level −3 field at 499 of FIG. 7 and in the Level 1 Field of FIG. 19, also may include any SQL function of the nominated column that may define a valid database column, or of combinations of columns. Nominations at Level 0 and Levels below Level 0 may include an SQL aggregate function, which may perform an evaluation of all the rows in the table for the nominated columns, as exemplified in FIG. 34 by the Sum aggregate function at Level −2 and the Count aggregate function at Level −3).

Figure 6:
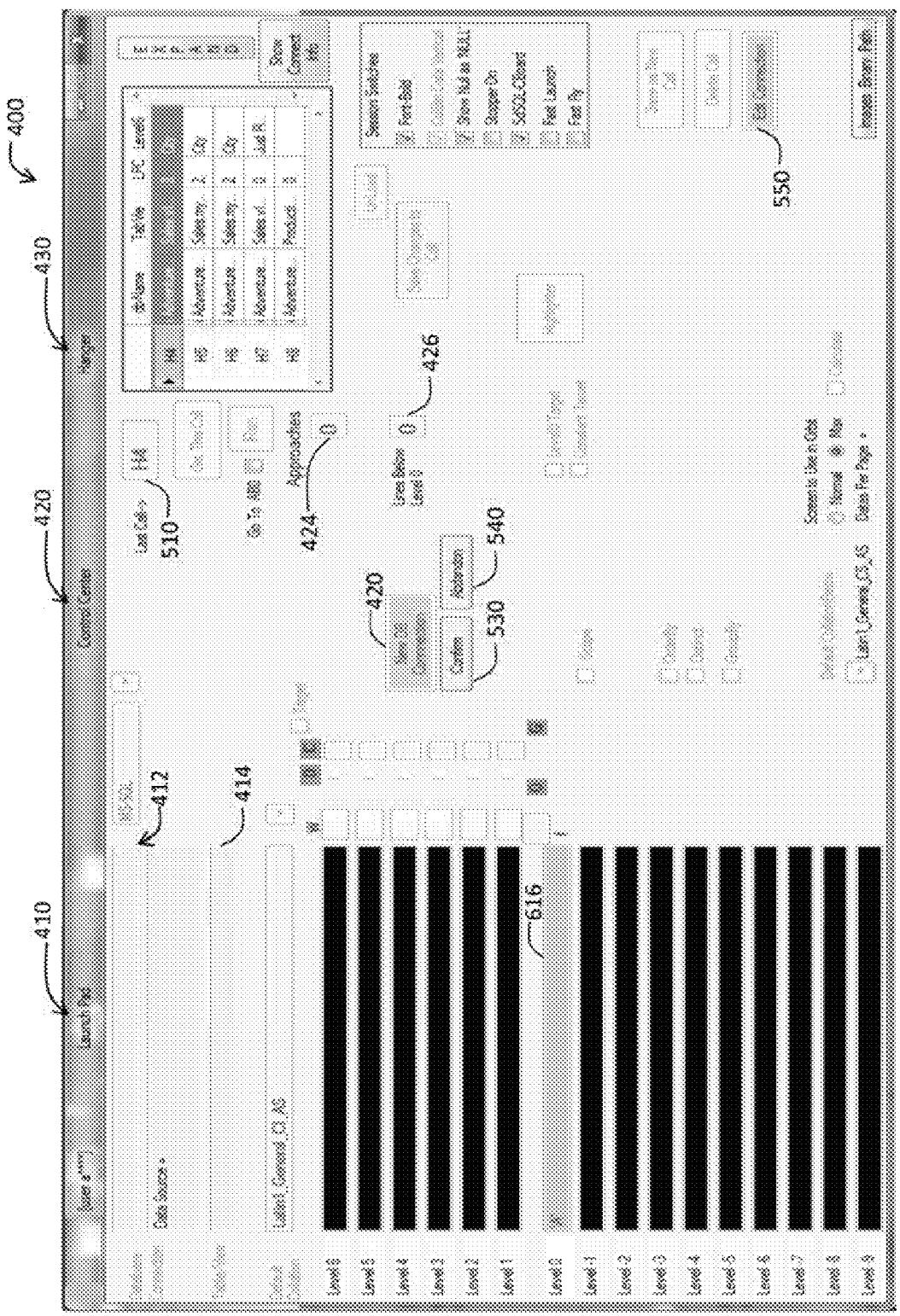
FIG. 6 is a diagram illustrating another exemplary Launch Form of a database interface created using the DBICS of FIG. 1.

Continuing to refer to FIGS. 1, 3, and referring additionally to FIG. 6, a process for setting up new database connections, according to an embodiment of the present invention, will now be discussed. Before the user may set up a New DB Connection 550, the Launch Pad 410 must be empty. The user may press unload to clear any existing call from the Launch form 400, and may result in an empty Launch Pad 410 and the New DB Connection button 550 being enabled. Pressing the Edit Connection button 520 for the enabled New DB Connection 550 again may result in the relevant boxes showing as highlighted, while all other boxes may be locked/frozen.

The following data entry fields may be pertinent to the process of establishing and maintaining data connectivity with a target database:

'Database name' 412—This setting may allow the user to enter the name or short name by which the system 100 may identify a target database.

'Connection string' 412—This setting may present a blank entry box to the user. As in the Edit Connection process described above, the user may enter or paste in the desired Connection String beginning "Data Source=".

'TabVie' 414—This setting may allow the user to enter any Table or View (e.g., data object) within a database For example, and without limitation, the user need not know what the target table contents are at this point because, as illustrated in the Launch Pad 410 pre-set, the Approach Value 424 may be set to '0' (to remove all but the Level 0 filter 416) and Level 0 may be set for simple constant 'A' 616.

As described above for the Edit Connection scenario, the user may at this point confirm 530 and may respond affirmatively to the system prompt to Test the Connection. In case of a failure, one of the following two fail messages may appear:

1) " . . . !! Connection Failed . . . "—This message may signal that the connection string failed, or 2) " . . . Unable to find the Table/View '<nominated value>' in the database . . . "—This message may signal that the connection itself was successful, but the desired table or view was not found within the target database.

If the user receives either of these messages, the user may troubleshoot by checking the Launch form 400 entries. If the test succeeds, then the Orbit Form module 105 may engage and display the DaP for the constant 'A' 818, signifying that the parameters collected by the Launch form 400 are valid. The user may then Exit (close) both the Orbit Form (see below) and the Launch Form 400 after responding affirmatively to a prompt "Passed Connection & Data Test. Set up a Call?". For example, and without limitation, the user may answer affirmatively to this message and the launch Form module 104 may give the new call a reference number using the next available letter and number (e.g. C1).

At this point in the process, all the entry boxes on the Launch Pad 410 may be unlocked, and the user may be presented with a call characterized by Approaches 424 of 0, Lines to Show 428 of 0, and a constant 'A' for Level 0 itself 616, from which the user may create a call using the actual columns in the targeted TabVie 414 (which, of course, the user may change as well). The user may also engage levels for Above the Line, and execute and test the call with these variables added, too.

Figure 2:
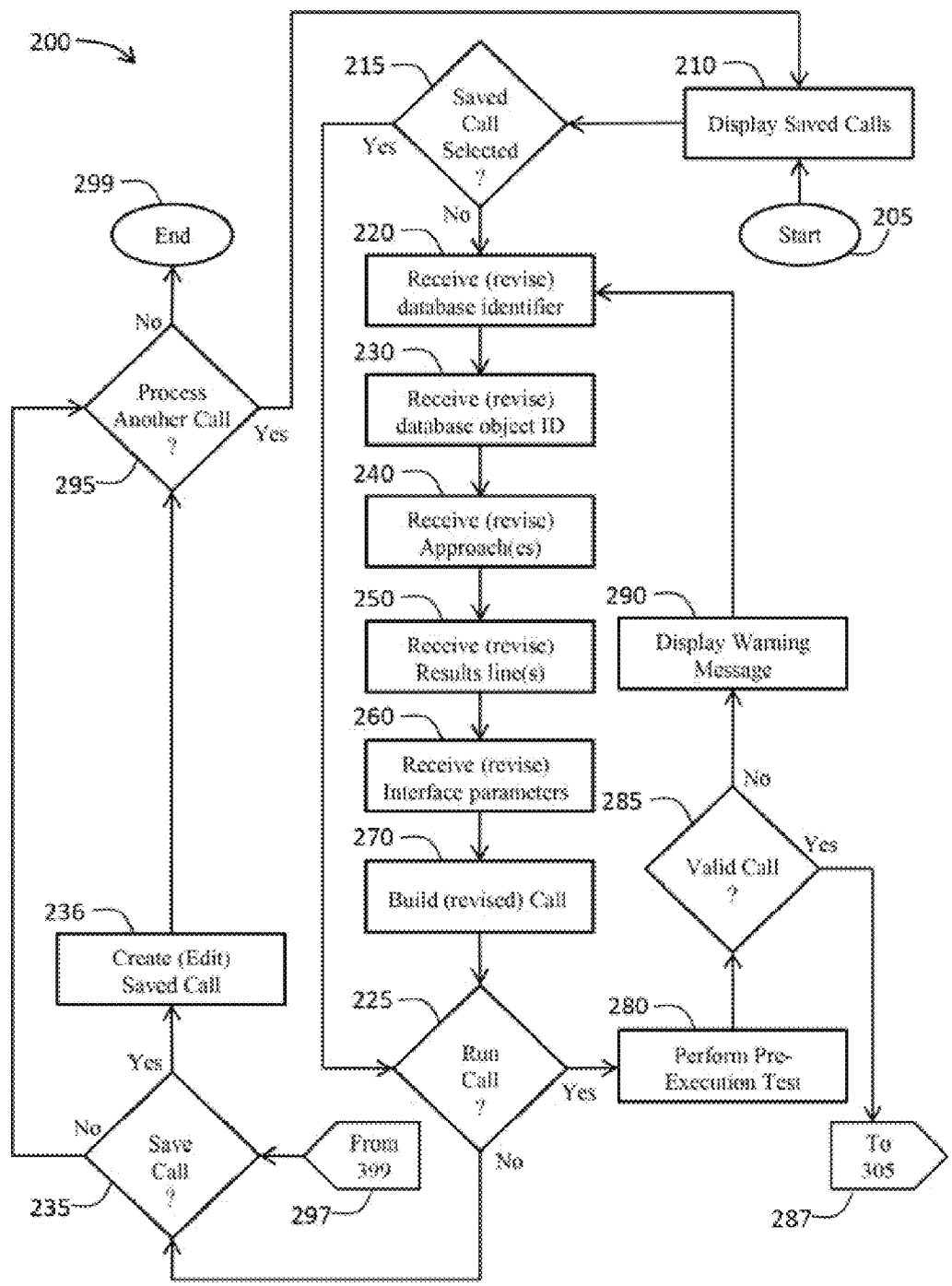
FIG. 2 is a flow chart illustrating a method of operating a Launch Form of a database interface created using the DBICS of FIG. 1.
Figure 3:
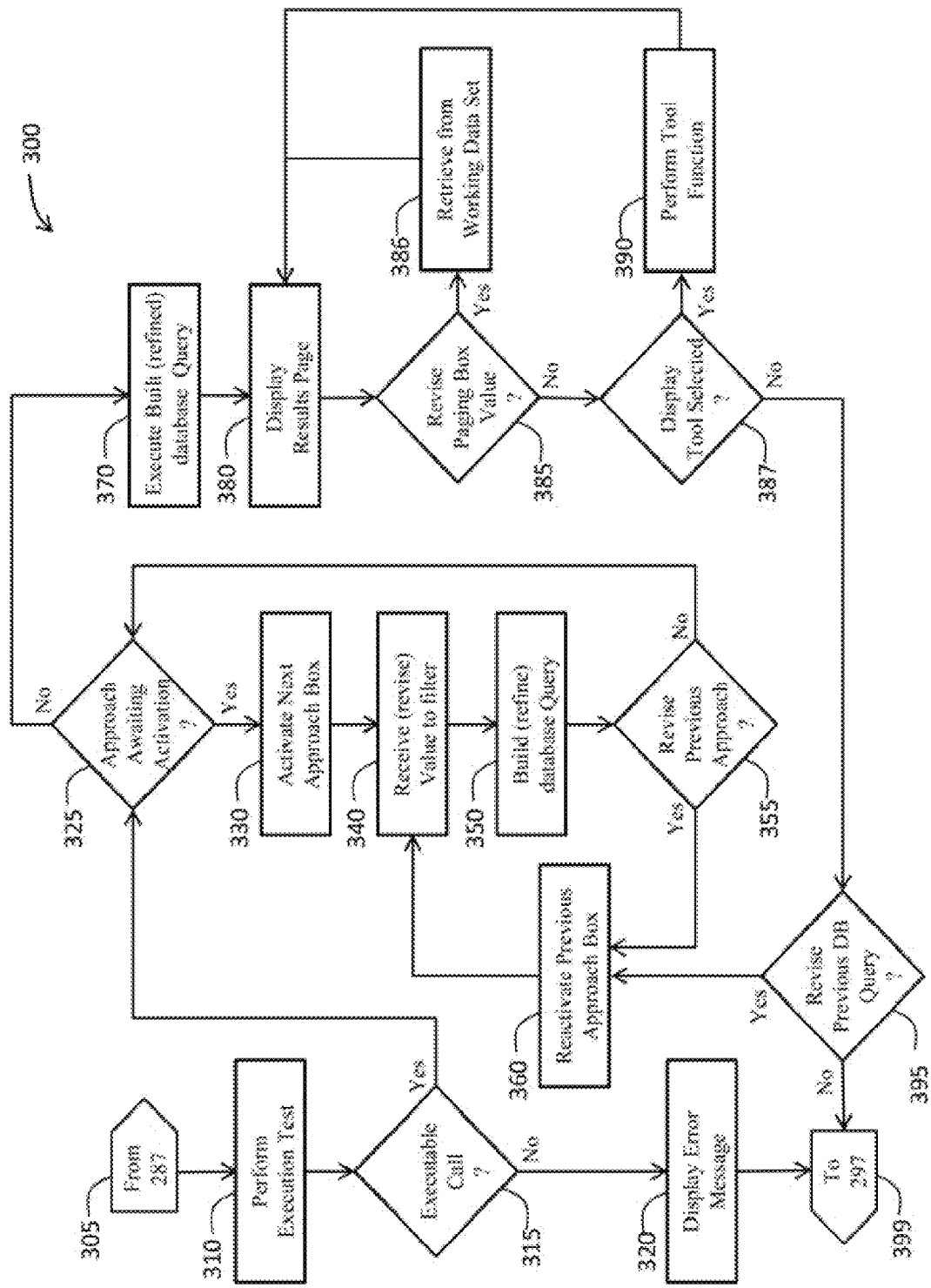
FIG. 3 is a flow chart illustrating a method of operating an Orbit Form of a database interface created using the DBICS of FIG. 1.
Figure 7:
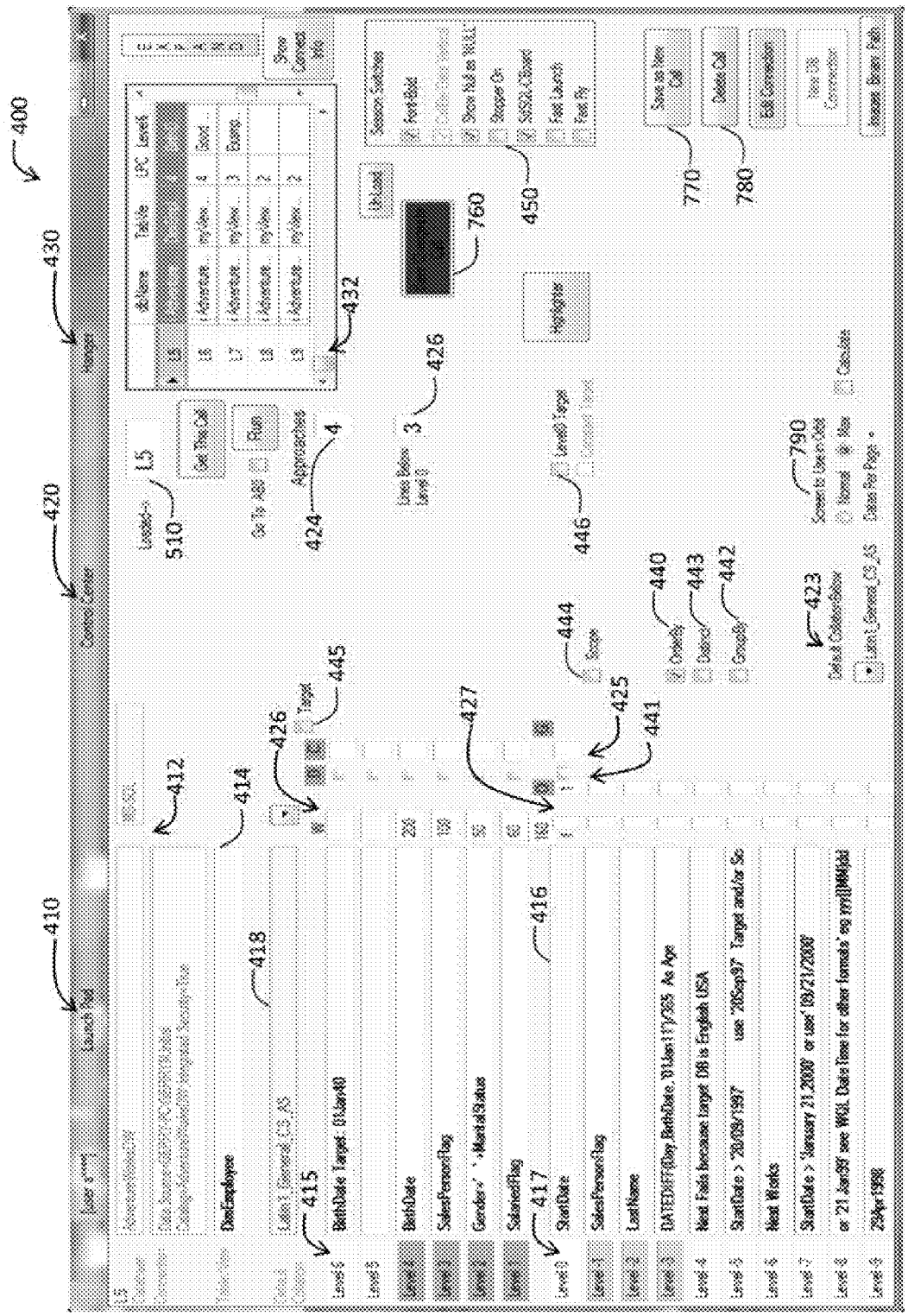
FIG. 7 is a diagram illustrating another exemplary Launch Form of a database interface created using the DBICS of FIG. 1.

Continuing to refer to FIGS. 1, 2, and 3, and referring additionally to FIG. 7, a process for saving and deleting a call, according to an embodiment of the present invention, wilt now be discussed. For example, and without limitation, FIG. 7 shows a sample call on the Launch Pad 410 that represents a work-in-progress that the user may elect to save for further editing at another time in the future. Once the call is loaded 510, the Save Changes to Call button 760 may be enabled. Before the user opts to unload the present call or to select another call, the user may Save Changes to Call 760. As a consequence, the call, as it is displayed on the Launch form 400. may be saved for a future editing session. Whenever text, checks, or any user-driven selections may be changed on the Launch form 400, the Save Changes to Call button 780 may turn to highlighted to alert the user of the need to and/or option to save.

For example, and without limitation, a save operation may store all the entries in the TabVie 414 and the Level Boxes 415, 417 down from top to bottom; the Default Collations 418, 423; the values in the Approaches 424, and Lines Below Level 0 426; all the entries in the Formatter 427, OrderBy 440, Descending 441, Collation 425, GroupBy 442 checkboxes and value boxes, and the Distinct option 443. Also for example, and without limitation, the save operation may not save the last entries, if any, in the Target Boxes 445, Level 0 Target box 346, and Scope Box 444 and Having Boxes.

To summarize, if the user unloads a call or clicks another call to load (which may automatically unload any current call on the Launch Pad 400) without having first clicked Save Changes to Call 760, any changes made on the Launch form 400 may not be saved and the next time the user loads that call, the call may appear in the version most recently saved prior to the abandoned edit session. If at any time the user clicks Save Changes to Call 760, then the call details may be saved as displayed and may present the saved edits the next time the subject call is clicked to load the Launch Pad 410. If at any time the user clicks the Save as New Call button 770, the subject call may be saved as a new call and renumbered.

For example, and without limitation, to remove a call from the Hanger, the user may first Load the call 510 on the Launch Fad 410, and then press Delete Call 780 and confirm the operation when prompted by the system 100. The call may then disappear from both the Hanger 430 and the Launch Pad 410. Also, for example, and without limitation, the Screen Size 790 to use with the Orbit Form (see below), and the Session Switches 450, may be saved when the user exits the system 100, and values may be retained for the next time the user executes the system 100.

Figure 8:
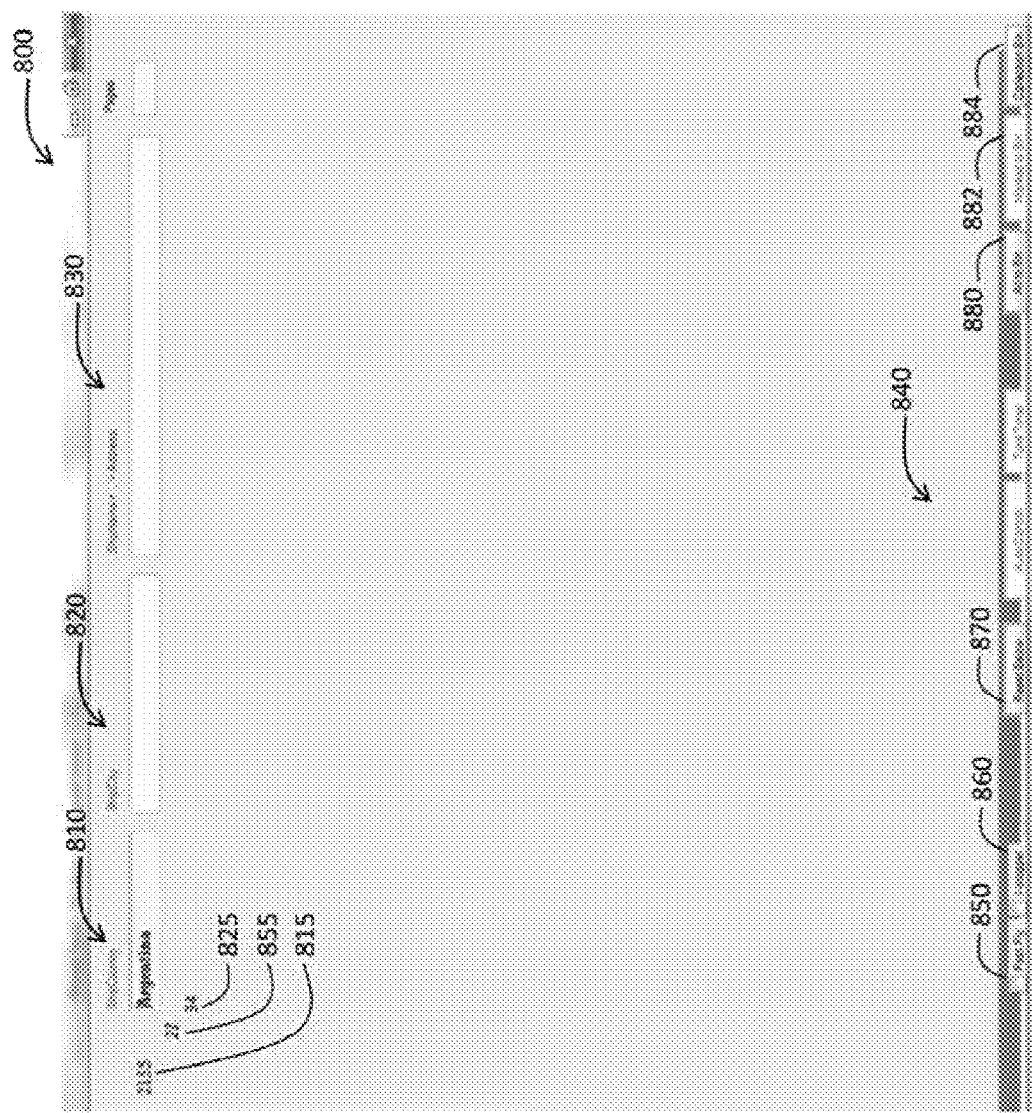
FIG. 8 is a diagram illustrating an exemplary Orbit Form of a database interface created using the DBICS of FIG. 1.

For example, and without limitation, FIG. 8 illustrates one embodiment of a system interface created by the Orbit Form module 105 and configured to implement an Orbit form 800 to format, display, and manipulate database query results using the system 100 as described above. More specifically, in one embodiment of the present invention, using the end user client 110 to select a Run command on the Launch form 400 may activate the Orbit form 800, which may be operated by the Orbit Form module 105. For example, and without limitation, the Orbit form 800 may be used by the end user to browse and search the database for values retrieved from the database fields that match the field names entered (also referred to as "nominated") as filter fields on the Launch Form. More specifically, the Orbit form 800 may empower the end user to index through the retrieved data using differing values for the database fields specified on the Launch form 400 as filter fields, and to do so repeatedly with without returning to the Launch form.

For example, and without limitation, the processor 102 on the interface server 101 may receive from the end user client 110 at least one command to execute the Orbit Form Module 105 to visually operate like the letter "Z" to guide user input meaning that the user may manipulate the database through the nominated filters along the top of the Z (e.g., the Approach Boxes) and then may drop below the filters the requested data in an immediately meaningful, visually-friendly display. To do so, the Orbit form 800 may check and pass the user's nominations, create required array bundles to enable the Orbit Form 800 technology to automatically query the database for the data, and facilitate the user continually and seamlessly navigating, browsing, searching and displaying results without returning to the Launch Form 400.

For example, and without limitation, the Orbit Form 800 may be displayed either in a 'normal' size, such as 11 inches across by 5.25 inches down, or a maximum Size (e.g., use the total screen size of whatever monitor is primary to maximize the record data displayed per drop down results page). Also for example, and without limitation, the Orbit Form 800 may be reset any or all of the display fields and their parameters without returning to the Launch form 400, may set navigational controls, may engage a fuller view of an individual display, and may copy in either a selective or systematic way data from the display page of the Orbit form

800 to a collection bin for subsequent use after the system is exited. An optional highlighter may be engaged and used to highlight those records on the display page that meet predefined criteria. These and other features are described in more detail below.

Definitions of terms used in the context of the present invention are as follows:

'Approach Box' (also referred to as an 'Aboxn', where more than one Approach Box is uniquely identified by an Approach Box numbered 'n')—Refers to a system-generated, interactive data entry field. Approach Boxes number one each for a respective Above The Line filter.

'Above the line'—As described above, refers to Level 1 to 6 filters for which a respective ABox may be generated.

'Below the Line'—As described above, refers to Level 0 and lower (e.g., DaP).

'Results Drop'—Refers to generation and publishing of values retrieved from the target database into DaPs in the results area of the Orbit Form.

'Results Page'—Refers to the section of the Orbit Form 800 where the DaPs are displayed.

'DaP'—As described above, refers to the data containing the Below the Line information requested of the database, and displayed in each dropdown box as published on the Results Page.

'Run'—Refers to creation and execution of SQL scripts containing parameters parsed from a call 421 (e.g., query option parameters to govern retrieval of data from the target database, nomination option parameters to govern presentation of filter values, and display parameters to govern formatting of results pages).

'AB0' (also referred to as 'Paging Box')—Refers to the rightmost Approach box, which may be activated after successful data entry into the Level 1 approach box, if any, and which may trigger a results drop.

'Red Message'—Refers to messages that may be flashed to the user to advise the user that the end/top of the file has been reached, that the value asked for was not found, or similar informational message. For example, and without limitation, these messages may not halt the system and may automatically disappear with the next key stoke by the user.

Continuing to refer to FIGS. 1, 3, and 8, use of the Orbit form module 105 to operate an Orbit Form 800, according to an embodiment of the present invention, will now be discussed. Operational control of the system 100 may transfer from the Launch form 400 to the Orbit form 800, as described above, in response to the Run button being clicked. For example, and without limitation, assuming Launch form 400 input as shown in FIG. 4, the Orbit Form module 105 may take control by spawning a process to parse parameters from the Call Set directed to database 412 "Northwind."

The Orbit form BOO may use the end user client 110 to present to the user at least one Approach box 810, 820, 830 for each Above the Line filter specified by the user, and labeled with the database field name associated with each Above the line filter. When the user enters proper responses into each of the available Approach boxes, the Orbit form 800 may retrieve data from the database that is determined to match the selection conditions specified using the responses in the Approach boxes, and may display the retrieved data into a results page comprising at least one DaP for each matching record.

For example, and without limitation, user navigation through Orbit form 800 functionality may be categorized under four distinct headings:

(a) Navigating back and forth through the Approach Boxes.

(b) Navigating inside an Approach Box.

(c) Using the controls in the tool box along the bottom of Form (d) Navigating in the Results Page and in the DaPs In one embodiment of the present invention, as illustrated in FIG. 8, Orbit form 800 may allow the user to navigate back and forth through the Approach Boxes. More specifically, activation of the Orbit Form 800 may present to the user the first 810 of the three (3) Approach Boxes (ABox3) for the passed-in call. The system 800 may display (and dynamically update) total records information figures relating to values retrieved from the data set and displayed in the Approach Boxes. More specifically, as a respective filter value appears within each of the Approach Boxes when a particular box is first entered and given control, and (optionally) browsed by a user, the Orbit form 800 may automatically update the total records information figures. For example, and without limitation, the form 800 may display directly to the left of the first Approach Box 810 a total number of records 815 for this first filter. As illustrated in FIG. 8, the exemplary total number of records 815 in the data set is 2155. Also for example, and without limitation, the form 800 may display, immediately below and to the left of the first Approach Box 810, a total number of unique values 855 in the filter combination defined at that point, as described in more detail below for FIG. 32. In the example illustrated in FIG. 8, the total number of unique values 855 in the data set such that ShipCountry="Argentina") is 21. The form 800 also may display, immediately below the number of unique values 855 and directly under a left cell margin of the Approach box 810, a total number of records 825 for the filter in the first Approach Box 810 and the filter combination at subsequent Approach Boxes (e.g., 820, 830) at that point, as described in more detail below for FIG. 32. In the example illustrated in FIG. 8, the total number of records 825 in the data set of possible ShipCity values associate with ShipCountry="Argentina" is 34.

In the example shown in FIG. 8, ABox3 810 appears prepopulated with the lowest value retrieved from the database showing according to the designated Collation for level 3 (i.e. 'Argentina'). In an alternative embodiment, ABox3 may have been presented to the user with the highest value showing, had Descending been nominated on the Launch form 400 as the OrderBy option.

After populating ABox3 810, the user may choose from four alternative next steps:

1) Pressing 'Home' or Page Down (or using a mouse programmed to simulate either of these) may lead the user through entry of filter values in the remaining ABoxes 820, 830, and culminating in the display of the first page of DaPs in the Results Page (see below). Each DaP may display values retrieved from the database columns that correlate with the Level 0 and Below the Line (Levels −1 to −5) database fields specified by the user.

2) Pressing Arrow Down or Arrow Up may instantly populate ABox3 810 with the next value according to the designated Collation for Level 3.

3) Pressing Enter or Double Click may advance the user into the next box, which may be defined as ABox2 820. Once again, the lowest/highest value may be showing, according to the designated Collation for Level 2 (i.e. the, City, for the Country showing in ABox3 820).

4) Manually entering or partly entering a valid value (e.g. 'Ger'). Pressing Enter or Double Click may cause the system to search for and retrieve from the working data set the nearest whole value after 'Ger,' which, for example, and without limitation, may be 'Germany.' Also for example, and without limitation, the Orbit Form 800 may display to the user a red message signifying that the displayed value is the nearest to his request if the retrieved value satisfies the user's needs, the user may proceed as in option 1) or 3) above. If the retrieved value is not what the user needs, the user may search again, or Arrow Up/Down from that point to browse and find. For example, and without limitation, had the user searched for the text string 'Germany' in full, a direct hit in the database may cause the system to automatically the next Approach Box awaiting activation. Also for example, and without limitation, from the second Approach Box 820 (ABox2), the user may have the same options as those listed above, plus one more; the user may at any time Left Arrow back into ABox3 (i.e. Level 3) 810.

Figure 10:
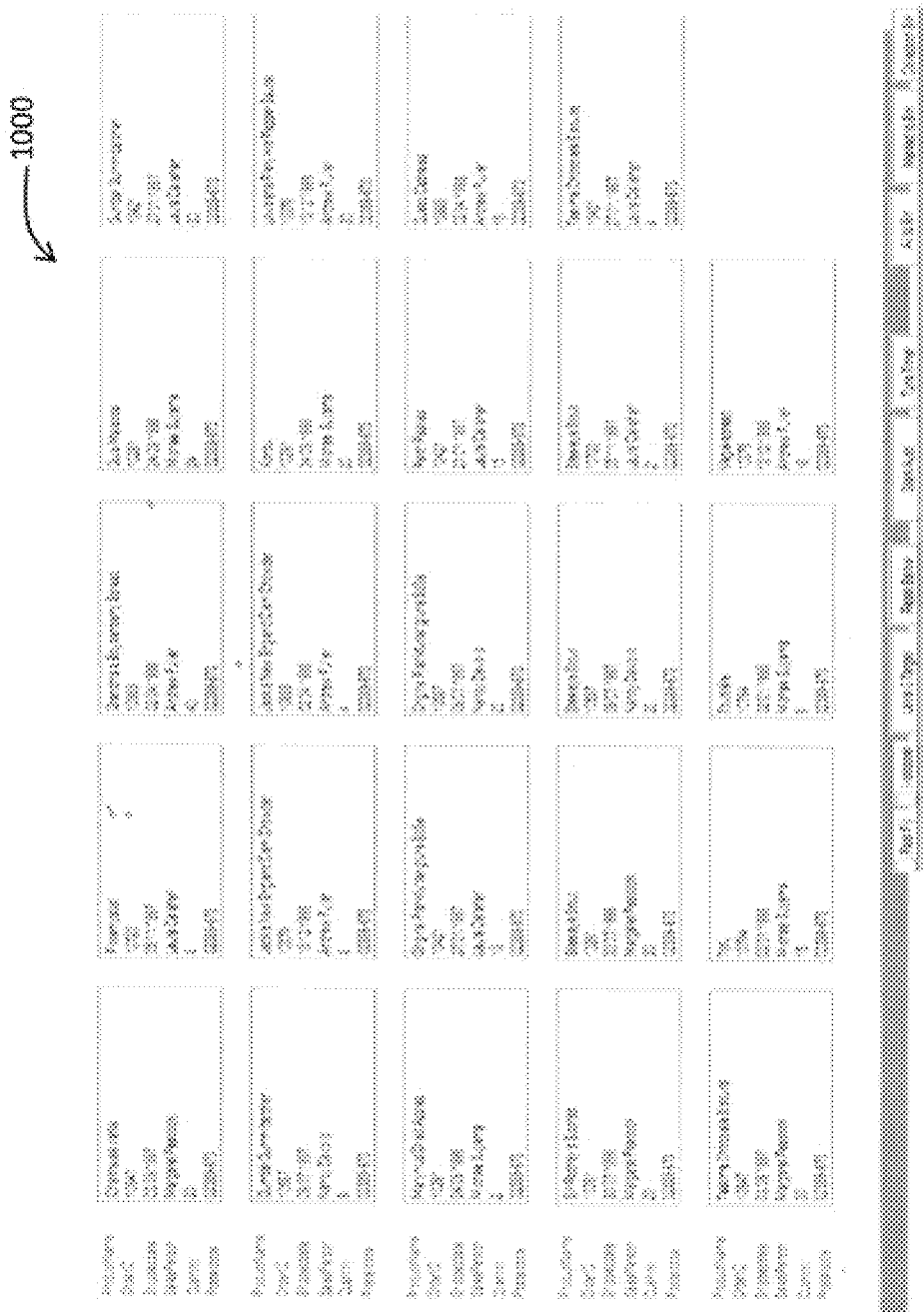
FIG. 10 is a diagram illustrating an exemplary Results Page of another exemplary Orbit Form of a database interface created using the DBICS of FIG. 1.

After the user employs the system's navigation features described above to pass through ABox1 810 and ABox2 820, the Orbit Form 800 may advance to a Paging Box 830 (also identified herein as ABox0 and/or AB0), and may automatically fire the Level 0 to Level −5 Results Drop (see 1000 at FIG. 10). For example, and without limitation, the Results Drop 1000 may comprise the DaPs (records) that have matching values for the preceding ABoxes (filters).

From ABox0, the Orbit Form 800 may advantageously provide the user significant single-keystroke navigation power. For example, and without limitation, without requiring the user leave AB0 830, the user may both spin through the values in the ABoxes 810, 820 across the top of the Z, and may browse the Results Page drop below (see below). Also for example, and without limitation, the user may Left Arrow back to Abox1 820, and so on through the higher Approach boxes (in this case, ABox2 810). which may enable the user to seamlessly reset the Approach values (i.e. filters) in each.

As a matter of convention, distinguishing marking may be employed by the Orbit Form 800 to provide visual indication of the operational state of the Approach boxes 810, 820, 830. For example, and without limitation, a presently active box may be shaded and/or filled with the color yellow. Also for example, and without limitation, Approach boxes to the left of an activated Approach box which may have been passed through by the user may be shaded and/or filled with the color white and locked with the entered value showing Also for example, and without limitation, Approach boxes ahead and to the right of an activated Approach box in the user-defined sequence of Approach boxes may be shaded and/or filled with the color grey and locked. In one embodiment, such pending boxes may be blank unless the call was run with pre-set landing targets, in which case these may be visible in italic font.

Navigating inside an Approach Box may be supported by the Orbit form 800 by allowing the user to enter and edit strings directly into the Approach Boxes 810, 820, 830, or to perform some combination of the search and find operations described above. To support clearing of the whole of an existing entry, the user may press the End key To position the cursor, the user may click at the required point in the desired Approach box. To delete one character to the right at a time, the user may employ the Delete key. To delete one character to the left at a tune, the user may employ the Backspace key. To move a cursor to the right, the user may employ the Forward key. The user may employ the Left arrow to revert back into the previous Approach Box.

For example, and without limitation, the Orbit Form 800 may recognize the lowest value as NULL, and the next lowest value as a Blank (for those data types which allow blanks). In such an implementation, the Orbit Form 800 may return NULL values, if present, as the first values when Ascending these in OrderBy. Conversely, when a level's OrderBy is set to Descending, then NULL values may be the last values presented by the Orbit Form 800.

In another embodiment of the present invention, tool box controls 840 may be made available to the user. For example, and without limitation, such tool box controls 840 may be positioned below the results page near the bottom of the Orbit Form 800. The user may note that some of these tools may affect the navigational actions, both Above the Line and Below the Line.

For example, and without limitation, the following Bottom line toolbar Buttons may be implemented to only show or only be enabled when applicable to the particular call run that is in the Orbit Form 800 and to the processing state of the various Orbit Form sections:

'Show all Images' (see 1610 of FIG. 18): The user may select this option to direct the Orbit Form 800 to display DaPs with a 'System.Byte[ ]' showing. A click on that line of the DaP may enable the user to retrieve a picture of that particular image, but clicking the Show all Images button 1610 may release and show all the images in the Results Drop 1000.

'Fast Fly' 850: The leftmost faint figure to the left of the first Approach Box may display the opening number of records 855. As the user advances through the user-defined sequence of Approach Boxes 810, 820, 830, the figure nearest the top may display the number of unique values in the subject Approach Box to the left. The next figure, positioned below and slightly to the right, may state the number of unique values for the particular value currently showing in the ABox directly above. If the user moves up or down in the Approach Box, this figure may change to reflect the number of unique values for the new value in the Approach Box. When Fast Fly 850 is on, the last, lowest, set of figures may not appear (more specifically, the total number of records for the filter combination defined at each point including the browsed values, as described below for FIG. 32, may not be displayed). However, with large databases, the system may work a lot quicker moving through the Approach Boxes with Fast Fly 860 turned on. With small databases, increases in responsiveness may not be noticeable.

'Stopper' 860: If checked, the user's employment of the Down or Up key may be halted by the system when the end or top of the active Level is reached. If this tool is not checked, reaching the end of a set of values in the working data set will cause the system to jump back to previous level. Similarly, if Stopper 860 is not fumed on for AB0, the PageBox 830, reaching either the top or bottom for the Level 1 showing may automatically engage the next or previous Level 1 and continue. If the Stopper 860 is not turned on, this automatic engagement may not happen. However, the Orbit form 800 may warn the user that the bottom or top has been reached, thus presenting the user an option to consciously move back by using the left, arrow, or to otherwise stay with Level 1 showing. If the user has advance to a new Level accidentally, the user may simply arrow up or down to revisit the original Level 1. With larger databases fables or views, the user may have to wait a few or more seconds while the system recreates the Level the user recently left or, alternatively, the paging box (ABox0) 830.

Figure 27:
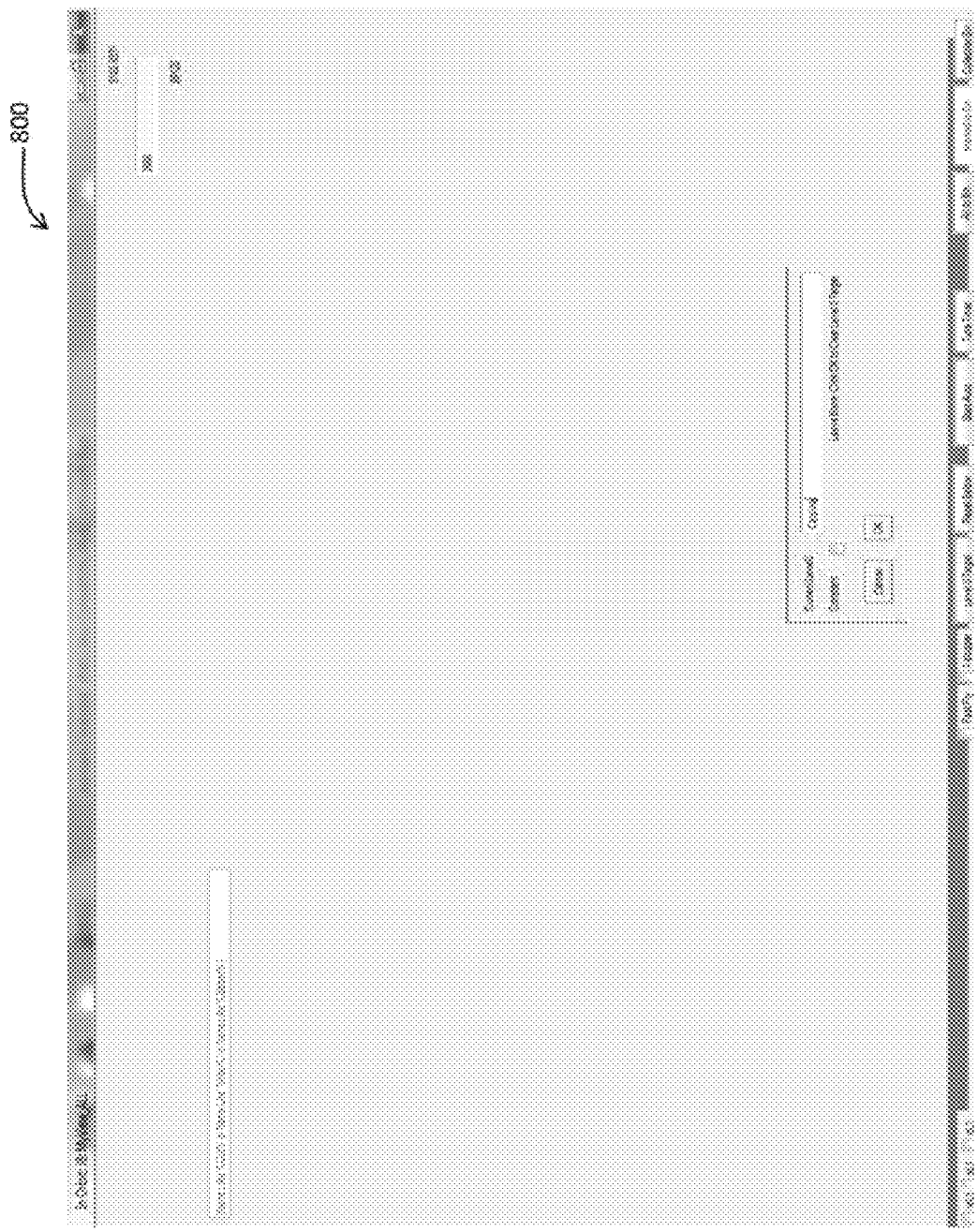
FIG. 27 is a diagram illustrating another exemplary Orbit Form of a database interface created using the DBICS of FIG. 1.

'Level 0 Target' (see 446 of FIG. 11): When the user clicks this button, the system may present a pop-up (as exemplified in FIG. 27) winch may enable the user to dispense with a landing target and/or set a new landing target for the drop down box. By doing so, when the user first engages a new Level 1 820, the system may go straight to the page that has those values or has the nearest values.

'Reset Below' 870: When the user clicks this button, the system may present a mini-form to enable the user to reset the all Below the Line parameters (as described below).

The All to Bin 880, Marked to Bin 882, and Collection Bin 884 tools operate, respectively, to copy all the DaPs on the page to a Collection Bin, to copy only those the user has marked to the Collection, and to display the Collection Bin itself.

Figure 11:
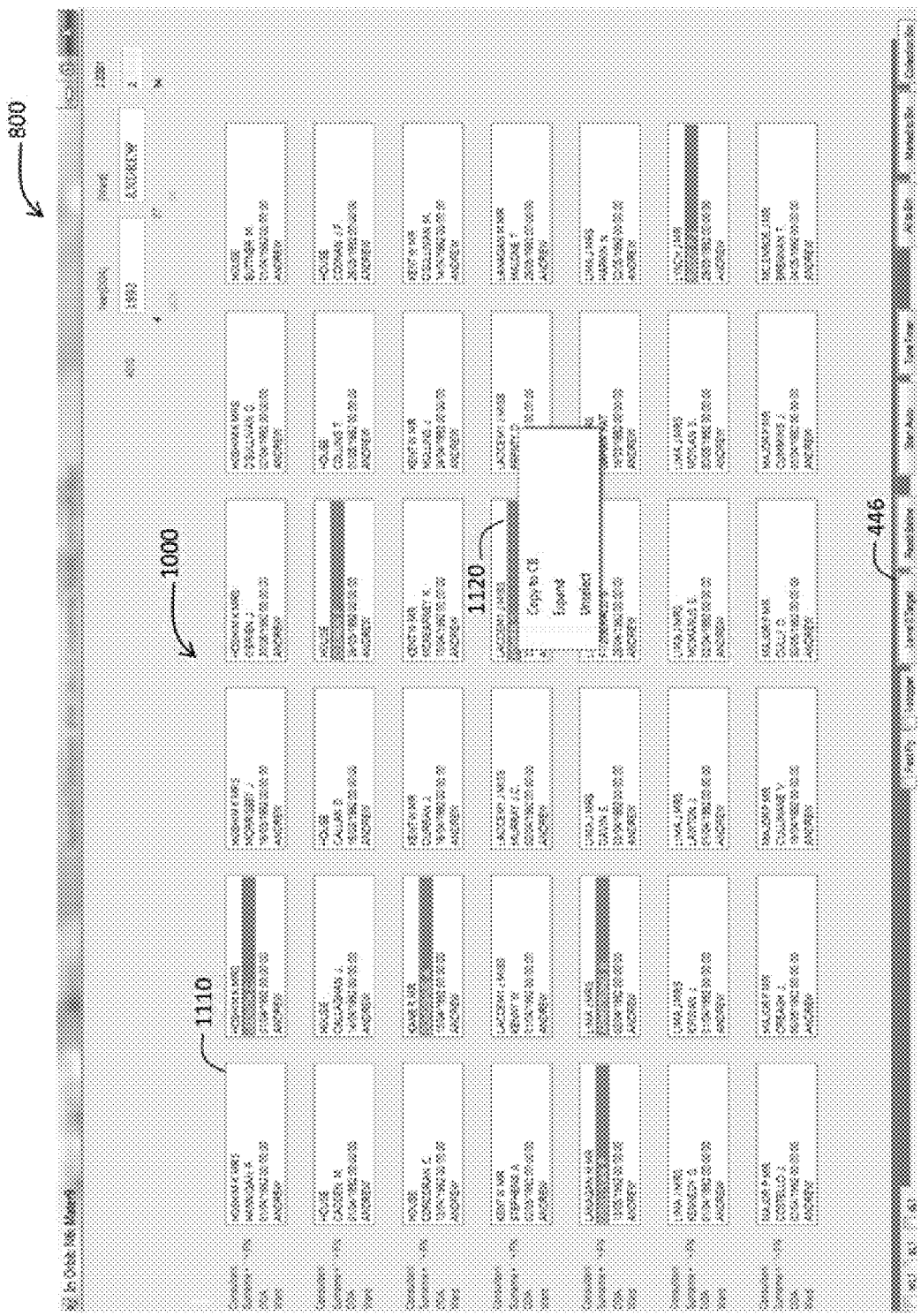
FIG. 11 is a diagram illustrating another exemplary Orbit Form of a database interface created using the DBICS of FIG. 1.
Figure 12:
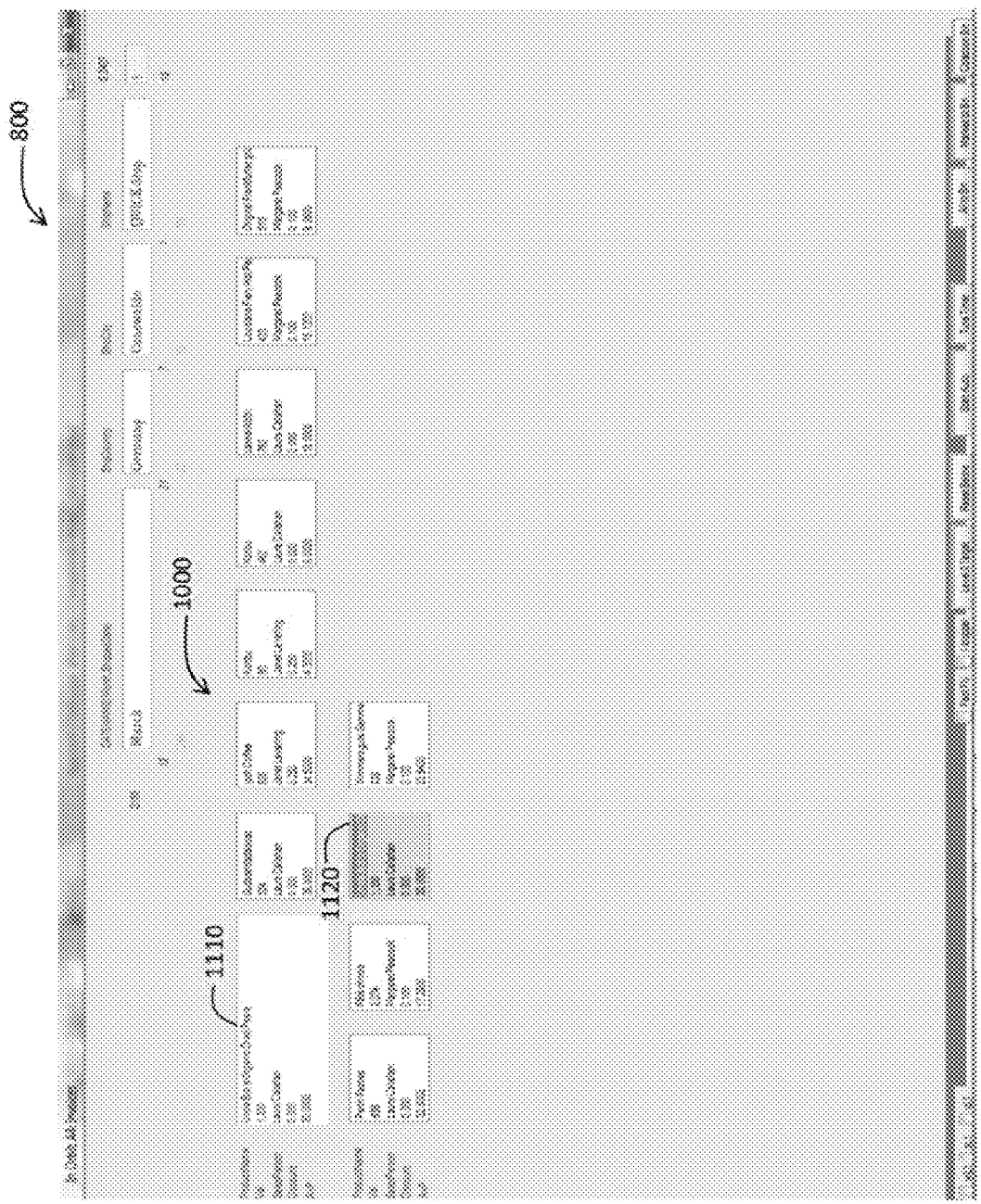
FIG. 12 is a diagram illustrating another exemplary Orbit Form of a database interface created using the DBICS of FIG. 1.

In one embodiment, as illustrated in FIGS. 11 and 12, the Orbit form 800 functionality may allow the user to navigate within the Results Drop 1000, and more specifically, select and enhance DaPs (one example at 1110). For example, and without limitation, any DAP (record) 1110 in the Results Drop 1000 down may be selected by a left click inside the DaP box. In one embodiment, shading and/or a blue color 1120 may be employed to indicate that a particular DaP is selected. The DaP may remain selected unless unselected by the user using the 'unselect' option from the right-click drop down. A right click inside a selected DAP present the user options with that DaP.

Figure 13:
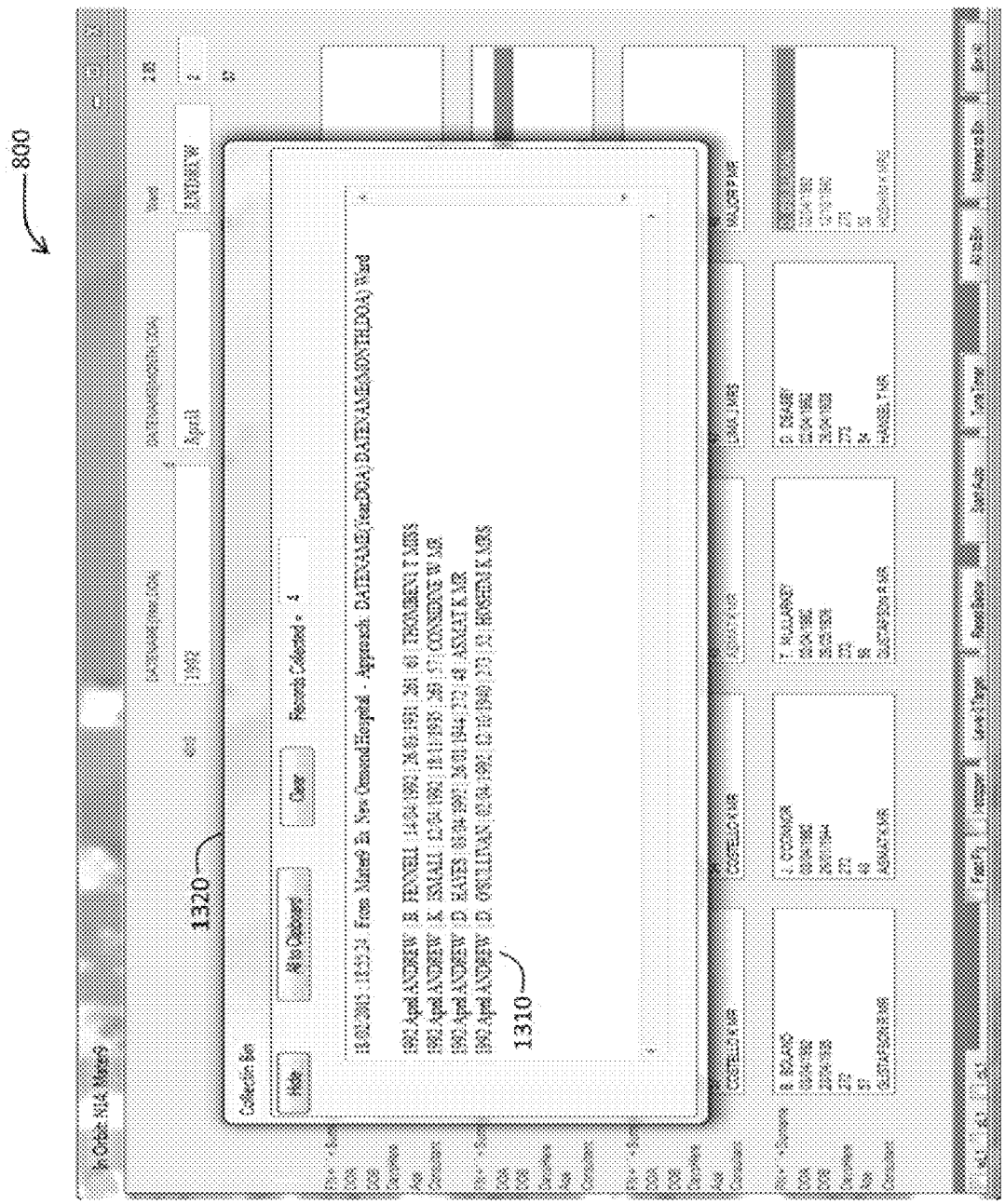
FIG. 13 is a diagram illustrating another exemplary Orbit Form of a database interface created using the DBICS of FIG. 1.

As illustrated in FIG. 13, the user may right-click on a selected DaP for a particular patient admitted to ward Andrew in 1992. The Orbit form 700 may allow the user to save DaP information 1310 to a Collection Bin 1320, to expand the data so that all the information is visible, and/or to unselect the DaP. In one embodiment, shading and/or coloring the DaPs blue may indicate to the user that the DaP was previously visited.

As shown at 1110 in FIG. 12, the DaP width specified by the user resulted in the 'ProductName' not being fully shown in the case of the selected DaP. However, in one embodiment, the Orbit Form 800 may allow the user to click on the 'Expand' option after clicking on the DaP to cause the data in the DAP to be shown fully in the top right. In another embodiment, horizontal scroll bars may be engaged with full view version to enable the user to view the DAP in its entirety. To dispense with the Expanded View, the user may simply Double Click on it, or may select 'Reduce' from its Right-Click, drop down.

Figure 14:
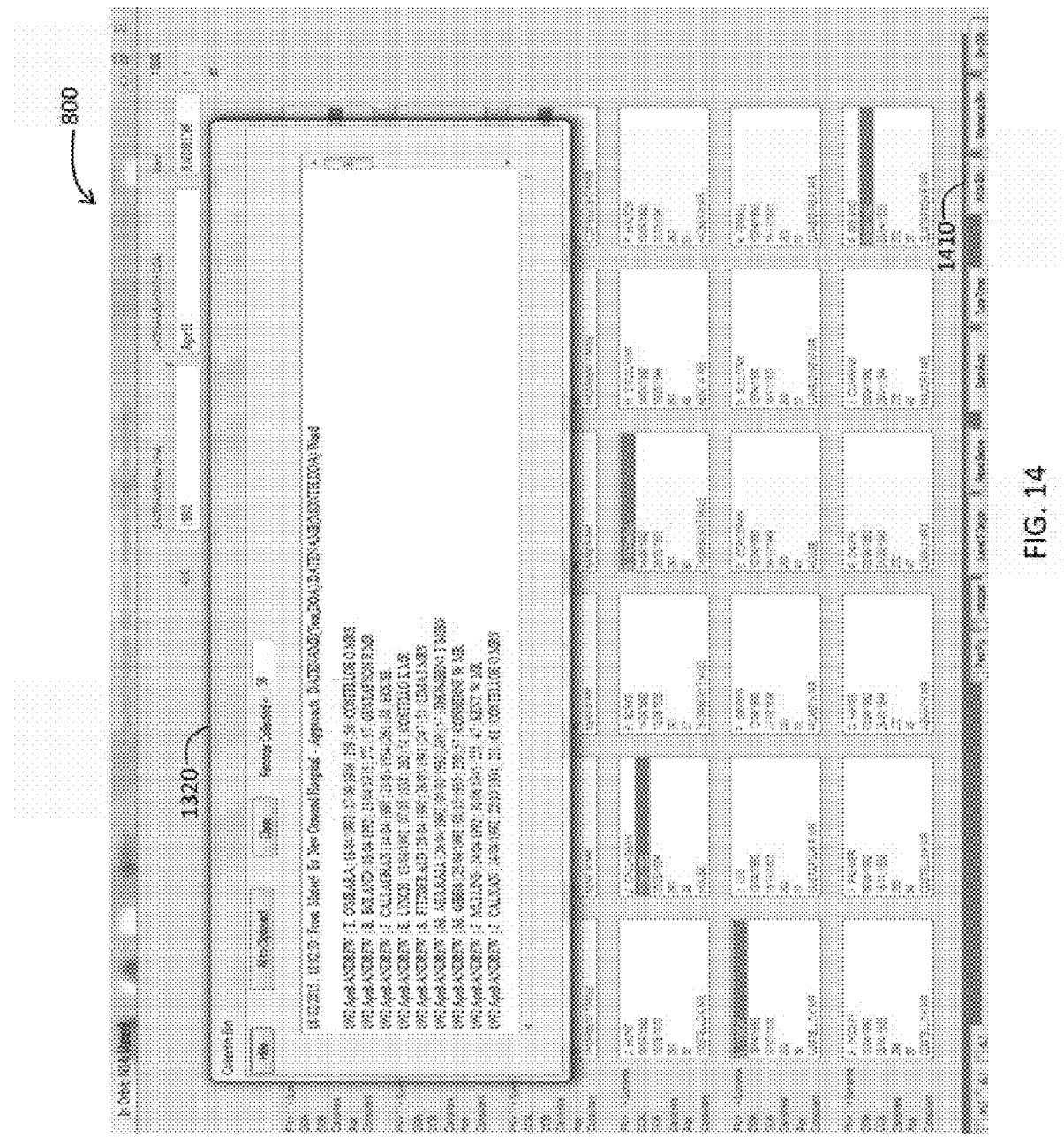
FIG. 14 is a diagram illustrating another exemplary Orbit Form of a database interface created using the DBICS of FIG. 1.

Also as shown in FIG. 14, the Orbit Form 14 may allow the user to save selected records to the collection bin 1320, for example, and without limitation, using the right-click drop-down for a selected DaP. Also for example, and without limitation, the bottom line tool bar may provide a button to allow the user to save all selected DaPs, and/or another button to save all DaPs whether selected or not. By clicking on Bin button, the user may request the bin itself be displayed. Using this feature, the user may add notes, may edit the contents of the clipboard, and/or may save ail or selected parts to the clipboard. In the exemplary embodiment illustrated in FIG. 14, the user may display the Orbit form in the normal screen.

In the exemplary results page shown at FIG. 14, the user has used the "All to Bin" button 1410 to initiate copying of all the selected DaPs, whether selected or not. In one exemplary embodiment, shading and/or coloring the foreground green to distinguish the copied state of all the DaPs. The Collection Bin may be enabled for the whole term of the Run, and saved selections from subsequent Results Drop page on view may be added to the Bin if not already there for the current Results Page. For example, and without limitation, the Collection Bin may feature both vertical and horizontal scroll bars to enable the full quantity of saved re-cords to be viewed and the full width, unlimited, and viewed states of any particular record fine in a DaP. In the exemplary embodiment of FIG. 14, the user has switched modes to Running the Orbit Form in the max screen.

Figure 15:
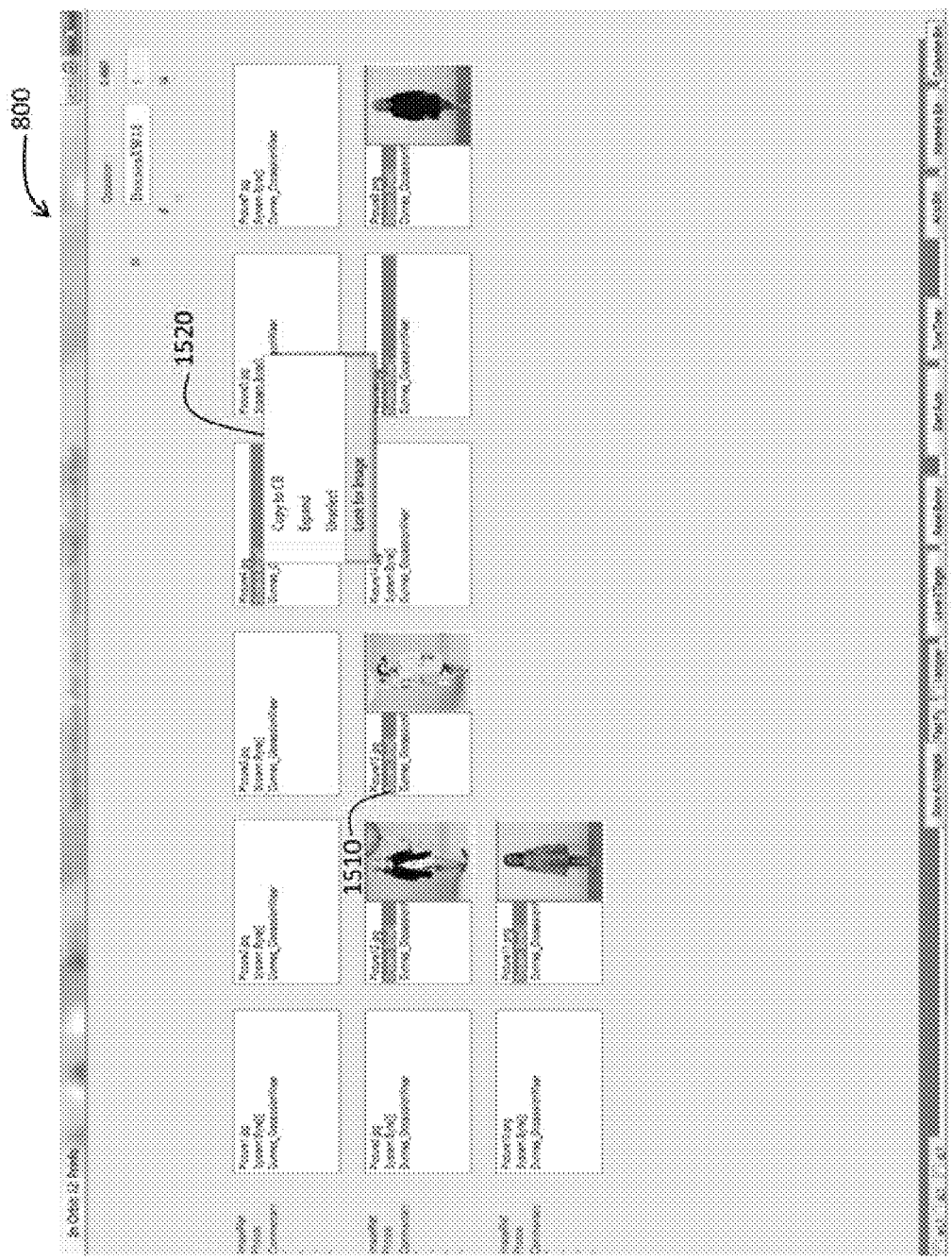
FIG. 15 is a diagram illustrating another exemplary Orbit Form of a database interface created using the DBICS of FIG. 1.
Figure 16:
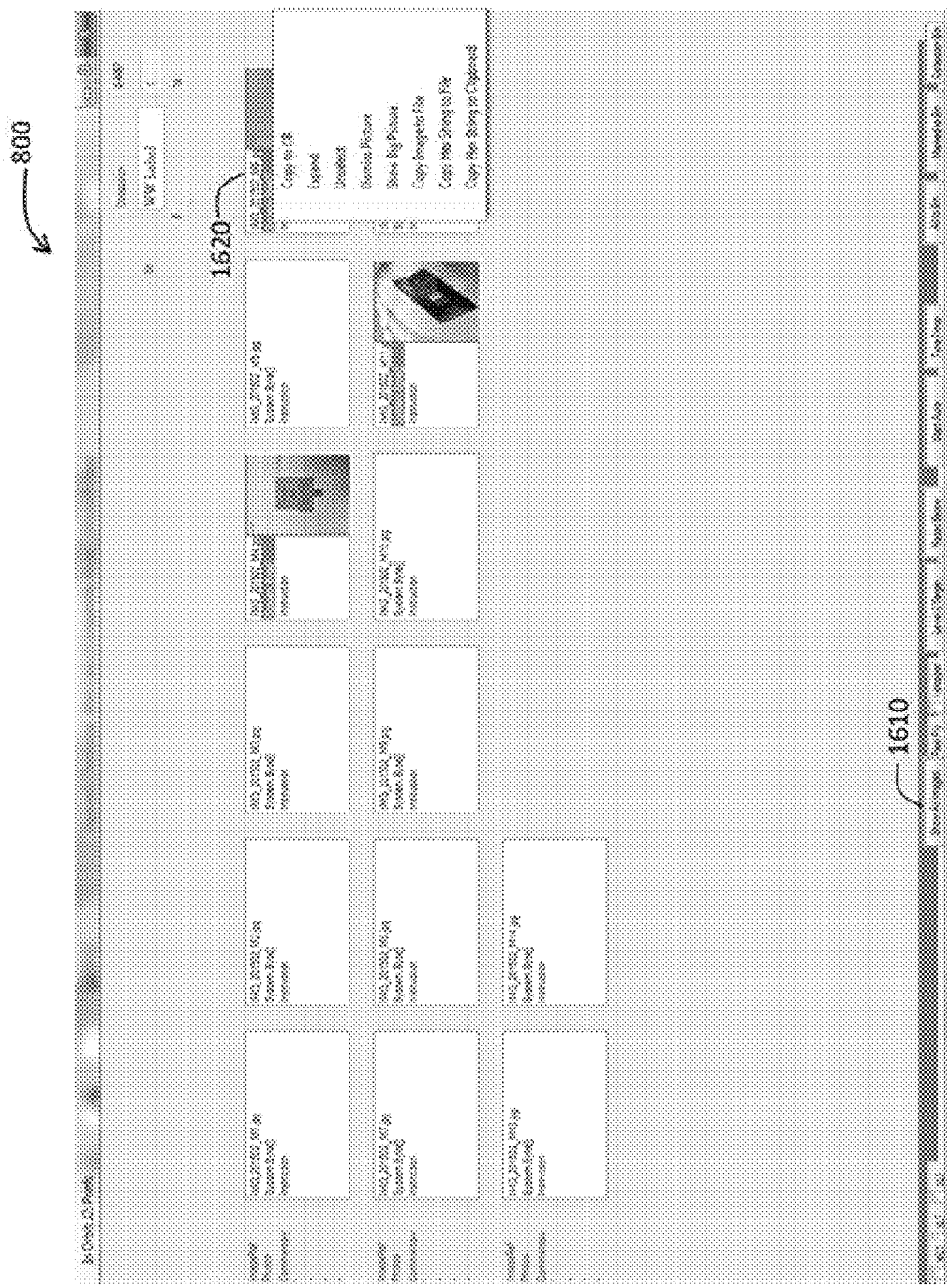
FIG. 16 is a diagram illustrating another exemplary Orbit Form of a database interface created using the DBICS of FIG. 1.

Referring now to FIG. 15, the Orbit Form 800 may provide support for working with pictures and images in a Results Drop. More specifically, when the SQL executed by the Orbit form 800 includes a Raw Binary value (or hex equivalent) field which is included in a DaP, this value may appear as 'System.Byte[ ]' in that line of the DaP. The Orbit form 800 may be configured to advantageously extract and show .jpg, .png, .TIF and other image file formats. For example, and without limitation, instead of requiring the user to left click anywhere in the DAP, the Orbit Form 800 may allow the user to click specifically on the System. Byte[ ]' line 1510 in the DAP. As described above, in one embodiment shading and/or a blue color may indicate that the DaP is selected. In another embodiment, to get the drop down options for the System.Byte[ ] the user may bring the cursor to the System.Byte[ ]' line and Right-Click. As illustrated in exemplary FIG. 15, the Orbit form 800 may present to the user drop down options 1520 with more than just the three actions described above, but also including one which may be 'Look for Image'. As illustrated in FIG. 15, the user has selected four pictures and is in the process of selecting a fifth.

Figure 18:
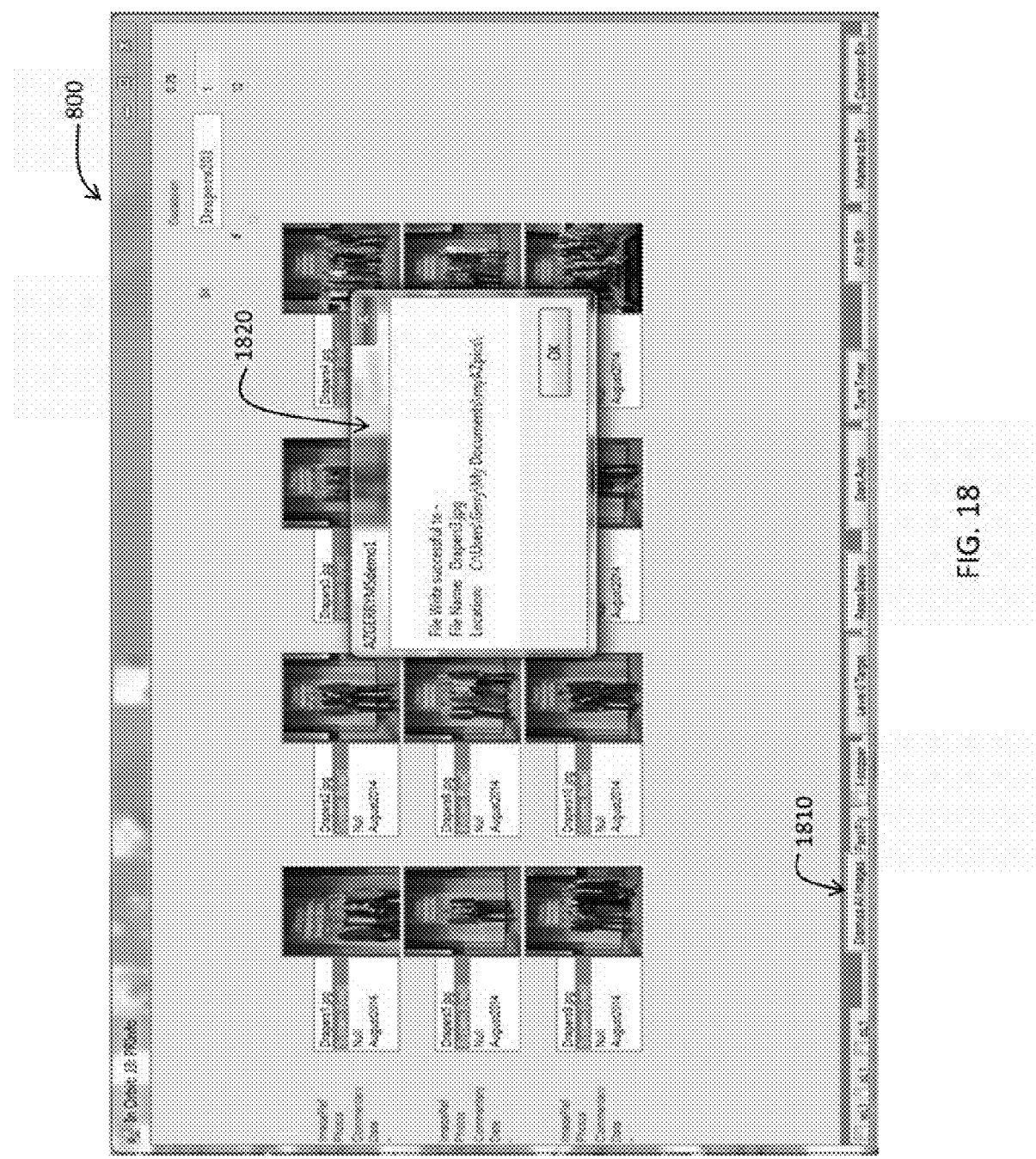
FIG. 18 is a diagram illustrating another exemplary Orbit Form of a database interface created using the DBICS of FIG. 1.

As illustrated in FIG. 18, the user has right clicked on an already-selected System.Byte[ ] and retrieved the image. For example, and without limitation, further options 1620 may include enlarge the picture ('Show Big Picture'), and also save the picture to the file path nominated on the Launch Form, in which case the file name will be the value in the line immediately above it in the DaP. In the latter case, also for example, and without limitation, if the file name is NULL, blank or otherwise not an acceptable, the system may generate a file name using a date-time stamp.

Figure 17:
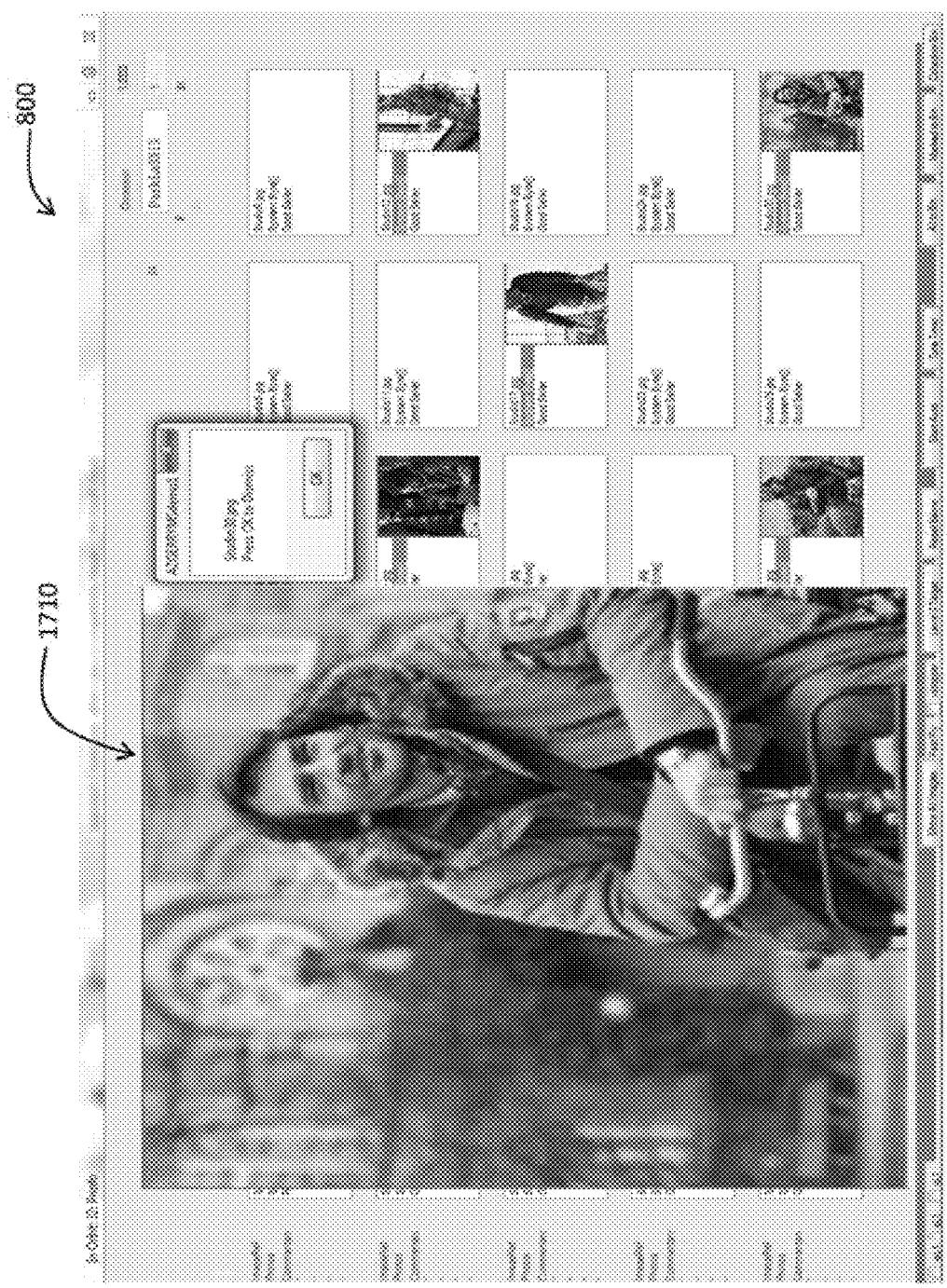
FIG. 17 is a diagram illustrating another exemplary Orbit Form of a database interface created using the DBICS of FIG. 1.

FIG. 17 illustrates an example of the Show Big Pic result 1710.

FIG. 18 illustrates the result of the user quickly identifying all the images by clicking the 'Show All Images' button on the tool bar (which subsequently changes to 'Dismiss All Images', and then successfully saved 1820 one of them to our nominated save folder.

Figure 19:
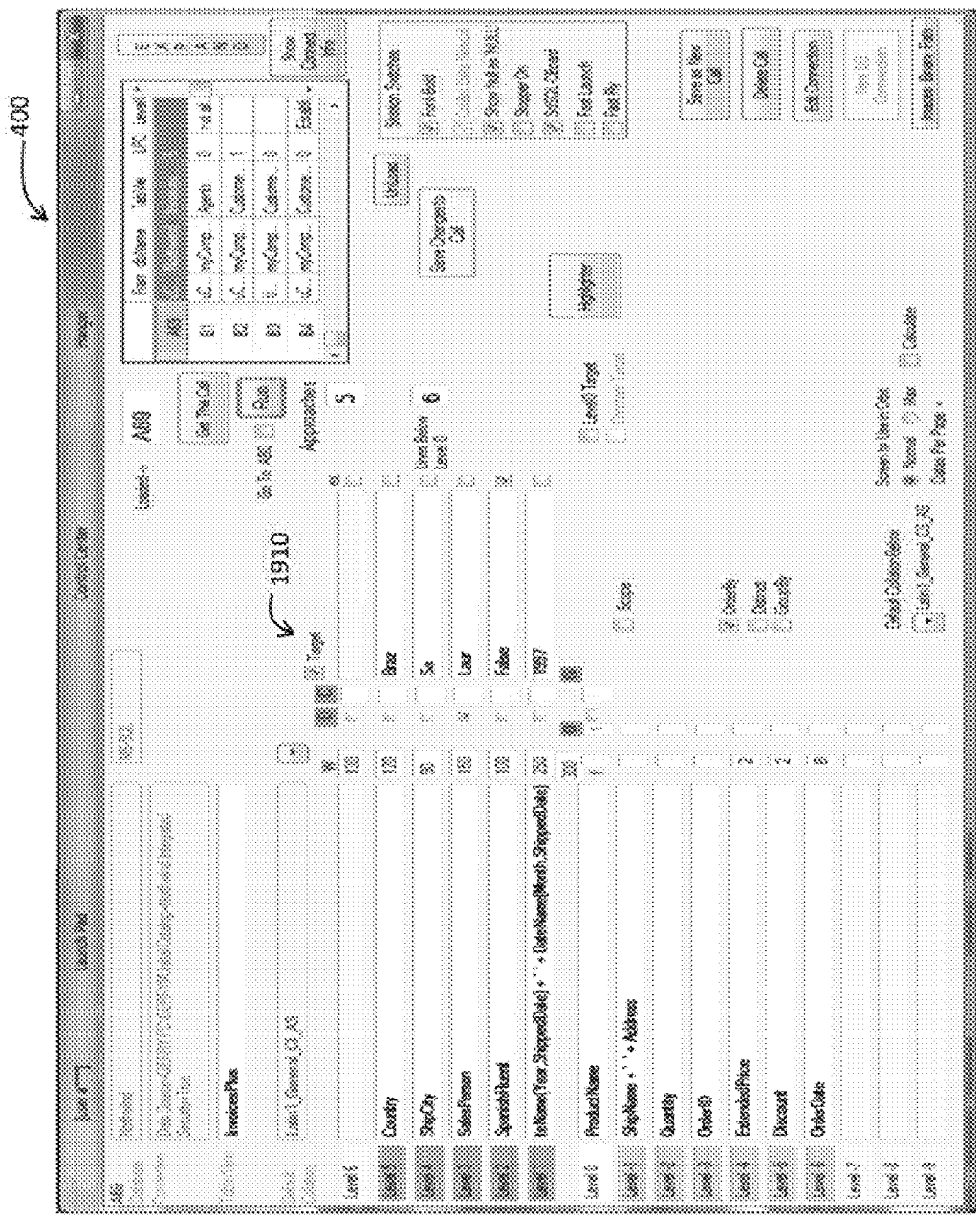
FIG. 19 is a diagram illustrating another exemplary Launch Form of a database interface created using the DBICS of FIG. 1.
Figure 21:
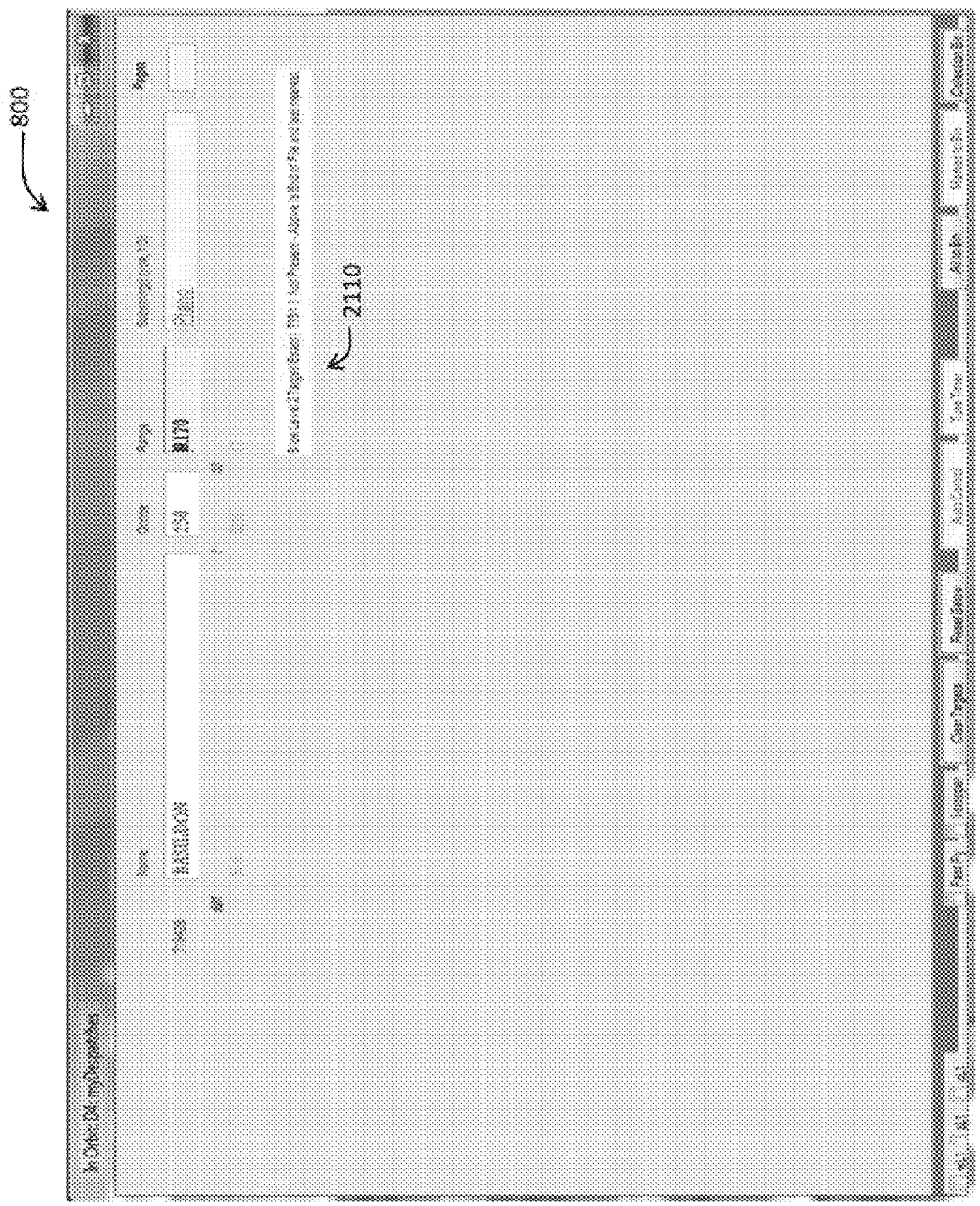
FIG. 21 is a diagram illustrating another exemplary Orbit Form of a database interface created using the DBICS of FIG. 1.

Referring now to FIG. 19, the user may employ the Find/Search facilities—Targets along the Approach Boxes to nominate targeted filter values in the Approach and targeted areas for the first Result Drop for a Level 1. For example, and without limitation, Targets for the Approach Boxes may be pre-set either before the call is launched and/or directly entered into the Approach Boxes as search requests during a Run. When set on the Launch Pad 410, the system may automatically look for and navigate straight to the values nominated when the Call is Run, or the nearest match to those values, for each of the Levels for which they are set. For example, and without limitation, when being set on the Launch Pad 410, if a value nominated by the user is exactly found, control will move on to the next Level, (i.e. Approach Box), and if that too had a nominated target, then so on. If, on the other hand, a value nominated by the user is not exactly found, then automated search by the Orbit form 700 may find the nearest and display it. Continuing with this example, it the 'ex' (for exact) ticker is checked by the user for that level, then searching will halt at that point and control returned to the user (see FIG. 21). However, if the 'ex' was not ticked by the user, the Orbit form 800 may use the nearest match and move onto the level in the next ABox.

Continuing to refer to FIG. 19, the user may make use of the Find/Search facilities—Targets for the Results Drop by opening the target text box 1910 for Level 0 and selecting the 'Level 0 Target' opposite Level 0. Doing so may cause the text box to open with its companion checkbox 'Target Constant'. The user may take this action for Level 0, and when doing so Level 0 may be the first OrderBy. Like Above the Line targets, these parameters may be pre-set either on the Launch Pad 410, and/or edited/reset/cancelled during the Orbit Form 800 run. For example, and without limitation, the same rules as in Above the Line targets may apply when entering the target values tor Level 0.

Figure 20:
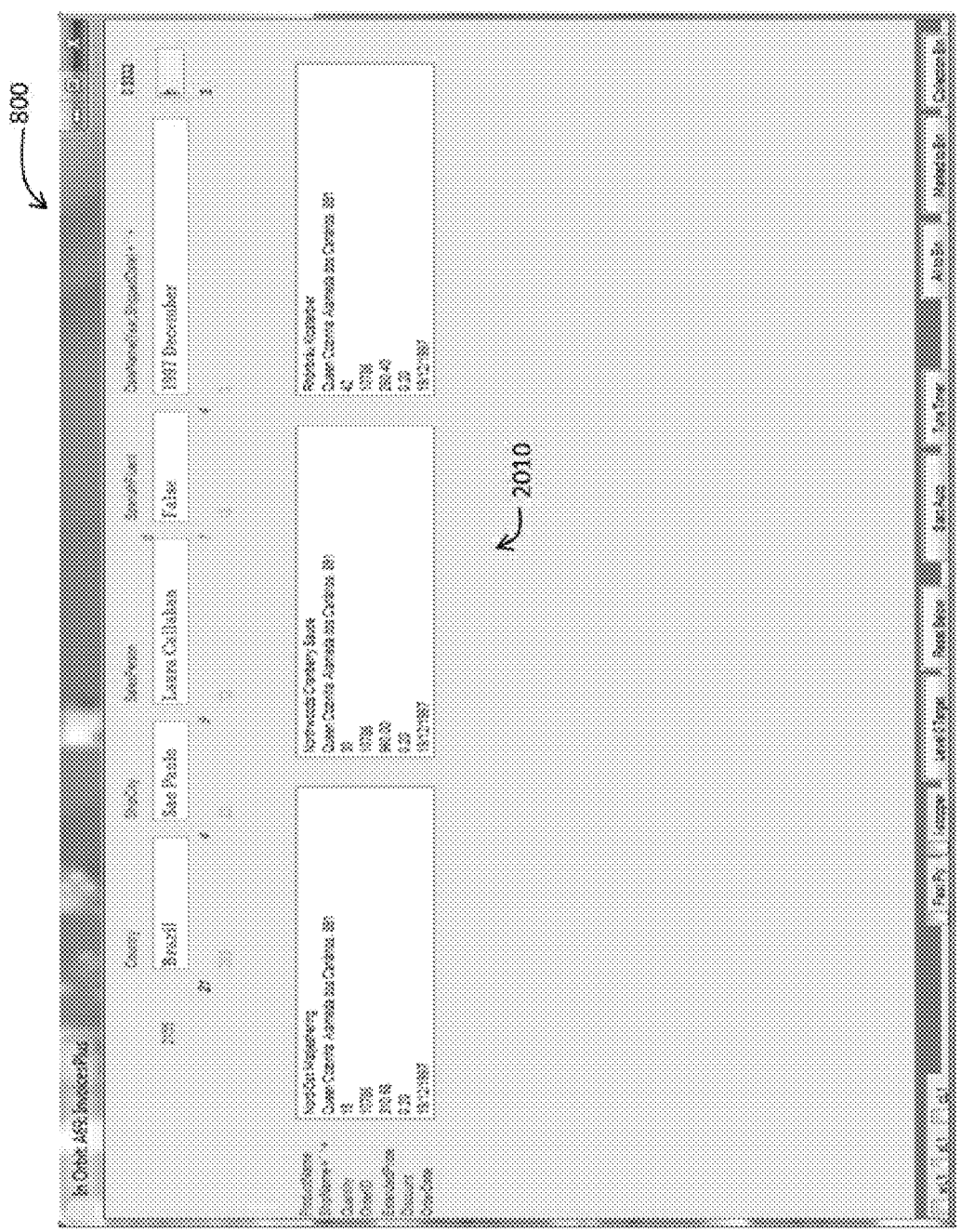
FIG. 20 is a diagram illustrating another exemplary Orbit Form of a database interface created using the DBICS of FIG. 1.

Regarding the Results Drop, where Targets are set as on the Launch Form 400 in FIG. 19 and ensuing result illustrated in FIG. 20, use of the Targets may result in control going straight to the first associated Drop Down 2010 in FIG. 20. In the case of a nominated Level 0 target also being set on the Launch Form as in 2410 of FIG. 24, with the ensuing result on FIG. 25, if a value match is exact, this condition may be highlighted in the identified DaP using shading and/or the color red, or, if the search renders only a nearest find, the DaP may be highlighted in purple.

When Target Constant is not checked before running the Call, the target search process may only apply to the first Results Drop. However, if Target Constant is checked, this parameter will apply each time a Level 1 value is changed. Targets at Level 0 may be changed, edited, or cancelled in the Orbit form itself during a run.

Figure 22:
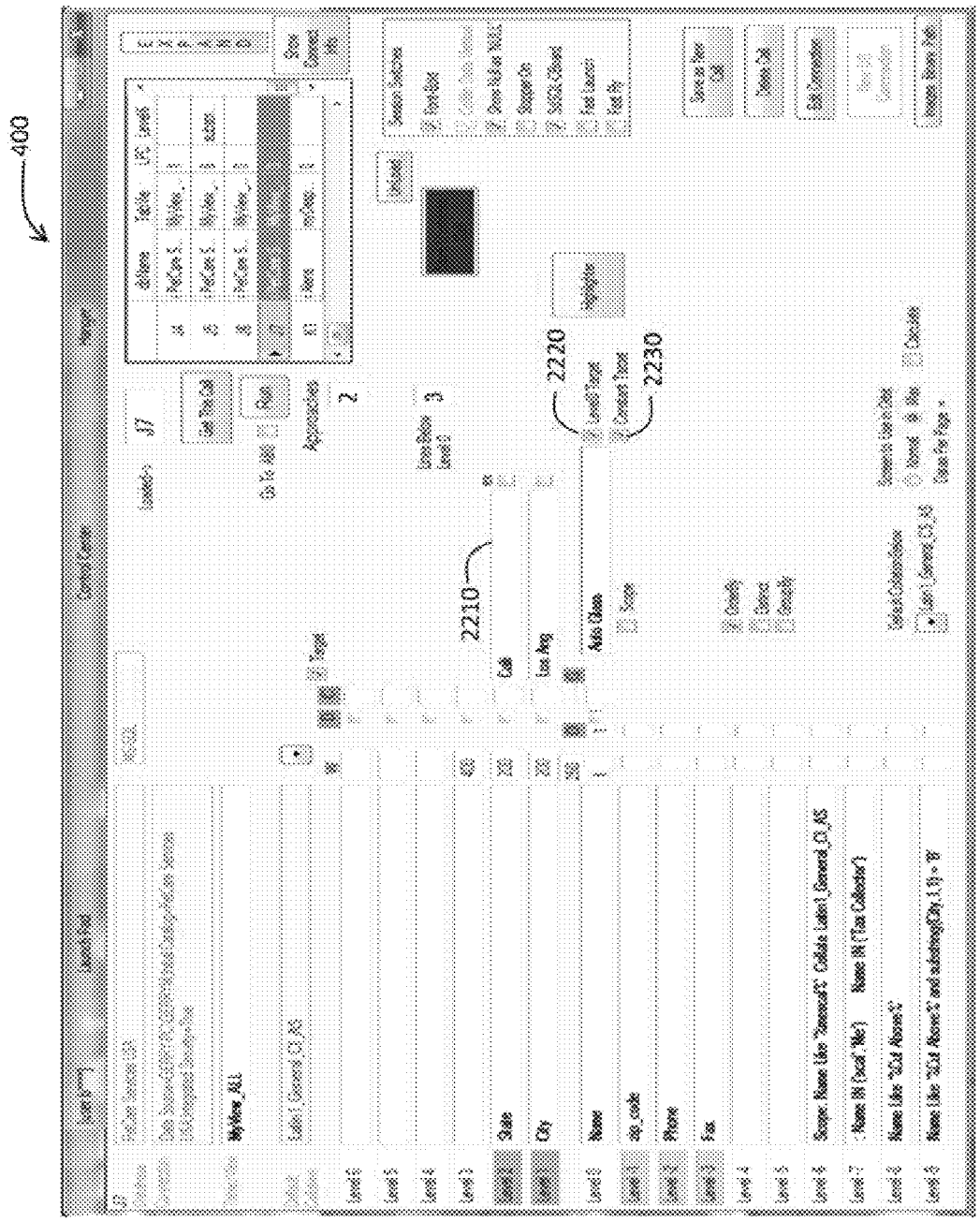
FIG. 22 is a diagram illustrating another exemplary Launch Form of a database interface created using the DBICS of FIG. 1.

As illustrated in exemplary FIG. 22, the user is employing both Above the Line and Below the Line targets, and wanting to start 2210 in California, Los Angeles. The user has checked the box "Level 0 Target" 2220, which may open the text box for that function, and may direct the system to proceed straight to the page that starts with the words 'Auto Glass'. In the example as illustrated, the user has checked the box—'Constant Target' 2230, which may be enabled whenever a Level 0 target is being set, because the user may want to browse other states and cites during the Run for the same purpose.

Figure 23:
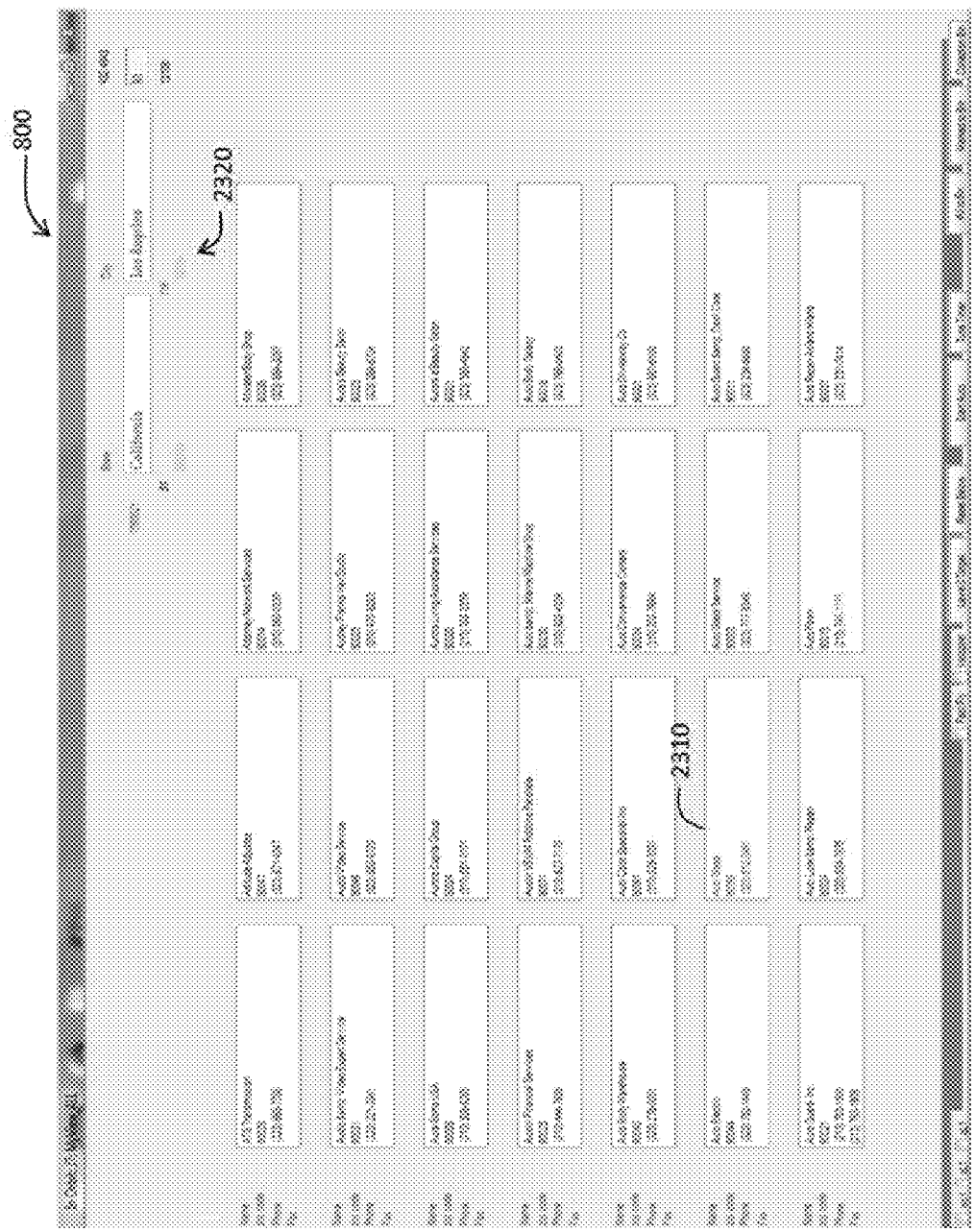
FIG. 23 is a diagram illustrating another exemplary Orbit Form of a database interface created using the DBICS of FIG. 1.

On opening, the Orbit Form 800 (as illustrated in FIG. 23) may run the user-specified targets and automatically navigate straight to the desired entry—page 43 for Los Angeles Calif. The system may highlight an exact match 2310 showing in red or, if there was no exact match, may highlight, the nearest m purple and add a Red Message advising the user. The user may recover control and move freely about the table ABoxes 2320. However, every time a new value for Level 1, City, may be engaged or entered, the system may navigate straight to the page with 'Auto Glass' or the nearest to it.

Figure 24:
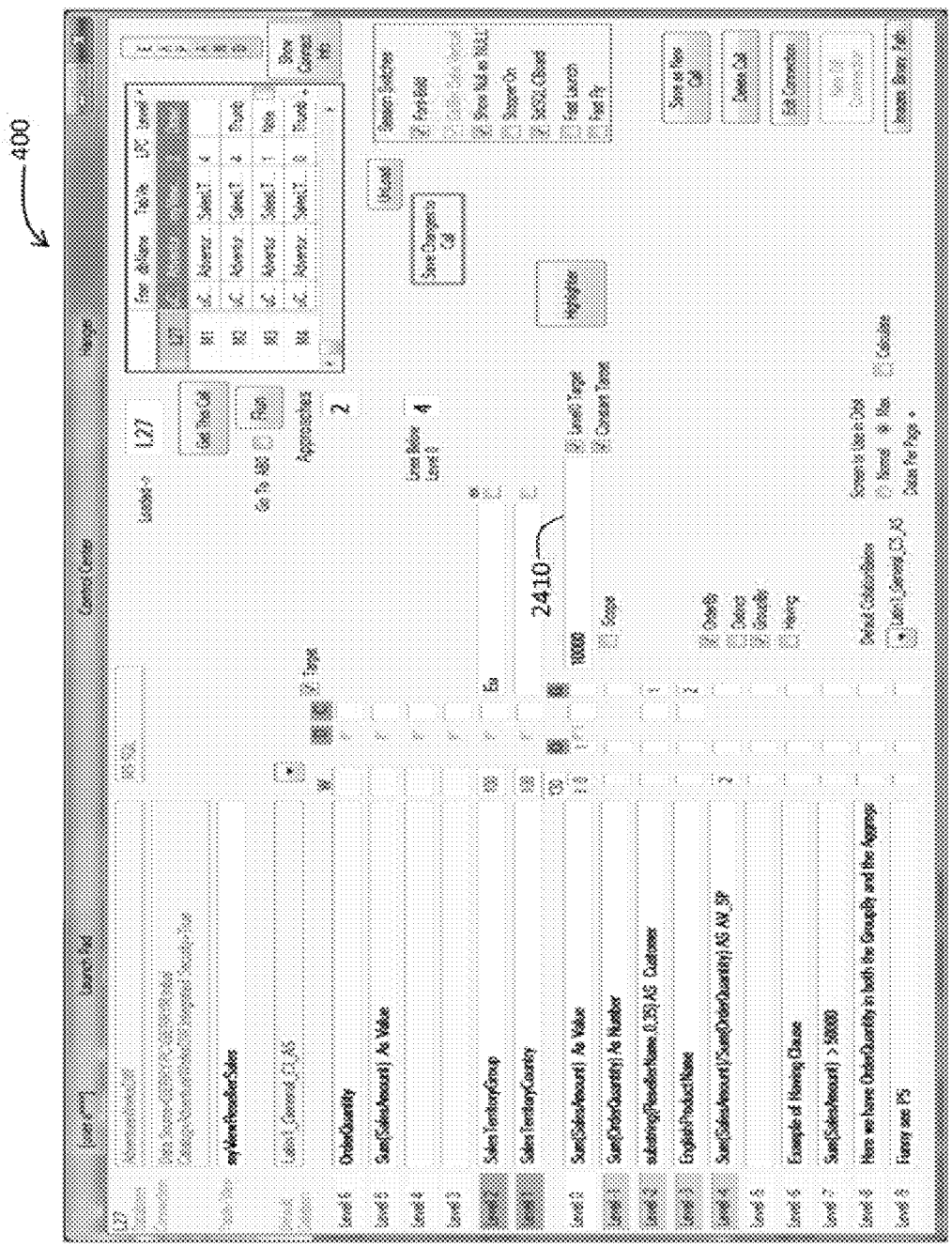
FIG. 24 is a diagram illustrating another exemplary Launch Form of a database interface created using the DBICS of FIG. 1.
Figure 25:
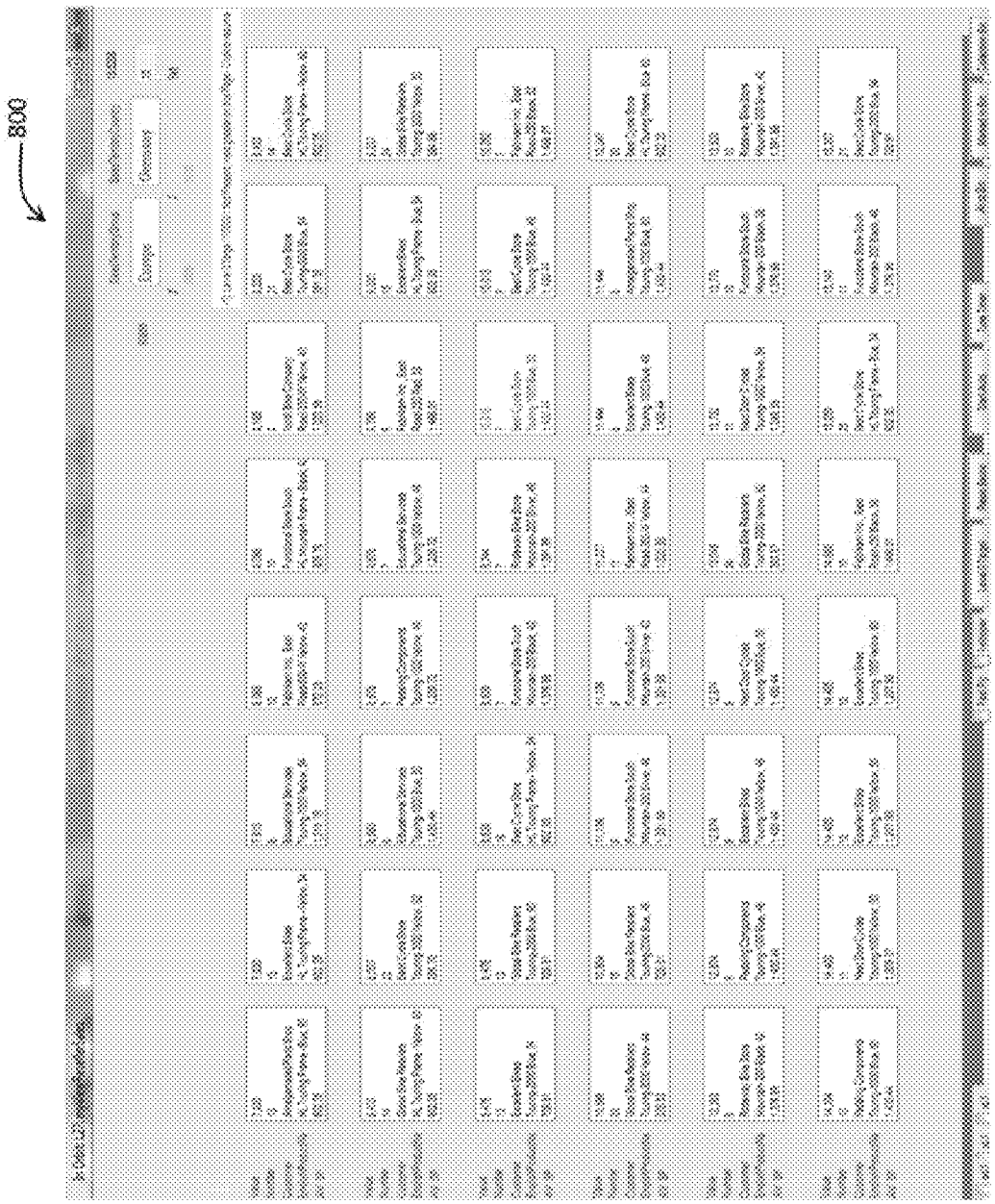
FIG. 25 is a diagram illustrating another exemplary Orbit Form of a database interface created using the DBICS of FIG. 1.

In yet another example, the user may desire to browse high value Adventure Work's European Sales by country and product. As illustrated in FIG. 24, the user has set the Level 0 landing target 2410 at $10,000 and, as illustrated in FIG. 25, has entered Germany at Level 0. FIG. 25 illustrates the first Result Drop generated by this query, and the user may start to browse from there.

If at some stage the user wanted to get the summary information by customer, the user may change the value in the 'Line Below Level 0 to 2 and make 'Customer the 1st GroupBy, and run again.

If the user wanted to get just sales for each country, the user may Cut and Paste Level 1 to Level −1, Cut and Paste Level 2 to Level 1, Change the Approaches to 1 and the 'Line Below Level 0' to 1, and run again.

If the user wanted to get the Total Value for 'Europe' (or any other continent we want white browsing in the Call run), the user may Change 'Line Below Level 0' to 0. In the exemplary FIG. 25, the result may be just one DaP for each continent entered at Level 1, and which shows the total sales for that continent.

If the user wanted to get a Results Drop showing the total sales for each continent, the user may Change the 'Approaches' to 0 and the 'Lines Below Level 0' to 1, Cut and Paste the SalesTerritory Group to Level −1, and run again.

For each change, such as those described above, the user may have the option to save as amended, or to 'Save as New Call." In the latter case, the call may then be allocated a new reference number, and may become an additional call that may be displayed in hanger. Lastly, the user may opt not to save the new call, thereby retaining the original.

Figure 26:
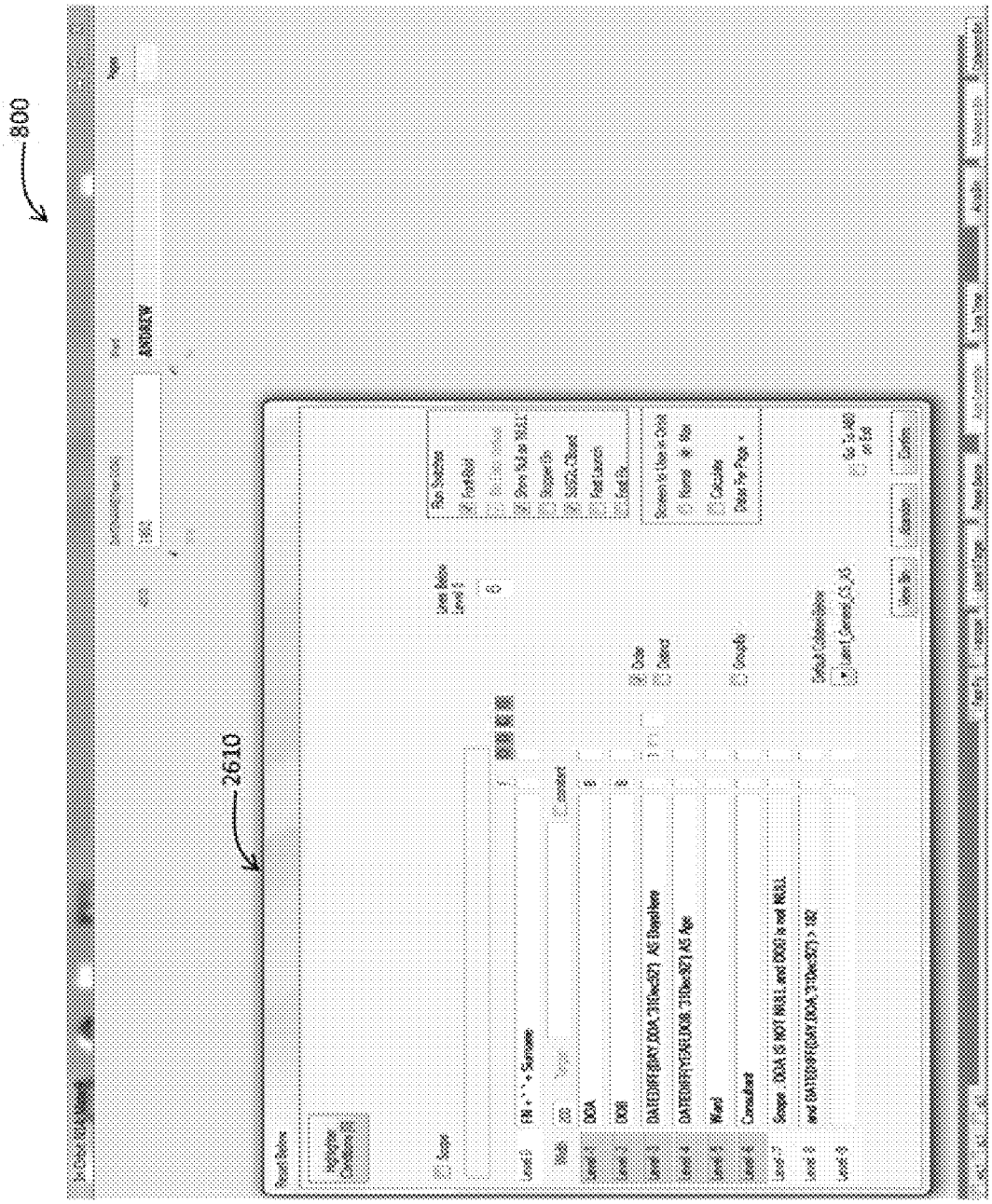
FIG. 26 is a diagram illustrating another exemplary Orbit Form of a database interface created using the DBICS of FIG. 1.

As illustrated in FIG. 26, the Reset Below option may always be available on the bottom line tool bar. If the user activates reset functionality by clicking this button, the user may be presented a display 2610 as in FIG. 26. The Orbit Form itself may be frozen until the user exits the reset functionality. For example, and without limitation, the reset functionality may enable the user to reset the Below the Line Levels, the configuration, and any of the Results Drop features without returning to the Launch Form 400. When a 'Confirm' of a reset is entered by a user, some recalculating may be done for which, in the case of large databases, the user may experience wait time. Some of the reset-related features, such as resetting the Level 0 target, may be done directly from the Orbit Form bottom toolbar. When done this way, the re-calculation may be specific and the user likely would experience no wait-time irrespective of the database size. See FIG. 27 for an exemplary Level 0 being edited.

Figure 28:
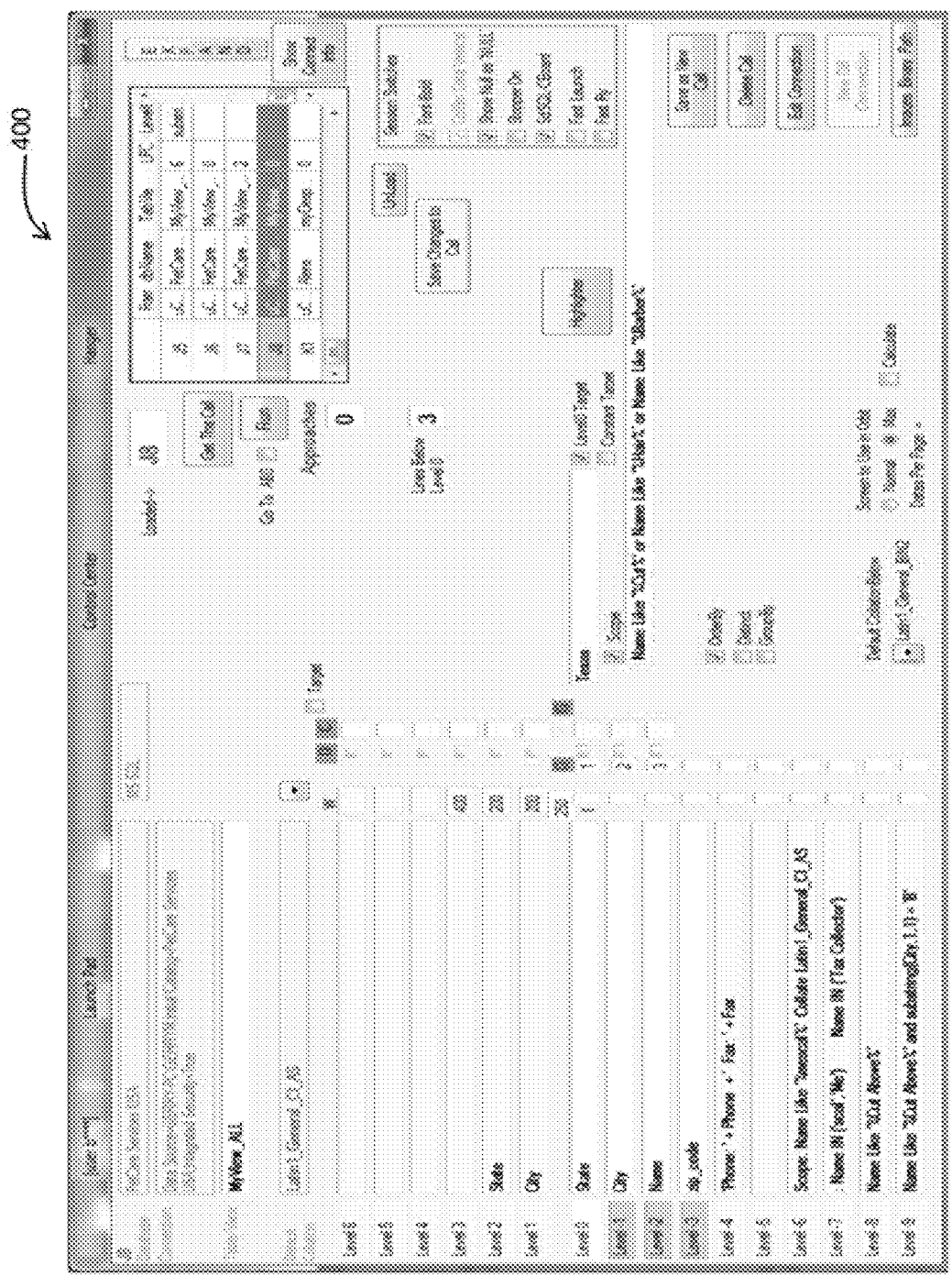
FIG. 28 is a diagram illustrating another exemplary Launch Form of a database interface created using the DBICS of FIG. 1.
Figure 29:
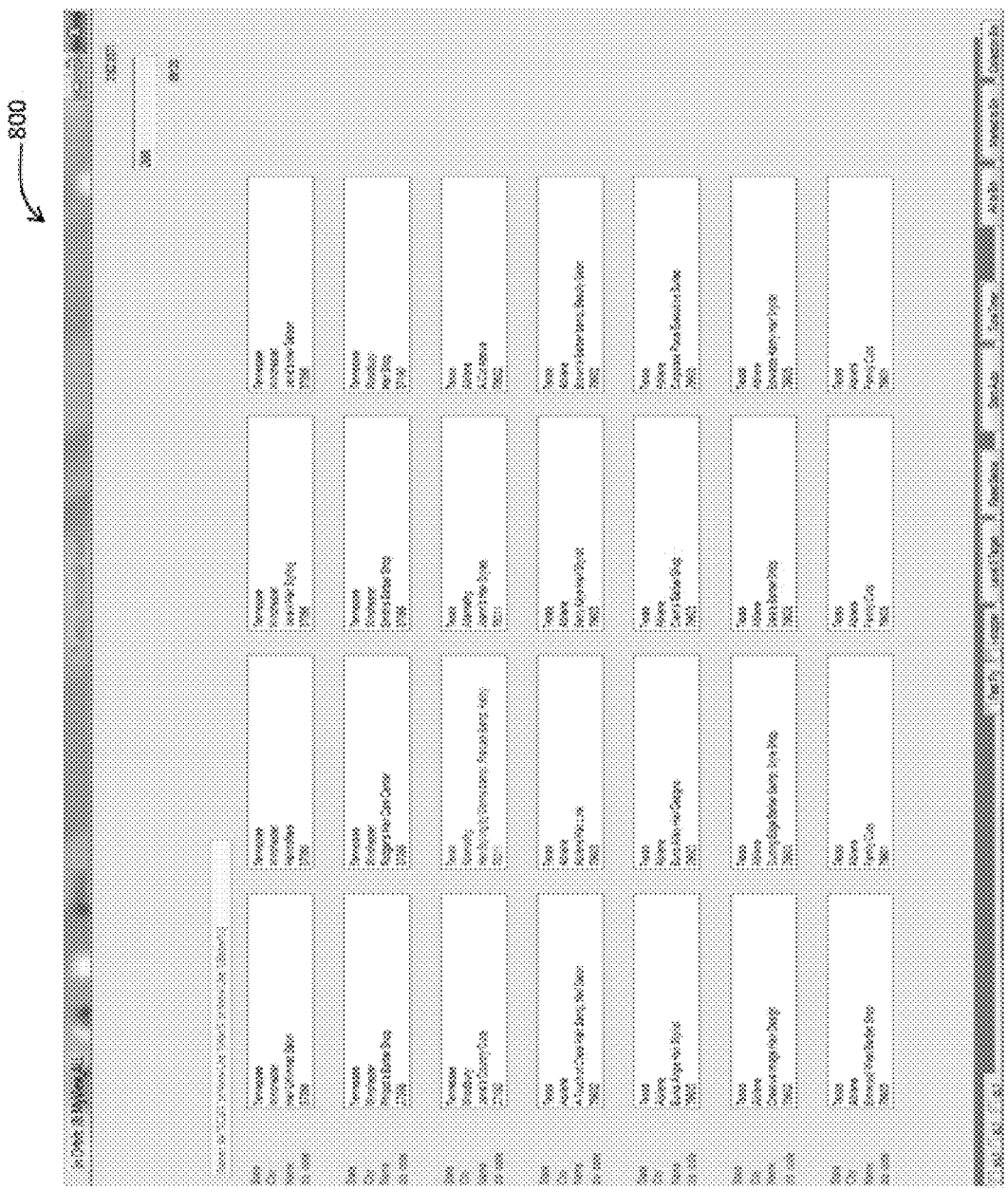
FIG. 29 is a diagram illustrating another exemplary Orbit Form of a database interface created using the DBICS of FIG. 1.

FIG. 28 illustrates a Zero Approach Call in which the user may be allowed to use the system 100 without employing any Above the Line Approach Boxes. In the illustrated example of FIG. 28, the users objective may be to identify Barbers and Hairdressers in a business directory. The user may set up the Run using the Scope clauses to isolate likely candidates (e.g., Scope: Name Like '% Cut %' or Name Like '% Hair %' or Name Like '% Barber %'). (Note: Nominations at any level, as exemplified in FIG. 28, may include any SQL-allowable function that may define a valid database column). FIG. 29 illustrates an exemplary first Result Drop.

The user may change the state start marker during the Run simply by ticking the 'Level 0 Target' in the bottom line toolbar and entering the next state that the user wants to see as the new target. After acknowledging the new target, the user may then press enter on the AB0 box and be taken straight to the page where the new state begins. A person skilled in the art would recognize that alternative ways to use an Approach Box for the State may exist.

Figure 30:
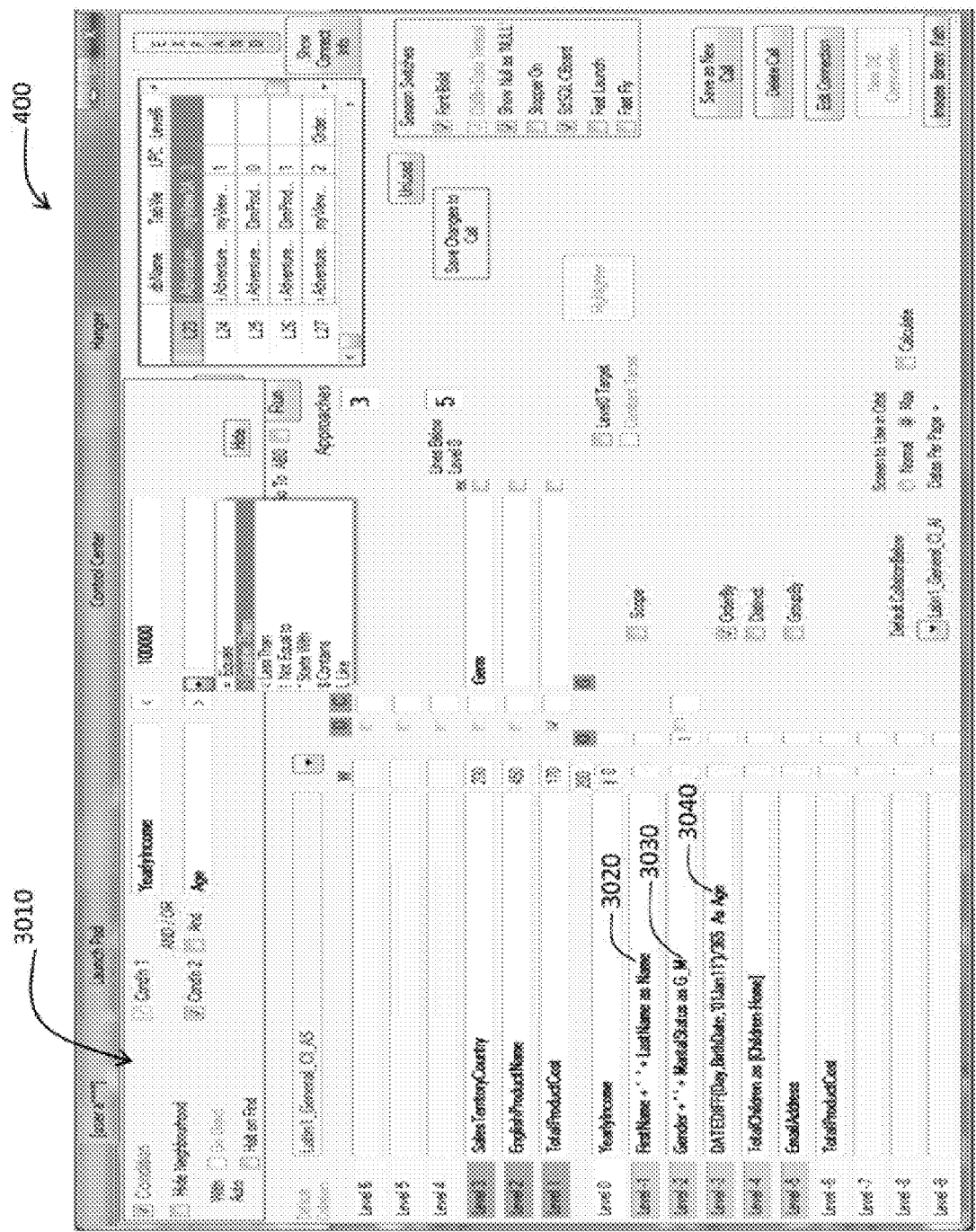
FIG. 30 is a diagram illustrating another exemplary Launch Form of a database interface created using the DBICS of FIG. 1.
Figure 31:
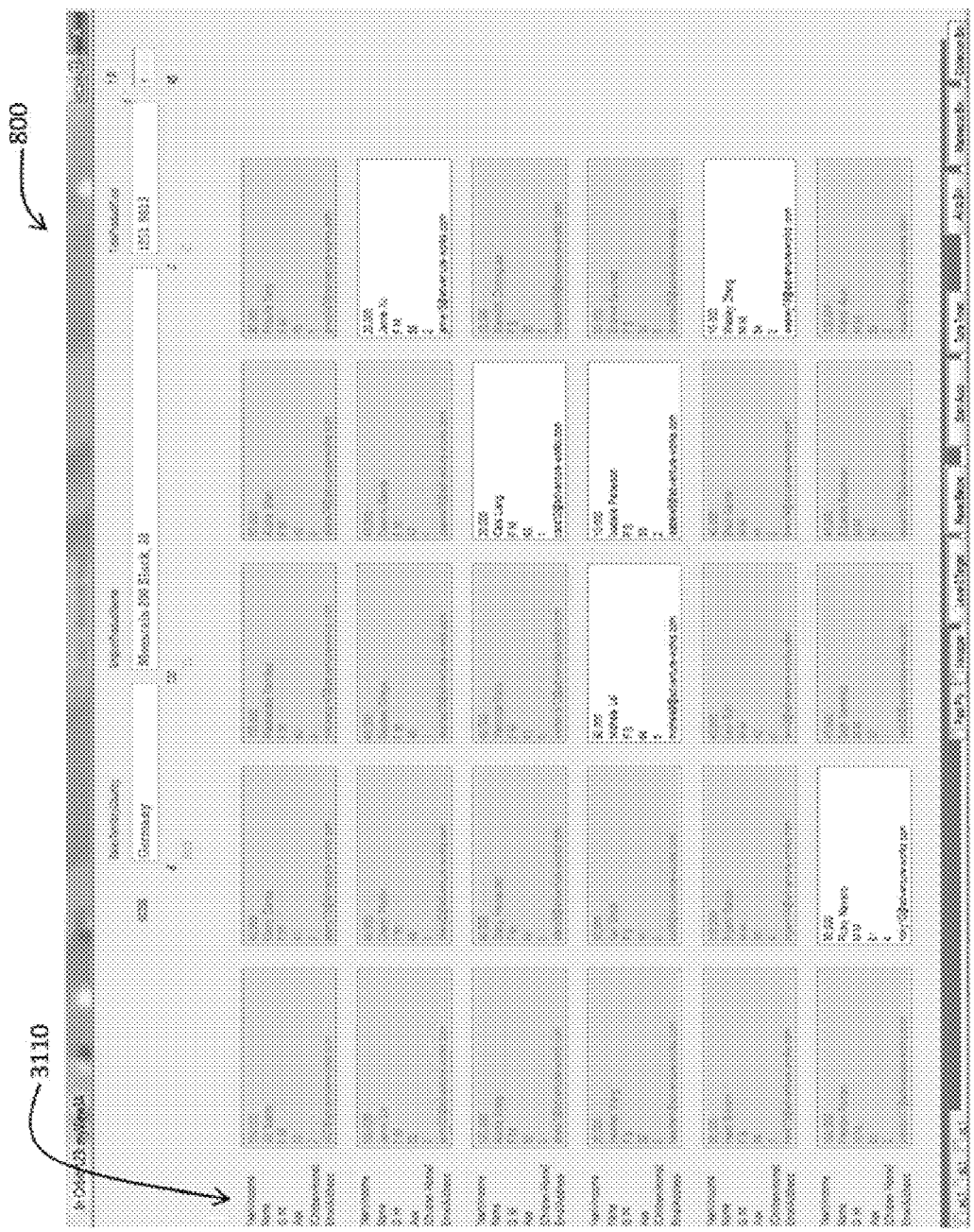
FIG. 31 is a diagram illustrating another exemplary Orbit Form of a database interface created using the DBICS of FIG. 1.

Referring now to FIG. 30, the user may select the Highlighter button, and may cause Conditional Panel 3010 to open. The user may enter one or more condition (e.g., 'Age>50)'. For example, and without limitation, the user may want to see the extent to which customers with an income of <100,000 and an Age>50 are buying and what products. In the illustrated example, the user may want to start his browse with Germany and expand from there. Exemplary FIG. 31 illustrates the results of the Highlighter conditions being met.

Continuing to refer to FIGS. 30 and 31, an alias may be used when defining fields at Level 0 and below. For example, and without limitation, the alias name may be displayed in the row title labels for the DaPs in the drop down part of the Orbit Form 800, advantageously facilitating quick and easy recognition of what each row represents (e.g., in both the Launch Form 400 of FIG. 30 and the resulting Orbit Form 800 of FIG. 31, 'Name' 3020, 'G_M' 3030 and 'Age' 3040 may be used as Aliases for this purpose In certain embodiments of the present invention, when a cursor is hovered over any particular row title label 3110, the Orbit Form 800 may display a tool-tip illustrating the full text defining the field for the associated row. The facility to use Alias names may advantageously make setting criteria m the Highlighter in the Launch Form 400 easier as the employed Alias names in the Data levels may be used here.

Figure 32:
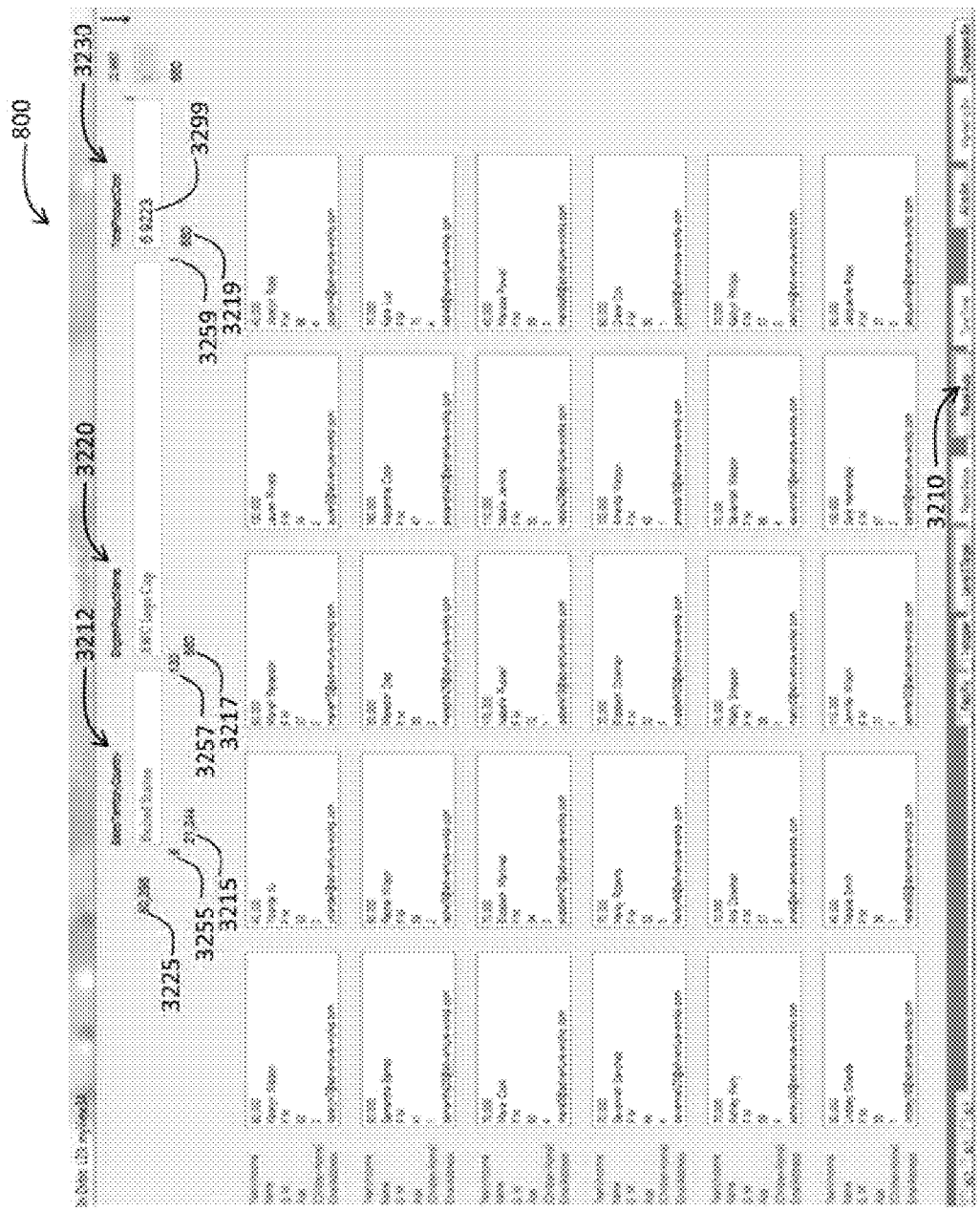
FIG. 32 is a diagram illustrating another exemplary Orbit Form of a database interface created using the DBICS of FIG. 1.

Referring now to FIG. 32, the Orbit Form 800 may display (and dynamically update) total records information figures relating to values retrieved from the data set and displayed in the Approach Boxes (as described generally in FIG. 8 and above). For example, and without limitation, the form 800 may display directly to the left of the first Approach Box 3212 a total number of records 3225 in the amount of 60,398 for this first filter. The system 800 may display the next line of information figures just below and to the left of the respective Approach Boxes representing the number of unique values in the filter combination defined at each point including the browsed values, and may do so dynamically as a user navigates through the Approach Boxes: as shown, a total number of unique values 3255 of 6 for ShipTerritoryCountry 3212, a total number of unique values 3257 of 130 for EnglishProductName 3220 for "United States," and a total number of unique values 3259 of 1 for Total ProductCost 3230 for "United States—AWC Logo Cap". Continuing down from top to bottom of the sample Orbit form 800, the next line of information figures below the previous line described above, and directly under the respective left margin of each of the Approach Boxes, may illustrate the total number of records for the filter combination defined at each point including the browsed values, and may do so dynamically as a user navigates through the Approach Boxes: a total number of records 3215 of 21,344 for "United States," a total number of records 3217 of 680 for "United States—AWC Logo Cap," and a total number of records 3219 of 680 for "United States—AWC Logo Cap—6.9223."

The total records information figures utility, as described above, may advantageously operate as a "utility within a utility" in that, employing only the available Approach Boxes, a user may browse information in the data set such as a) in how many countries a business has customers, b) how may difference products are involved for each country, and c) how many unit costs were used with a given product in a given country. Such a utility may be advantageously used to provide quick headline data for a filter and/or filter combinations, as well as serve other purposes that may be immediately understood by a person of ordinary skill in the art.

Still referring to FIG. 32, the user may select the 'Start Auto' button 3210 on the bottom line toolbar (whose text then changes to "Pause Auto") to cause the system to advance down through all the pages in the table, displaying them for one second each, before automatically displaying the next page without, any keystroke or input from the user. Instead, the system may advance through the database automatically changing the display in the Results Page to the next output in order and automatically changing the values in approach boxes (the filters) to the next one in sequence as the bottom of the current Approach box completes. At any time, the user may pause the action to study a page by pressing 'Pause Auto' 3210 or the spacebar. When the user does this, the user may reverse direction and may change the number seconds that a page may be displayed. When paused, a user may exit Auto by clicking in the AB0, the paging box 830, and return to manual operation.

Figure 33:
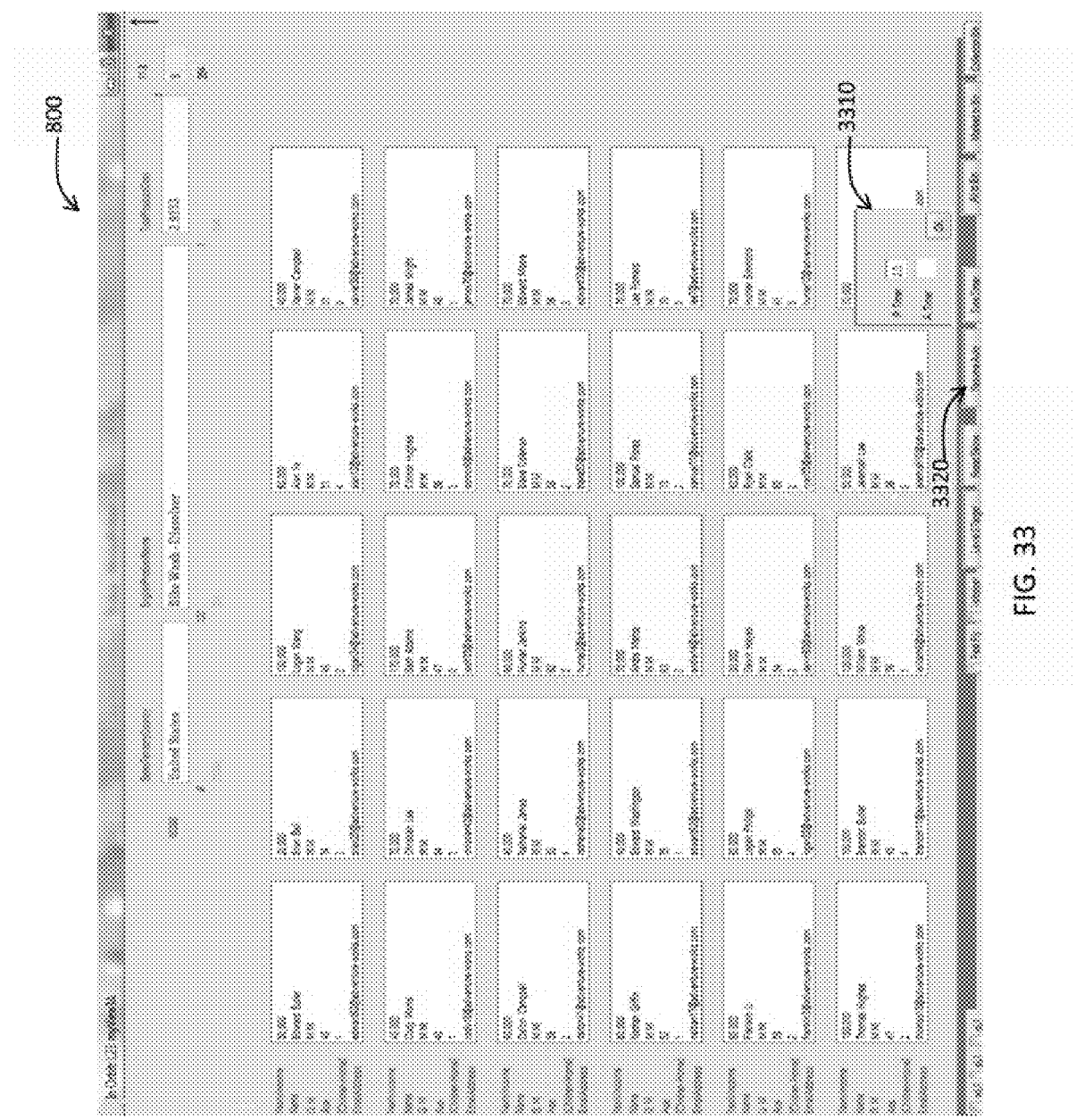
FIG. 33 is a diagram illustrating another exemplary Orbit Form of a database interface created using the DBICS of FIG. 1.

FIG. 33 illustrates how Tuning Auto may operate. In the exemplary scenario illustrated in FIG. 33, the user may use a pop-up box 3310 to reverse the direction to Up (instead of Down) and to opt to increase the display time to 2.S seconds. Detecting the user's request, the Orbit Form 800 may change the message on the button to 'Resume Auto' 3320. if the user wanted to quit or ex if the Auto mode, the user may bring the curser to the paging box and click to return to normal mode.

For example, and without limitation, FIG. 31 illustrates the Orbit Form 800 having dropped down a page and entered a wait state. Detection of a user selection of 'Start Auto' 3210 (FIG. 32) on the tools facility at the bottom of the page may prompt the Orbit Form 800 to change the background color in the Paging Box 3299 from yellow to green and its enabled state to false. The Orbit Form 800 may then proceed to automatically drop down the pages for that Level 1 value at that point, holding each Drop Down for 1.5 seconds (or some other preset or user-defined default hold time) and, when exhausted, automatically executing the SQL for and continue with the first page for the next value in Level 1. When Level 1 is exhausted, the Orbit Form 800 may automatically execute the SQL for the next Level 2 and its first Level 1 may drop down those pages, and so on, working the program's 800 way back to the value in the initial Level in the Approach, and so on from there down, until the Orbit Form 800 reaches the last drop down page for last value in all of the filters. When the program 800 reaches this point, it may halt, may display a red message advising the user the end has been reached and may enter a wait state. In certain embodiments of the present invention, when in use the Orbit Form 800 may display a down facing arrow to the right of the Paging Box 3299 to indicate that the Auto facility is working down. The text of the Auto button 3210 on the tool box may change to 'Pause Auto,' and detection of a user selection at any time may return the program 800 to the wait state. For example, and without limitation, the Auto button 3210 in FIG. 32 indicates that its selection by a user may Pause the auto running. Also for example, and without limitation, FIG. 33 illustrates a situation where the user has selected the 'Pause Auto' button 3210 which may halt the operation and may cause the text on the button 3210 to change to display 'Resume Auto' 3320. While halted he has hit the 'Tune Timer' button 3310 which enables him to change reset the number of seconds for which each drop down page. When Auto is paused, the Orbit Form 800 may change the Paging Box 3230 color to yellow and its enabled state to true. If the user wishes to terminate the auto executing, the user may click on the Auto button 3210, the direction arrow may disappear, the text in the Auto Box 3210 may change to 'Start Auto,' and the auto execution may terminate, leaving the user with the normal wait state for the current screen.

Figure 34:
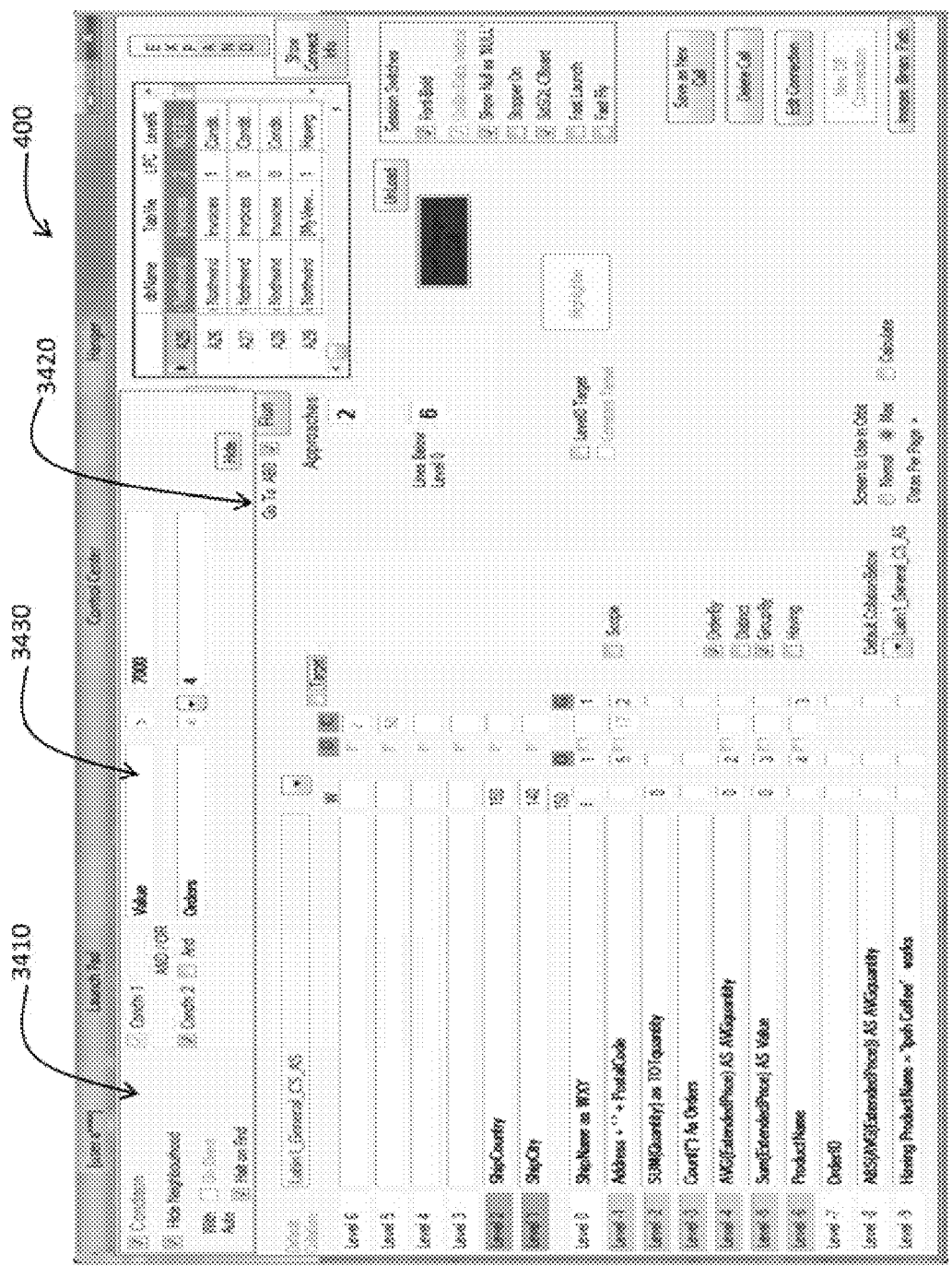
FIG. 34 is a diagram illustrating another exemplary Launch Form of a database interface created using the DBICS of FIG. 1.
Figure 35:
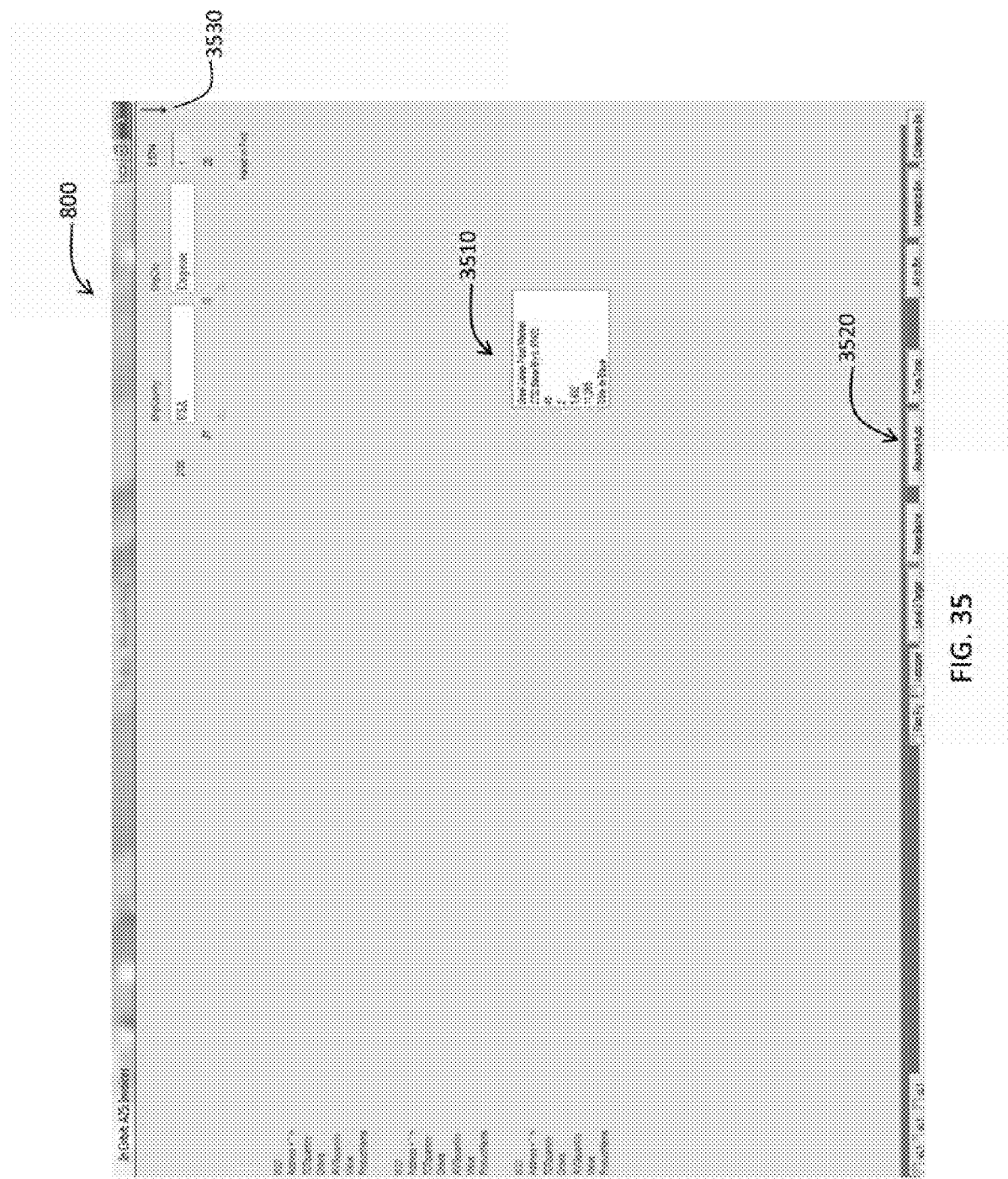
FIG. 35 is a diagram illustrating another exemplary Orbit Form of a database interface created using the DBICS of FIG. 1.

FIGS. 34 and 35 illustrate use of the Highlighter and Auto together in order for the user to see who is placing large value orders and for products. Before running, the user may check 3410 the 'Hide Neighbourhood' box and also the 'Halt on Find'. The user may also check 3420 the 'Go To AB0' box. As shown in FIG. 35, when the user runs the call, the Orbit Form 800 may advance straight to the first Drop Down 3510. The user may then engage 'Auto' 3520. Auto may run until it finds Highlighter criteria hit, and then halt. Because Neighbourhood is hidden, only the DaP or DaPs that meet the criteria may be displayed as in the example of FIG. 35. Using this method, the user may, by looking at the values as they change in the approach boxes, literally watch the search in progress. Once halted, the user may access the DaP with the full functionality previously described.

For example, and without limitation, the Highlighter may be used to find and highlight DaPs characterized by a specific value. When used in conjunction with the Auto mode of the Orbit Form 800, the Highlighter may advantageously present a means for watching, enhancing and controlling a search process. As shown in FIG. 34, after the conditions 3430 for the Highlighter have been set to 'Value>7000 AND Orders<4' and two operational boxes 3410 are ticked 'Hide Neighbourhood' to instruct the Call not to show non-qualifying DaPs, and 'Halt on Find' to enforce that condition when the Orbit Form 800 is executed in Auto mode. FIG. 35 shows the resultant Orbit Form 800 from the Call described above. For example, and without limitation, auto has been turned on and a qualifying DaP has been found and, therefore; Auto is paused (showing as 'Resume Auto' 3520), thereby giving the user an opportunity to read the DaP, expand it (see expansion example at FIG. 12), and/or extract and display an image if present (see image examples at FIGS. 15 and 17). On demand, the user may select Resume Auto 3620 on the Orbit Form 800 and the search may continue. As illustrated in FIG. 35, the direction arrow 3530 to the right of The Paging Box indicates a Down direction. By pressing the Up Arrow on the keyboard or mouse, the user may switch the search direction to cause the Orbit Form 800 to go back up to locate and show previous finds, or vice versa. During the search direction reversal process, the values in the Approach Boxes and their associated record numbers data may automatically change as the program 800 automatically updates all the available filter values and executes a new SQL on each change. The effect of this capability is that, by watching the values in the Approach boxes, a user may see the values changing, see search progress, and know the location point of the search at any time (in the instance shown in FIG. 35, the active search is at "USA—Eugene").

If a user desires to search a particular filter or filter combination, the user may (before executing the Call) use the Target facility to nominate a desired value (e.g., 'USA') at Level 2 and a particular City (e.g., 'Eugene') at Level 1, thus sending the Orbit Form 800 straight to these filter values upon opening. Alternatively, the user may enter straight in and use the Orbit Form 800 Approach Boxes to browse for the filter value(s) to be searched before setting Auto on. Where a user has knowledge of SQL syntax, the process may be further speeded up significantly by using the Scope facility (444 at FIG. 7) which specifies a condition to be added to the Where clause in the underlying SQL (see, for example, FIG. 28), which then limits the records to be collected by the SQL and evaluated by the Orbit Form 800. In the present above example, an entry that reads "Sum (ExtendedPrice)>7000" may achieve this result.

Figure 36:
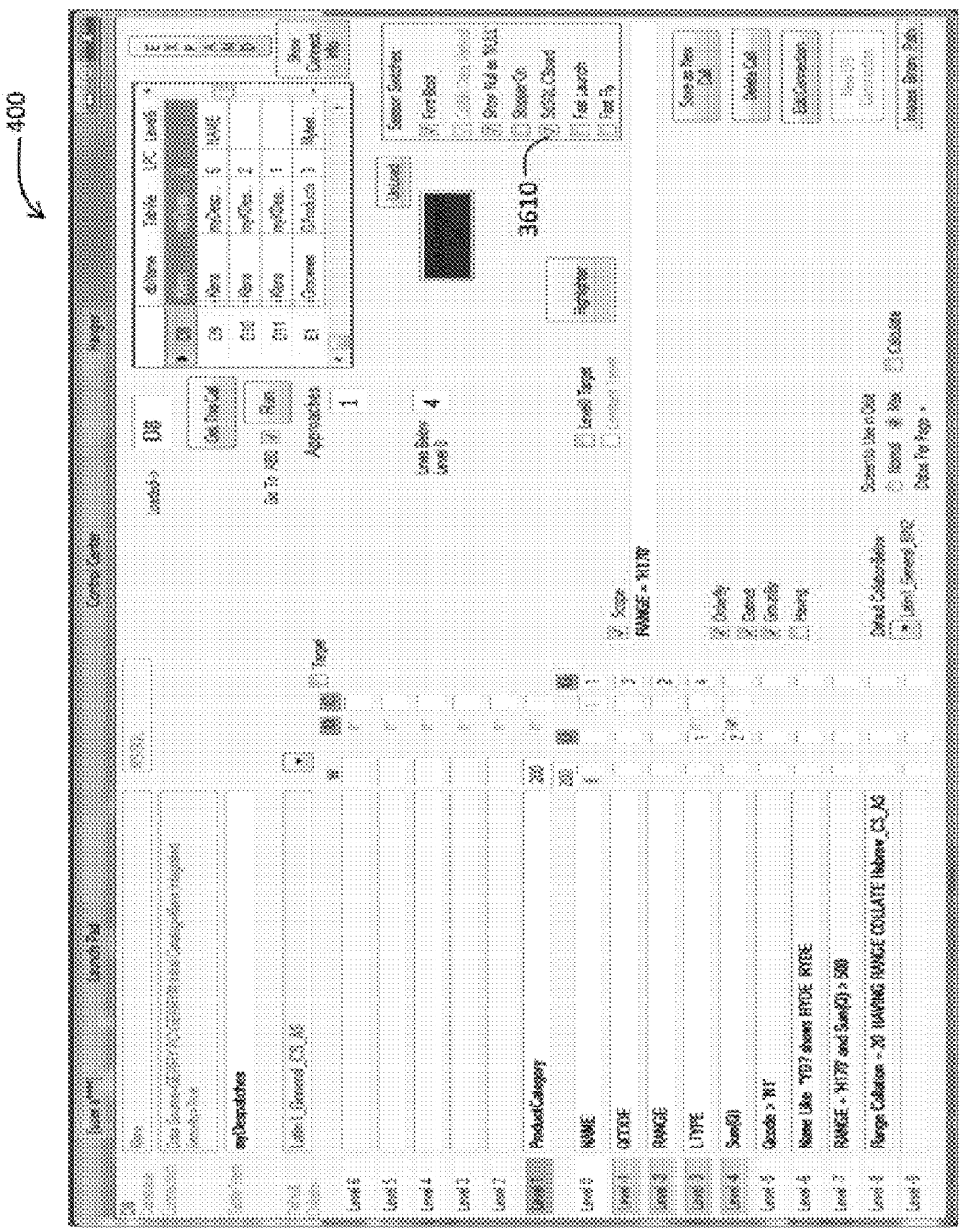
FIG. 36 is a diagram illustrating another exemplary Launch Form of a database interface created using the DBICS of FIG. 1.
Figure 37:
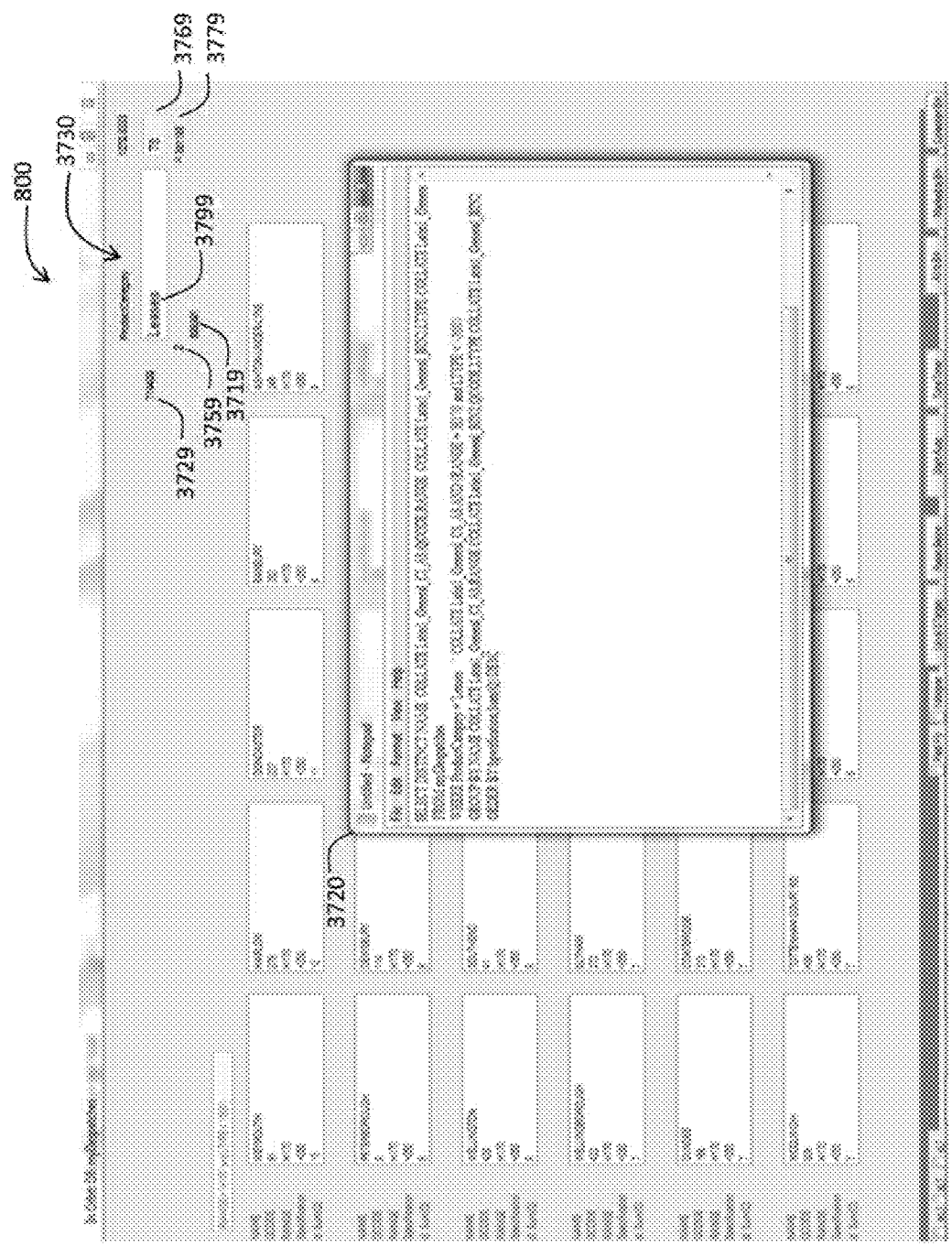
FIG. 37 is a diagram illustrating another exemplary Orbit Form of a database interface created using the DBICS of FIG. 1.

FIGS. 36 and 37 illustrate an exemplary use of the SQL Learning functionality of the Orbit Form 800. As shown in FIG. 36, the SdSQL-Clipboard 3610 is checked in the Launch Form 400. Doing so may cause the Launch Form module 104 to insert, a value in the call so that the Orbit Form 800 may be instructed to save the SQL that was fired to get the Drop Down for the active Level 1, to parse it to text book format, and to save it to the clipboard. A learner wanting to see exactly how such a query may be written in SQL 'long-hand language' may open a Note Pad 3720 and paste the query as illustrated in FIG. 37.

Still referring to FIG. 37, the Orbit Form 800 may display (and dynamically update) total records information figures relating to values retrieved from the data set and displayed in the Paging Box 3730 when the call is configured to stipulate that the data for records to be displayed are to be Distinct. As similarly described for FIGS. 8 and 32 above, the three (3) numbers at the Paging Box 3730 are, from top to bottom, the number of pages 3279, the page currently displayed 3759 and the total number of records qualifying for drop down 3719. Normally the last number 3779 (defined to reflect the number of records at Level 0 and Below) will be the same as the number of records qualifying for drop down 3719 similar to FIG. 32 above, except where the call specified the data to be Distinct. When Distinct is specified, a small 'u' may be displayed just off the top left of the figure 3779 for the number of records at Level 0 & Below (to advantageously remind the user that data in the DaPs displayed in the drop down are Distinct), and that this number 3779 may be and is likely to be less than the total number 3719 (e.g., as illustrated in the example at FIG. 37, 685,391 records 3719 are available of which the Distinct number 3779 is 38,185.

Generally speaking, the system 100 may be used in other ways, such as a teacher-learning tool. The user interface of the platforms in the present invention embodiment (i.e. the Launch form 400 and the Orbit form 800) may operate both as a purely purposeful tool and also as a progressive learning tool, without the user having to script an actual SQL, but instead with an optional learning facility for him or her to view, for learning purposes, the actual SQLs scripts generated by the system 100.

Figure 38:
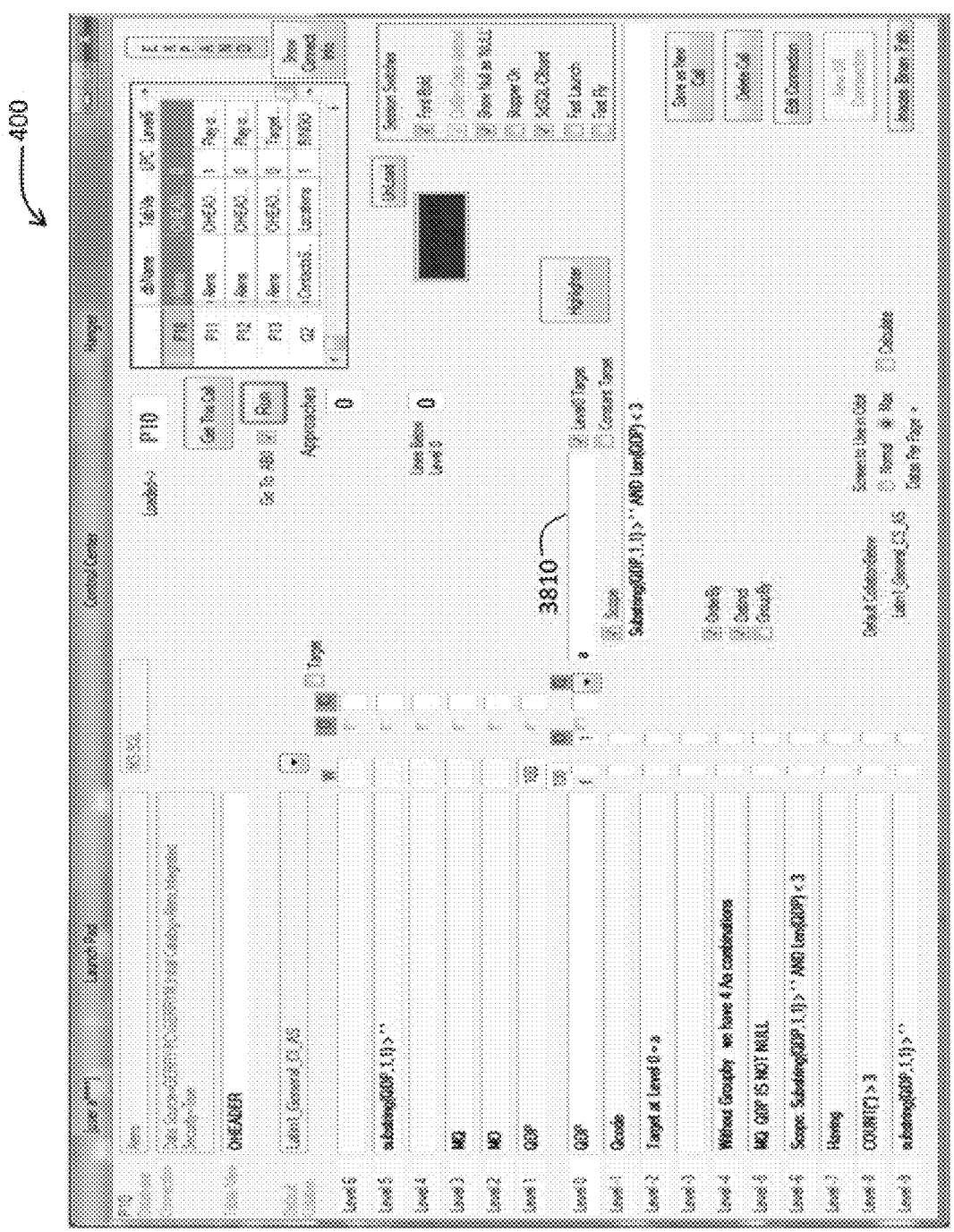
FIG. 38 is a diagram illustrating another exemplary Launch Form of a database interface created using the DBICS of FIG. 1.
Figure 39:
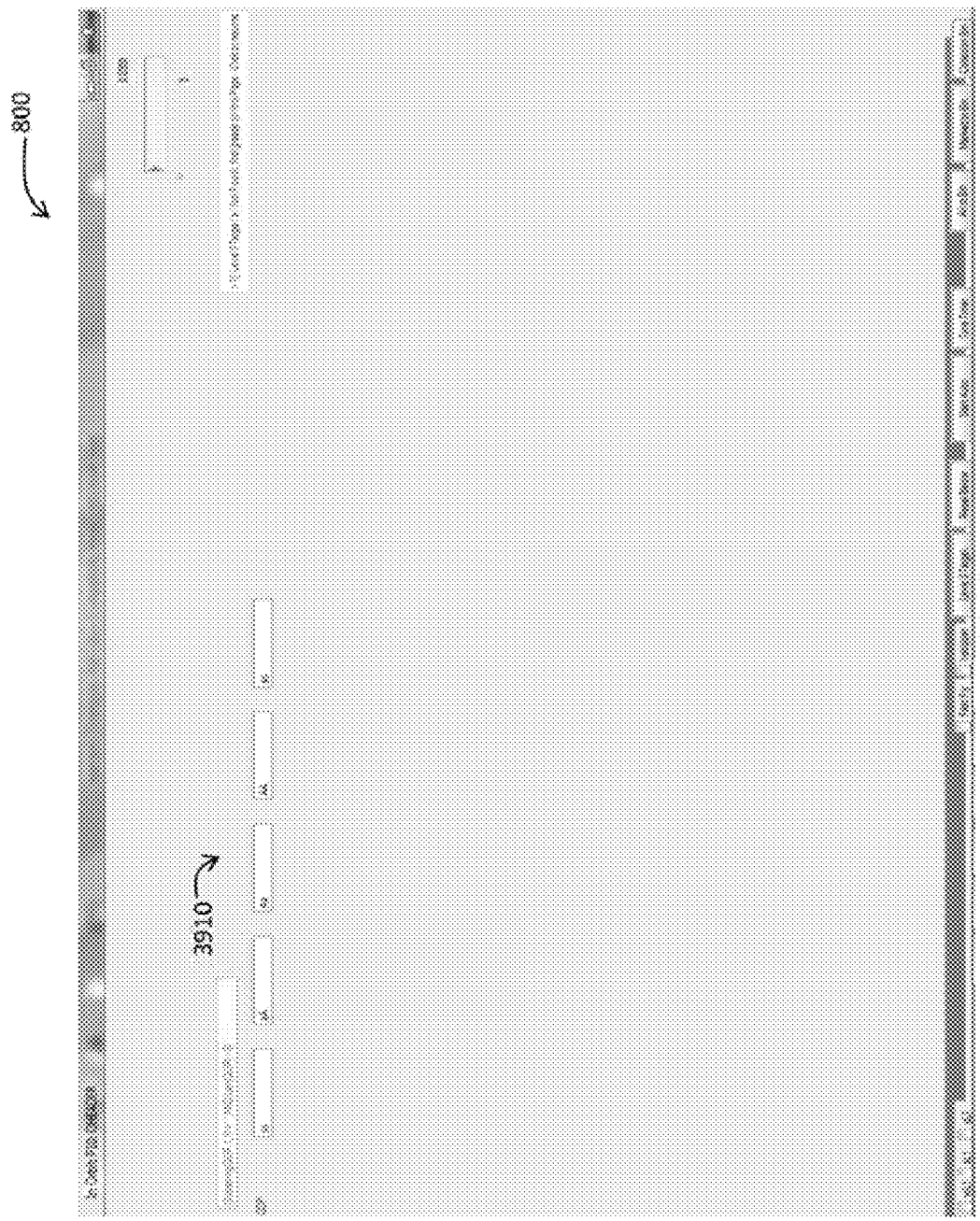
FIG. 39 is a diagram illustrating another exemplary Orbit Form of a database interface created using the DBICS of FIG. 1.

For example, and without limitation, 'When Go To AB0' is checked the results of a call run may be immediately viewed and studied, because a completed results page may be the first screen presented to the user. By studying the values in the DaP sequence, as presented on the Results Page, the implementation of instructions like Unique, Order By, Group By may be immediately and beneficially demonstrated. Similarly, the effect of using different Collations may be demonstrated as in the example from FIGS. 38 and 39. Also, demonstrating the effect of applying different Collations to selected column may be possible using the system 100.

For example, and without limitation, a simple call may be set up to display only the first too characters in a string column and target the incidence 3810 of the values 'A' or 'a'. As shown, the Default Collation Below applying may be—CS_AS The result of the query 3910 may be "aa aA Aa AA".

If the user was to go back and override the Default Collation Below with BIN2, the result of the query may be "AA Aa aA aa".

If the user to go back yet again and override the Default Collation Below with CI_AS. the result of the query may be "aA".

If acquired for use specifically as a teaching-learning tool, the system may be improved to include more elaborate calls written for that purpose, with those Calls already present in the hanger, and/or a teacher may design and add his own calls for demonstration purposes.

Figure 9:
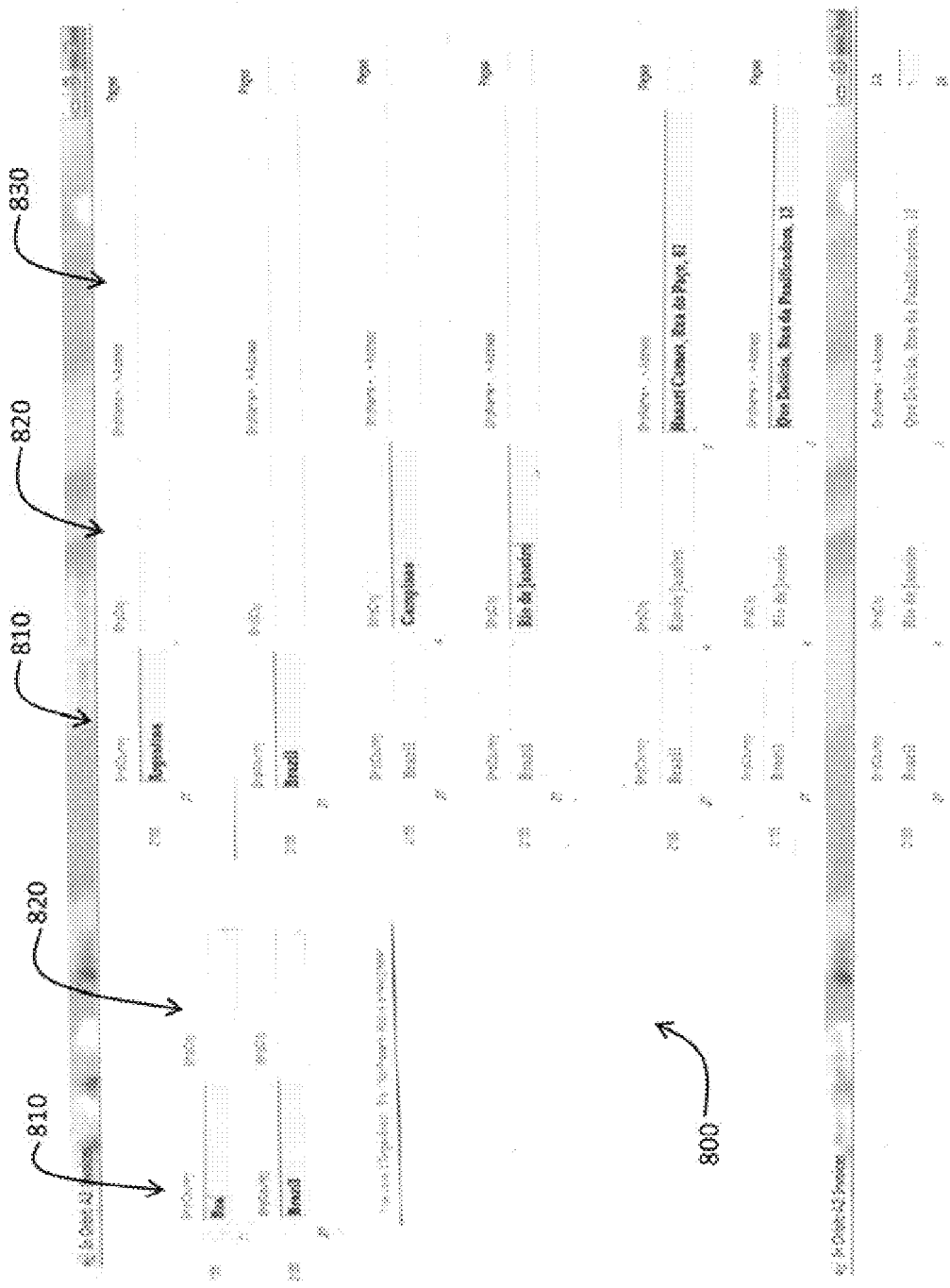
FIG. 9 is a diagram illustrating exemplary states of Approach Boxes of another exemplary Orbit Form of a database interface created using the DBICS of FIG. 1.
Figure 41:
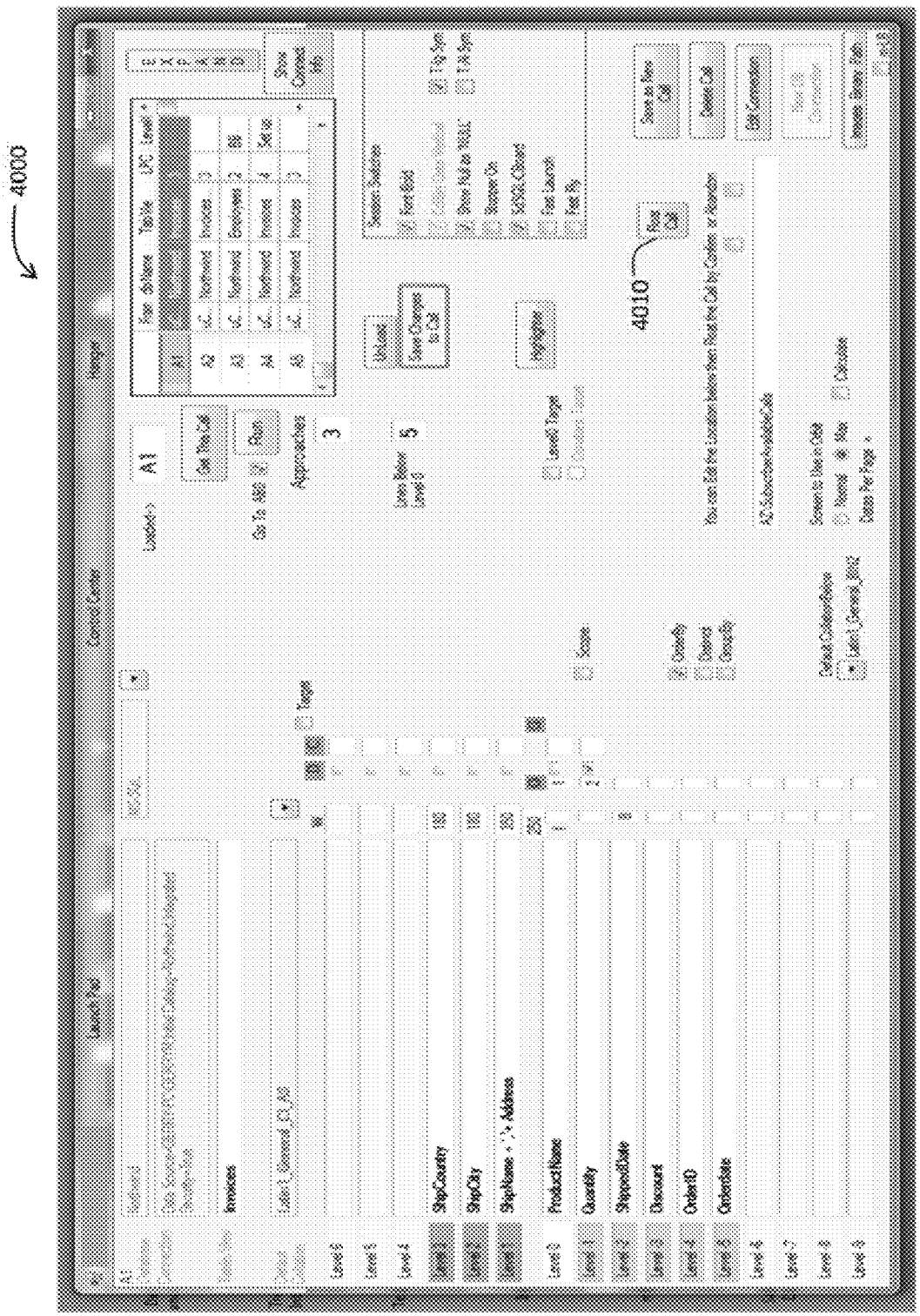
FIG. 41 is a diagram illustrating an exemplary Publisher Form for use by a Pre-form module according to an embodiment of the present invention.

In one embodiment of the present invention, a stand-alone Orbit Form may be advantageously presented to a user as an Obiter application (hereinafter Orbiter app) configured to operate in cooperation with a Publisher and a Pre-Form, as described below in more detail. For example, and without limitation, in place of the Launch Form functionality described above may be substituted a Publisher which may be configured to make stored Calls available for use to Subscribers. As shown in FIG. 41, a Publisher interface 4000 may include a Float Gall operator 4010 that, when selected, may transmit a Call code identified on/defined using the Publisher 4000 to be available to subscriber users and/or systems. The operations present on the Publisher interface 4000 mirror those shown in and described for FIG. 4 with minor adjustments (e.g. the 'Address' field appears added to the ShipName at Level 1 and Approach box widths are increased to reflect the Call used in FIGS. 8 through 10).

Figure 42:
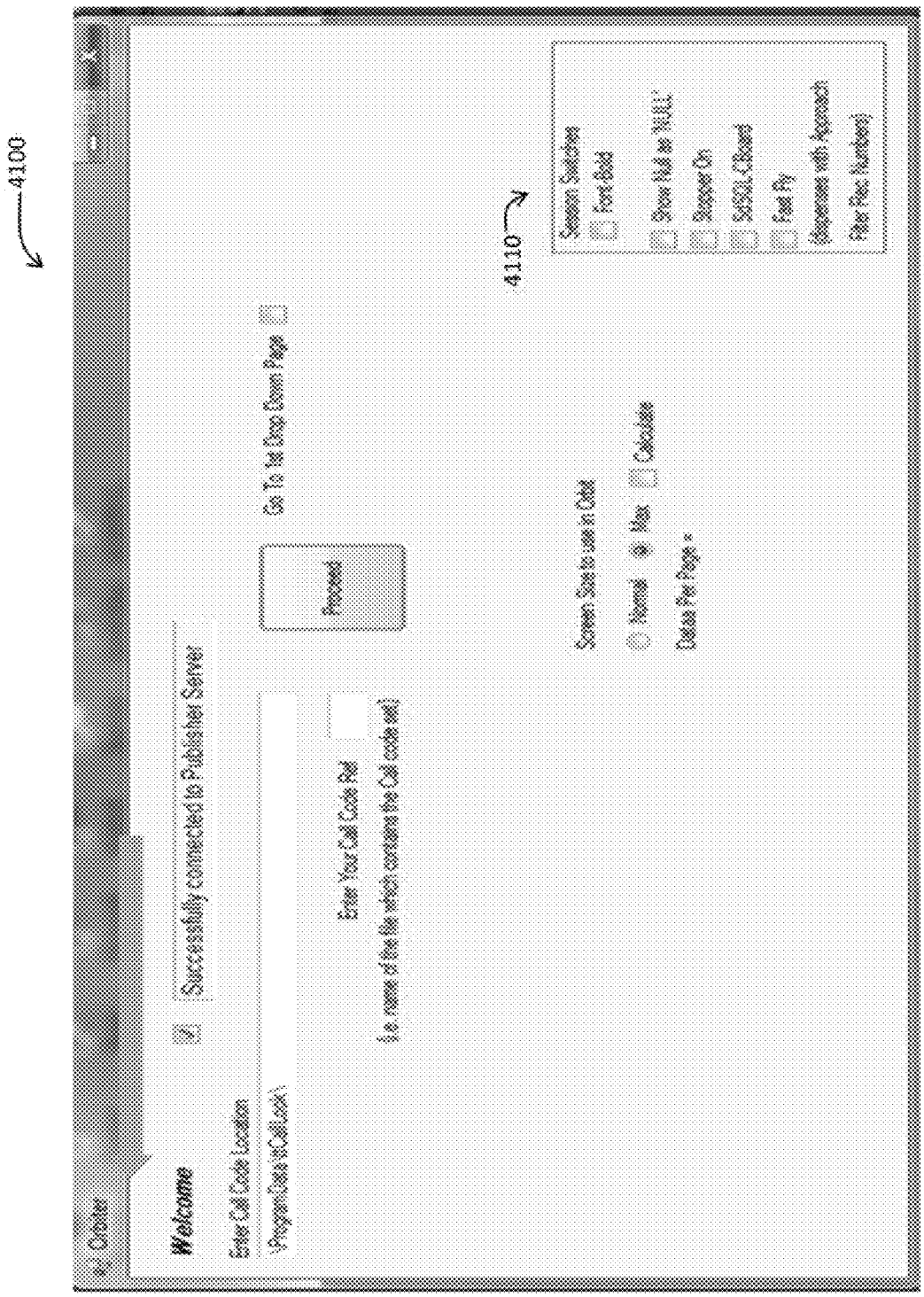
FIG. 42 is a diagram illustrating an exemplary Pre-Form module for use by an Orbiter app according to an embodiment of the present invention.

Referring additionally to FIG. 42, a Pre-Form interface 4100 may open when the user of the Orbiter app is loaded and is connected to the Publisher's 4000 server. For example, and without limitation, the Orbiter app user may be presented with some of the elementary display options 4110 described above for the Orbit Form 800, such as screen Size, stopper on (see 350 at FIG. 7). Fast Fly, and 'Go to ABO' (see 3420 at FIG. 34).

Figure 43:
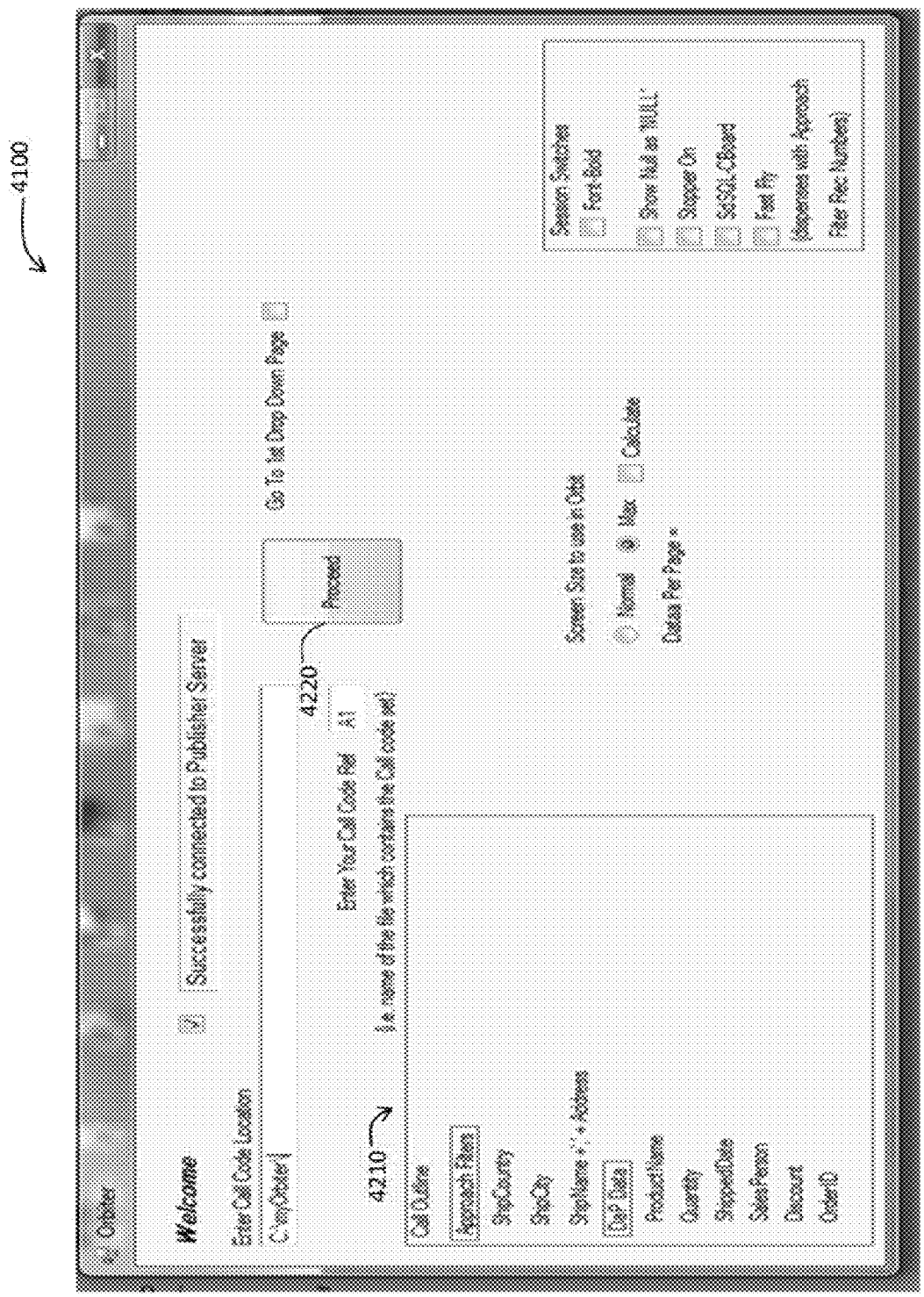
FIG. 43 is a diagram illustrating another exemplary Pre-Form module for use by an Orbiter app according to an embodiment of the present invention.

Referring additionally to FIG. 43, a user may interact with the Pre-Form interface 4100 to enter a Call Code reference location, from which a desired call may be retrieved. For example, and without limitation, an Orbiter App user may locate and load a Call (e.g., call code set) from a portfolio where downloaded and/or authorized Call code sets are stored or, alternatively, available Call Codes may be stored in the user's subscriber account folder at the Publishers cloud-based repository. The Pro-Form 4100 may, upon location and retrieval of the desired Call, may present a Call Outline 4210 for user inspection. Once the Call is loaded and ready to execute using the Orbiter app, the user may select the Proceed button 4220. The resultant Orbiter app may then display the data set defined by the Call Code, and provide the interface and functionality as illustrated and described above for the Orbit Form 800 of FIGS. 8, 9, and 10. Thereafter, for any Call, all features are the same as described above for the Orbit Form 800.

A person skilled in the art of database browsing will immediately recognize that Call code sets may be implemented in any number of formats to achieve the advantages of the present invention. For example, and without limitation, the following operable variables that may be included in the Call code set: the connection string for the Call, origin of the database (e.g., Microsoft® Server database, Oracle®), master switch by which the values therein are used to create any Order By, Group By, Ascending or Descending, override Collations assigned. Display formats nominated, and if the Call is to be Distinct (e.g., providing the information for the Select part and its sub clauses of the SQL generated for the drop downs), the nominated table or view to be engaged followed by the value for the number of approach filters, the information for the filters (where a Level is not in use there is nothing between the delimiters: where a Level is nominated the next 3 items will contain the field name, the width of the Approach Box it will use, and a code for the data type), the field name for Level 0 followed by the width value for the DaPs, followed by the number of levels nominated below Level 0, the field names for Levels to be used below Level 0). The same testing process described above for the Orbit Form 800 may determine if the associated data types and other input variables are sufficient, to correctly formulate the SQLs to be generated for the drop downs.

The Call code set creation process described above mirrors how the Calls are stored in the file that services the Launch Form 400 which, on loading, places the Calls in the Launch Form Hanger 430. In effect, a Call once created and stored may be engaged straight from the Call code set file and bypass the Launch Form 400, as with the Orbiter app. In the above example, a publisher having created and tested a Call with his Launch Form 400 may make the Call available for a subscriber to use with one's Orbiter App.

In yet another embodiment, the publisher's website when called may execute the Orbiter itself until the first operational screen is displayed (e.g., generally as illustrated in FIG. 8). and then may pass control to the subscriber.

Figure 40:
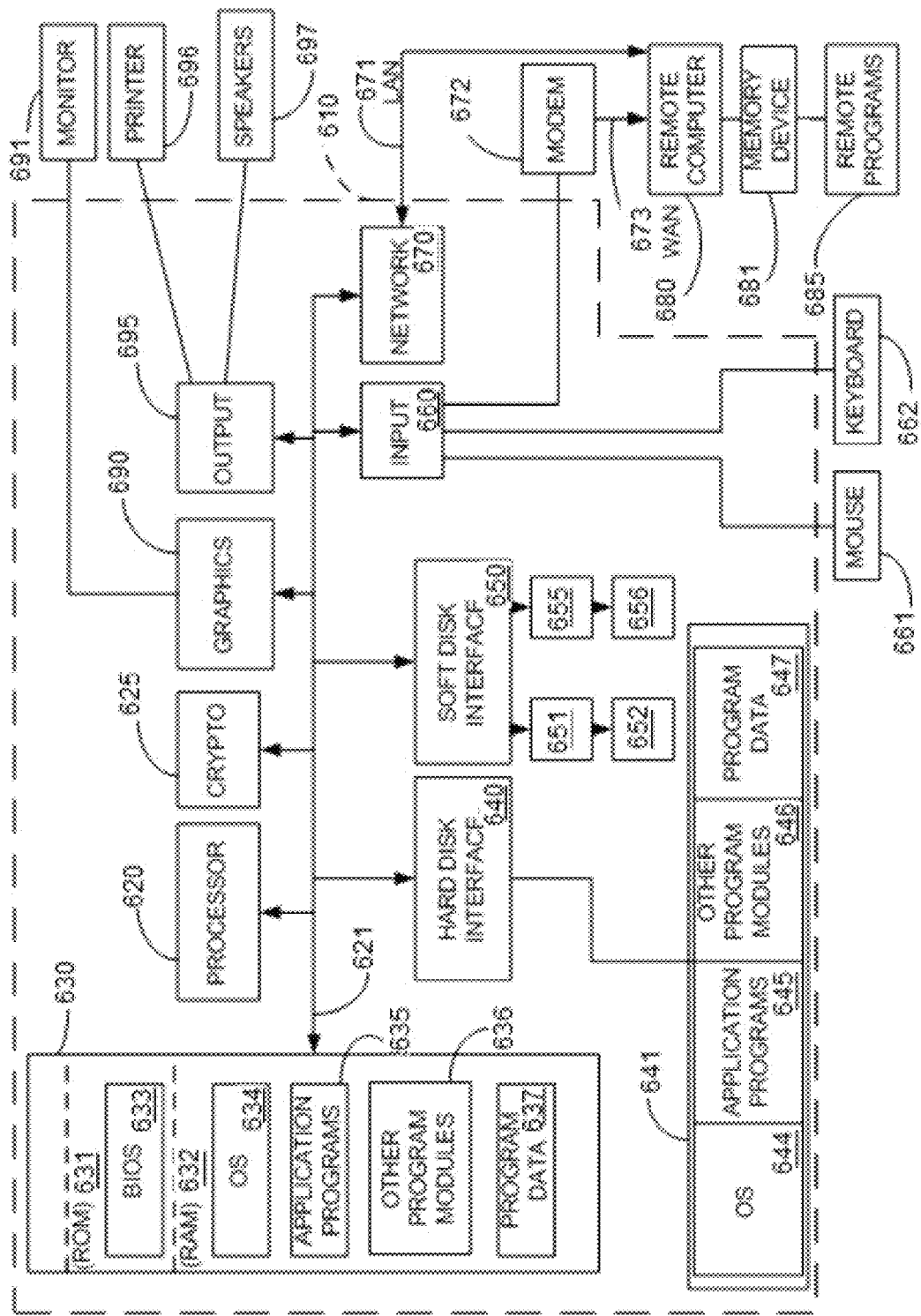
FIG. 40 a block diagram representation of a machine in the example form of a computer system according to an embodiment of the present invention.

A skilled artisan will note that one or more of the aspects of the present invention may be performed on a computing device. The skilled artisan will also note that a computing device may be understood to be any device having a processor, memory unit, input, and output This may include, but is not intended to be limited to, cellular phones, smart phones, tablet computers, laptop computers, desktop computers, personal digital assistants, etc. FIG. 40 illustrates a model computing device in the form of a computer 610, which is capable of performing one or more computer-implemented steps in practicing the method aspects of the present invention. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI).

The computer 610 may also include a cryptographic unit 625. Briefly, the cryptographic unit 625 has a calculation function that may be used to verify digital signatures, calculate hashes, digitally sign hash values, and encrypt or decrypt data. The cryptographic unit 625 may also have a protected memory for storing keys and other secret data. In other embodiments, the functions of the cryptographic unit may be instantiated in software and run via the operating system.

A computer 610 typically includes a variety of computer readable media. Computer readable media can be any available media that can be accessed by a computer 610 and includes both volatile and nonvolatile media, removable and non-removable media. By way of example, and not limitation, computer readable media may include computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media.

Combinations of any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 40 illustrates an operating system (OS) 634, application programs 635, other program modules 636, and program data 637.

The computer 610 may also include other removable/non-removable, volatile/nonvolatile computer storage media. By way of example only, FIG. 40 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used so the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives, and their associated computer storage media discussed above and illustrated in FIG. 40, provide storage of computer readable instructions, data structures, program modules and other data for the computer 610. In FIG. 40, for example, hard disk drive 641 is illustrated as storing an OS 644, application programs 645, other program modules 646, and program data 647. Note that these components can either be the same as or different from OS 633, application programs 633, other program modules 636, and program data 637. The OS 644, application programs 645, other program modules 646, and program data 647 are given different numbers here to illustrate that, at a minimum, they may be different copies. A user may enter commands and information into the computer 610 through input devices such as a keyboard 682 and cursor control device 681, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a graphics controller 690. in addition to the monitor, computers may also include other peripheral output devices such as speakers 697 and printer 696, which may be connected through an output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 40. The logical connections depicted in FIG. 40 include a local area network (LAN) 671 and a wide area network (WAN) 673, but may also include other networks 140. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 680, or other appropriate mechanism. In a networked environment, program modules depicted relative to the computer 610, or portions thereof, may be stored in the remote memory storage device. By way of example, and not limitation, FIG. 40 illustrates remote application programs 685 as residing on memory device 681.

The communications connections 670 and 672 allow the device to communicate with other devices. The communications connections 670 and 672 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A non-transitory computer readable storage medium embodying a computer program to execute a method for browsing a database, wherein the database comprises a named table that includes a plurality of named fields, the method comprising the steps of:
  receiving, using an Orbit Form module, a call that comprises query option parameters including:
    a database connection string to define an identifier for the database,
    a target data object corresponding to the named table in the database,
    a Level 0 target corresponding to one of the plurality of named fields in the database defined as a Level 0 target named field, wherein the Level 0 target is of a Level 0 nomination data type selected from the group consisting of column name, SQL-allowable function, columns combination, constant, and aggregate function,
    an approach filter corresponding to one of the plurality of named fields in the database defined as an Above The Line named field, wherein the Above The Line named field is distinct from the Level 0 target named field, and
    at least one results line corresponding to a respective one of the plurality of named fields in the database defined as Below The Line named fields;
  initiating, using the Orbit Form module, data communication with the database using the database connection string of the call;
  creating, using the Orbit Form module, at least one SQL script that includes the query option parameters of the call;
  executing, using the Orbit Form module, the at least one SQL script to retrieve from the database a working data set comprising at least one record that includes a plurality of structurally-related values including a Level 0 value retrieved from the Level 0 target named field, an Above The Line value retrieved from the Above The Line named field, and at least one Below The Line value retrieved from the Below The Line named fields;
  creating, using the Orbit Form module, an interactive interface comprising
    a paging box corresponding to the Level 0 target, and
    an approach box corresponding to the approach filter;
  receiving, using the Orbit Form module, from each of the paging box of the interactive interlace and the approach box of the interactive interface a respective one of a plurality of target input values that, in combination, define a selection condition, wherein the at least one record of the working data set further comprises the plurality of structurally-related values characterized by a first match of the selection condition with the Above The Line value and the Level 0 value, in combination, to define matched records;
  determining, using the Orbit form module, a first approach total of the at least one record in the working data set that matches the approach filter, a second approach total of the at least one record in the working data set that matches a unique approach value associated with the approach box, and a third approach total of the at least one record in the working data set that matches a browsed approach value associated with the approach box; and
  displaying, using the Orbit Form module, to the interactive interface the first approach total, the second approach total, and the third approach total.

2. The non-transitory computer readable storage medium according to claim 1 wherein the Above The Line named field is of an approaches data type selected from the group consisting of comparable string data types and comparable number data types.

3. The non-transitory computer readable storage medium according to claim 1 wherein each of the Level 0 target named field and the Below The Line named fields is of a results data type selected from the group consisting of comparable string data types, comparable number data types, and non-comparable data types.

4. The non-transitory computer readable storage medium according to claim 1 wherein the method further comprises displaying, using the Orbit Form module, a first drop down page and a second drop down page each comprising a respective at least one DaP, each defined as a drop down box comprising the Level 0 value and the at least one Below The Line value of a respective one of the matched records.

5. The non-transitory computer readable storage medium according to claim 4 wherein the method further comprises displaying, using the Orbit Form module, on the interactive interface the second drop down page subsequent to the first drop down page after a period of time, defined as a default holding time.

6. The non-transitory computer readable storage medium according to claim 4 wherein the call further comprises a display option parameter selected from the group consisting of order by, group by, distinct, width, and lines to show below Level 0; and wherein displaying the first drop down page and the second drop down page further comprises formatting, using the Orbit Form module, the at least one DaP to be characterized by the display option parameter of the call.

7. The non-transitory computer readable storage medium according to claim 1 wherein the method step of creating the at least one SQL script further comprises:
  performing, using the Orbit Form module, an execution test of the at least one SQL script, and
  creating, using the Orbit Form module, a feedback dialogue upon detection of a failure of the execution test.

8. The non-transitory computer readable storage medium according to claim 1 further comprising determining, using the Orbit Form module, a first paging total of the at least one record in the working data set that matches the Level 0 target, a second paging total of the at least one record m the working data set that matches a unique paging value associated with the paging box, and a third paging total of the at least one record in the working data set that matches a browsed paging value associated with the paging box; and displaying, using the Orbit Form module, to the interactive interface the first paging total, the second paging total, and the third paging total.

9. The non-transitory computer readable storage medium according to claim 1 wherein receiving the call further comprises loading, using the Orbit Form module, a call code set defining the call to a Pre-Form.

10. The non-transitory computer readable storage medium according to claim 9 wherein loading the call code set further comprises transmitting, using a Publisher, the call code set to the Pre-Form.

11. A non-transitory computer readable storage medium embodying a computer program to execute a method for browsing a database, wherein the database comprises a named table that includes a plurality of named fields, the method comprising:
- receiving, using an Orbit Form module, a call that comprises query option parameters including:
  - a database connection string to define an identifier for the database,
  - a target data object corresponding to the named table in the database,
  - a level 0 target corresponding to one of the plurality of named fields in the database defined as a Level 0 target named field, wherein the Level 0 target is of a Level 0 nomination data type selected from the group consisting of column name, SQL-allowable function, columns combination, constant, and aggregate function, and
  - at least one results line corresponding to a respective one of the plurality of named fields in the database defined as Below The Line named fields;
- initiating, using the Orbit Form module, data communication with the database using the database connection string;
- creating, using the Orbit Form module, at least one SQL script that includes the query option parameters of the call;
- executing, using the Orbit Form module, the at least one SQL script to retrieve from the database a working data set comprising at least one record that includes a plurality of structurally-related values including a Level 0 value retrieved from the Level 0 target named field and at least one Below The Line value retrieved from the Below The Line named fields; and
- creating, using the Orbit Form module, an interactive interface comprising a paging box corresponding to the Level 0 target;
- receiving, using the Orbit Form module, from the paging box of the interactive interface a target input value to define a selection condition, wherein the at least one record of the working data set further comprises the plurality of structurally-related values characterized by a match between the selection condition and the Level 0 value, to define matched records;
- determining, using the Orbit Form module, a first paging total of the at least, one record in the working data set that matches the Level 0 target, a second paging total of the at least one record in the working data set that matches a unique paging value associated with the paging box, and a third paging total of the at least one record in the working data set that matches a browsed paging value associated with the paging box; and
- displaying, using the Orbit Form module, to the interactive interface the first paging total, the second paging total, and the third paging total.

12. The non-transitory computer readable storage medium according to claim 11 wherein the method further comprises displaying, using the Orbit Form module, a first drop down page and a second drop down page each comprising a respective at least one DaP, each defined as a drop down box comprising the Level 0 value and the at least one Below The Line value of a respective one of the matched records.

13. A computer program product embodied in a non-transitory computer readable storage medium embodying a computer program for browsing a database, wherein the database comprises a named table that includes a plurality of named fields; the computer program product comprising:
- a Publisher module,
- a Pre-Form module, and
- an Orbiter app;
- wherein the Publisher module comprises a first interface configured to transmit to the Pre-Form module a call code set comprising
  - a database connection string to define an identifier for the database,
  - a target data object corresponding to the named table in the database,
  - a Level 0 target corresponding to one of the plurality of named fields in the database defined as a Level 0 target named field, wherein the Level 0 target is of a Level 0 nomination data type selected from the group consisting of column name, SQL-allowable function, columns combination, constant, and aggregate function,
  - an approach filter corresponding to one of the plurality of named fields in the database defined as an Above The Line named field, wherein the Above The Line named field is distinct from the Level 0 target named field and wherein the approach filter is of an approach filter nomination data type selected from the group consisting of column name, SQL-allowable function, columns combination, and constant,
  - at least one results line corresponding to a respective one of the plurality of named fields in the database defined as Below The Line named fields, wherein each of the at least one results line is of a results line nomination data type selected from the group consisting of column name, SQL-allowable function, columns combination, constant, and aggregate function, and
  - query option parameters including the database connection string, the Level 0 target, the at least one approach filter, and the at least one results line;
- wherein the Orbiter app comprises a second interface configured to retrieve the call code set from the Pre-Form module, and to parse the call code set to
  - initiate data communication with the database using the database connection string,
  - create at least one SQL script that includes the query option parameters of the call,
  - execute the at least one SQL script to retrieve from the database a working data set comprising at least one record that includes a plurality of structurally-related values including a Level 0 value retrieved from the Level 0 target named field, an Above The Line value retrieved from the Above The Line named field, and at least one Below The Line value retrieved from the Below The Line named fields, and
  - create an interactive interface comprising a paging box corresponding to the Level 0 target, and an approach box corresponding to the approach filter,
  - receiving from each of the paging box and the approach box of the interactive interface a respective one of a plurality of target input values that, in combination, define a selection condition, wherein the at least one record of the working data set further comprises the plurality of structurally-related values characterized by a first match between the selection condition and the Above The Line value and the Level 0 value, in combination, to define matched records, determine a first approach total of the at least one record in the working data set that matches the approach filter, a second approach total of the at least one record in the working data set that matches a unique approach value associated with the approach box, and a third approach total of the at least one record in the working data set that matches a browsed approach value associated with the approach box, and display to the interactive interface the first approach total, the second approach total, and the third approach total.

14. The computer program product according to claim 13 wherein the second interface of the Orbiter app is further configured to display a first drop down page and a second drop down page each comprising at least one DaP, each defined as a drop down box comprising the Level 0 value and the at least one Below The Line value of a respective one of the matched records.

15. The computer program product according to claim 14 wherein the at least one Below The Line value of the at least one DaP is of a data type selected from the group consisting of text, ntext, image, varchar(max), nvarchar(max), varbinary(max), nchar, and xml.

16. The computer program product according to claim 14 wherein the method further comprises displaying, using the Orbiter app, a view image field, defined as a selectable value of the at least one DaP configured to extract and display an image file from binary data.

17. The computer program product according to claim 14 wherein the method further comprises determining, using the Obiter app, a first paging total of the at least one record in the working data set that matches the Level 0 target, a second paging total of the at least one record in the working data set that matches a unique paging value associated with the paging box, and a third paging total of the at least one record in the working data set that matches a browsed paging value associated with the paging box, and displaying, using the Orbiter app, to the interactive interface the first paging total, the second paging total, and the third paging total.

18. The computer program product according to claim 13 wherein the Orbiter app is further configured to perform an execution test of the at least one SQL script.

19. The computer program product according to claim 18 wherein performing the execution test further comprises detecting a success of the execution test, defined as detecting the Above The Line named field is of an approaches type selected from the group consisting of comparable string data types and comparable number data types.

20. The computer program product according to claim 18 wherein performing the execution test further comprises detecting a success of the execution test, defined as detecting each of the Level 0 target named field and the Below The Line named fields is of a results data type selected from the group consisting of comparable string data types, comparable number data types, and non-comparable data types.

* * * * *